(12) United States Patent
Clark et al.

(10) Patent No.: US 8,473,106 B2
(45) Date of Patent: Jun. 25, 2013

(54) SYSTEM AND METHOD FOR MONITORING AND EVALUATING EQUIPMENT OPERATING PARAMETER MODIFICATIONS

(75) Inventors: E. Todd Clark, Kennesaw, GA (US); Magesh Sarma, Marietta, GA (US); James R. Mitchell, Smyrna, GA (US)

(73) Assignee: Emerson Climate Technologies Retail Solutions, Inc., Kennesaw, GA (US)

( * ) Notice: Subject to any disclaimer, the term of this patent is extended or adjusted under 35 U.S.C. 154(b) by 456 days.

(21) Appl. No.: 12/789,562

(22) Filed: May 28, 2010

(65) Prior Publication Data

US 2010/0305718 A1  Dec. 2, 2010

Related U.S. Application Data

(60) Provisional application No. 61/182,436, filed on May 29, 2009.

(51) Int. Cl.
  *G01M 1/38* (2006.01)
(52) U.S. Cl.
  USPC .......................................... 700/276; 702/188
(58) Field of Classification Search
  USPC .................. 700/2, 9, 17, 19.91, 96, 108, 275, 700/276, 291; 702/188
  See application file for complete search history.

(56) References Cited

U.S. PATENT DOCUMENTS

| 2,296,822 A | 9/1942 | Wolfert |
| 3,232,519 A | 2/1966 | Long |
| 3,513,662 A | 5/1970 | Golber |
| 3,585,451 A | 6/1971 | Day, III |
| 3,653,783 A | 4/1972 | Sauder |
| 3,735,377 A | 5/1973 | Kaufman |

(Continued)

FOREIGN PATENT DOCUMENTS

| CH | 173493 A | 11/1934 |
| DE | 842351 C | 6/1952 |

(Continued)

OTHER PUBLICATIONS

Examiner's First Report on Australian Patent Application No. 2002259066, dated Mar. 1, 2006.

(Continued)

*Primary Examiner* — Kavita Padmanabhan
*Assistant Examiner* — Chad Rapp
(74) *Attorney, Agent, or Firm* — Harness, Dickey & Pierce, P.L.C.

(57) ABSTRACT

A method and system is provided that includes receiving a current setpoint value from a controller that operates at least one piece of equipment according to the current setpoint value, the current setpoint value being set by a first user, comparing the current setpoint value with a benchmark setpoint value, and outputting the current setpoint value and the benchmark setpoint value on a terminal when the current setpoint value is different than the benchmark setpoint value. The method and system also includes receiving, with the terminal, input from a second user indicating one of approval of the current setpoint value or rejection of the current setpoint value, notifying the first user that the current setpoint value has been rejected when the input from the second user indicates rejection of the current setpoint value, and communicating, to the terminal, input from the first user indicating one of agreement or disagreement with the rejection of the current setpoint value.

19 Claims, 52 Drawing Sheets

U.S. PATENT DOCUMENTS

| | | |
|---|---|---|
| 3,767,328 A | 10/1973 | Ladusaw |
| 3,783,681 A | 1/1974 | Hirt et al. |
| 3,924,972 A | 12/1975 | Szymaszek |
| 4,060,716 A | 11/1977 | Pekrul et al. |
| 4,090,248 A | 5/1978 | Swanson et al. |
| 4,102,150 A | 7/1978 | Kountz |
| 4,102,394 A | 7/1978 | Botts |
| 4,112,703 A | 9/1978 | Kountz |
| 4,132,086 A | 1/1979 | Kountz |
| 4,151,725 A | 5/1979 | Kountz et al. |
| 4,197,717 A | 4/1980 | Schumacher |
| 4,205,381 A | 5/1980 | Games et al. |
| 4,281,358 A | 7/1981 | Plouffe et al. |
| 4,308,725 A | 1/1982 | Chiyoda |
| 4,325,223 A | 4/1982 | Cantley |
| 4,345,162 A | 8/1982 | Hammer et al. |
| 4,372,119 A | 2/1983 | Gillbrand et al. |
| 4,384,462 A | 5/1983 | Overman et al. |
| 4,390,321 A | 6/1983 | Langlois et al. |
| 4,390,922 A | 6/1983 | Pelliccia |
| 4,399,548 A | 8/1983 | Castleberry |
| 4,420,947 A | 12/1983 | Yoshino |
| 4,425,010 A | 1/1984 | Bryant et al. |
| 4,429,578 A | 2/1984 | Darrel et al. |
| 4,434,390 A | 2/1984 | Elms |
| 4,463,576 A | 8/1984 | Burnett et al. |
| 4,467,613 A | 8/1984 | Behr et al. |
| 4,470,092 A | 9/1984 | Lombardi |
| 4,479,389 A | 10/1984 | Anderson, III et al. |
| 4,494,383 A | 1/1985 | Nagatomo et al. |
| 4,497,031 A | 1/1985 | Froehling et al. |
| 4,502,842 A | 3/1985 | Currier et al. |
| 4,502,843 A | 3/1985 | Martin |
| 4,505,125 A | 3/1985 | Baglione |
| 4,506,518 A | 3/1985 | Yoshikawa et al. |
| 4,510,576 A | 4/1985 | MacArthur et al. |
| 4,520,674 A | 6/1985 | Canada et al. |
| 4,540,040 A | 9/1985 | Fukumoto et al. |
| 4,555,910 A | 12/1985 | Sturges |
| 4,563,878 A | 1/1986 | Baglione |
| 4,567,733 A | 2/1986 | Mecozzi |
| 4,575,318 A | 3/1986 | Blain |
| 4,580,947 A | 4/1986 | Shibata et al. |
| 4,604,036 A | 8/1986 | Sutou et al. |
| 4,611,470 A | 9/1986 | Enstrom |
| 4,614,089 A | 9/1986 | Dorsey |
| 4,630,670 A | 12/1986 | Wellman et al. |
| 4,653,280 A | 3/1987 | Hansen et al. |
| 4,655,688 A | 4/1987 | Bohn et al. |
| 4,660,386 A | 4/1987 | Hansen et al. |
| 4,703,325 A | 10/1987 | Chamberlin et al. |
| 4,715,792 A | 12/1987 | Nishizawa et al. |
| 4,716,957 A | 1/1988 | Thompson et al. |
| 4,755,957 A | 7/1988 | White et al. |
| 4,768,346 A | 9/1988 | Mathur |
| 4,787,213 A | 11/1988 | Gras et al. |
| 4,796,466 A | 1/1989 | Farmer |
| 4,798,055 A | 1/1989 | Murray et al. |
| 4,831,560 A | 5/1989 | Zaleski |
| 4,831,832 A | 5/1989 | Alsenz |
| 4,838,037 A | 6/1989 | Wood |
| 4,843,575 A | 6/1989 | Crane |
| 4,856,286 A | 8/1989 | Sulfstede et al. |
| 4,877,382 A | 10/1989 | Caillat et al. |
| 4,881,184 A | 11/1989 | Abegg, III et al. |
| 4,882,747 A | 11/1989 | Williams |
| 4,884,412 A | 12/1989 | Sellers et al. |
| 4,885,707 A | 12/1989 | Nichol et al. |
| 4,904,993 A | 2/1990 | Sato |
| 4,909,076 A | 3/1990 | Busch et al. |
| 4,913,625 A | 4/1990 | Gerlowski |
| 4,924,404 A | 5/1990 | Reinke, Jr. |
| 4,928,750 A | 5/1990 | Nurczyk |
| 4,949,550 A | 8/1990 | Hanson |
| 4,964,060 A | 10/1990 | Hartsog |
| 4,974,427 A | 12/1990 | Diab |
| 4,985,857 A | 1/1991 | Bajpai et al. |
| 4,990,893 A | 2/1991 | Kiluk |
| 5,009,074 A | 4/1991 | Goubeaux et al. |
| 5,018,357 A | 5/1991 | Livingstone et al. |
| 5,022,234 A | 6/1991 | Goubeaux et al. |
| 5,051,720 A | 9/1991 | Kittirutsunetorn |
| 5,056,036 A | 10/1991 | Van Bork |
| 5,058,388 A | 10/1991 | Shaw et al. |
| 5,070,468 A | 12/1991 | Niinomi et al. |
| 5,071,065 A | 12/1991 | Aalto et al. |
| 5,073,862 A | 12/1991 | Carlson |
| 5,076,067 A | 12/1991 | Prenger et al. |
| 5,086,385 A | 2/1992 | Launey et al. |
| 5,088,297 A | 2/1992 | Maruyama et al. |
| 5,099,654 A | 3/1992 | Baruschke et al. |
| 5,109,222 A | 4/1992 | Welty |
| 5,109,700 A | 5/1992 | Hicho |
| 5,115,406 A | 5/1992 | Zatezalo et al. |
| 5,115,967 A | 5/1992 | Wedekind |
| 5,119,466 A | 6/1992 | Suzuki |
| 5,131,237 A | 7/1992 | Valbjorn |
| 5,156,539 A | 10/1992 | Anderson et al. |
| 5,181,389 A | 1/1993 | Hanson et al. |
| 5,203,178 A | 4/1993 | Shyu |
| 5,203,179 A | 4/1993 | Powell |
| 5,209,076 A | 5/1993 | Kauffman et al. |
| 5,209,400 A | 5/1993 | Winslow et al. |
| 5,224,835 A | 7/1993 | Oltman |
| 5,226,472 A | 7/1993 | Benevelli et al. |
| 5,228,304 A | 7/1993 | Ryan |
| 5,241,664 A | 8/1993 | Ohba et al. |
| 5,243,827 A | 9/1993 | Hagita et al. |
| 5,265,434 A | 11/1993 | Alsenz |
| 5,279,458 A | 1/1994 | DeWolf et al. |
| 5,282,728 A | 2/1994 | Swain |
| 5,284,026 A | 2/1994 | Powell |
| 5,299,504 A | 4/1994 | Abele |
| 5,303,560 A | 4/1994 | Hanson et al. |
| 5,311,451 A | 5/1994 | Barrett |
| 5,316,448 A | 5/1994 | Ziegler et al. |
| 5,335,507 A | 8/1994 | Powell |
| 5,362,206 A | 11/1994 | Westerman et al. |
| 5,381,692 A | 1/1995 | Winslow et al. |
| 5,395,042 A | 3/1995 | Riley et al. |
| 5,415,008 A | 5/1995 | Bessler |
| 5,416,781 A | 5/1995 | Ruiz |
| 5,423,190 A | 6/1995 | Friedland |
| 5,423,192 A | 6/1995 | Young et al. |
| 5,426,952 A | 6/1995 | Bessler |
| 5,431,026 A | 7/1995 | Jaster |
| 5,435,145 A | 7/1995 | Jaster |
| 5,440,890 A | 8/1995 | Bahel et al. |
| 5,440,891 A | 8/1995 | Hindmon, Jr. et al. |
| 5,440,895 A | 8/1995 | Bahel et al. |
| 5,446,677 A | 8/1995 | Jensen et al. |
| 5,450,359 A | 9/1995 | Sharma et al. |
| 5,452,291 A | 9/1995 | Eisenhandler et al. |
| 5,454,229 A | 10/1995 | Hanson et al. |
| 5,457,965 A | 10/1995 | Blair et al. |
| 5,460,006 A | 10/1995 | Torimitsu |
| 5,467,264 A | 11/1995 | Rauch et al. |
| 5,481,481 A | 1/1996 | Frey et al. |
| 5,481,884 A | 1/1996 | Scoccia |
| 5,483,141 A | 1/1996 | Uesugi |
| 5,509,786 A | 4/1996 | Mizutani et al. |
| 5,511,387 A | 4/1996 | Tinsler |
| 5,515,692 A | 5/1996 | Sterber et al. |
| 5,519,301 A | 5/1996 | Yoshida et al. |
| 5,528,908 A | 6/1996 | Bahel et al. |
| 5,546,756 A | 8/1996 | Ali |
| 5,546,757 A | 8/1996 | Whipple, III |
| 5,548,966 A | 8/1996 | Tinsler |
| 5,555,195 A | 9/1996 | Jensen et al. |
| 5,570,085 A | 10/1996 | Bertsch |
| 5,570,258 A | 10/1996 | Manning |
| 5,572,643 A | 11/1996 | Judson |
| 5,586,445 A | 12/1996 | Bessler |
| 5,596,507 A | 1/1997 | Jones et al. |
| 5,602,749 A | 2/1997 | Vosburgh |
| 5,602,757 A | 2/1997 | Haseley et al. |
| 5,610,339 A | 3/1997 | Haseley et al. |

| | | |
|---|---|---|
| 5,630,325 A | 5/1997 | Bahel et al. |
| 5,641,270 A | 6/1997 | Sgourakes et al. |
| 5,655,379 A | 8/1997 | Jaster et al. |
| 5,655,380 A | 8/1997 | Calton |
| 5,689,963 A | 11/1997 | Bahel et al. |
| 5,694,010 A | 12/1997 | Oomura et al. |
| 5,696,501 A | 12/1997 | Ouellette et al. |
| 5,707,210 A | 1/1998 | Ramsey et al. |
| 5,713,724 A | 2/1998 | Centers et al. |
| 5,715,704 A | 2/1998 | Cholkeri et al. |
| 5,724,571 A | 3/1998 | Woods |
| 5,741,120 A | 4/1998 | Bass et al. |
| 5,743,109 A | 4/1998 | Schulak |
| 5,745,114 A | 4/1998 | King et al. |
| 5,752,385 A | 5/1998 | Nelson |
| 5,761,083 A | 6/1998 | Brown, Jr. et al. |
| 5,764,509 A | 6/1998 | Gross et al. |
| 5,867,998 A | 2/1999 | Guertin |
| 5,875,430 A | 2/1999 | Koether |
| 5,875,638 A | 3/1999 | Tinsler |
| 5,900,801 A | 5/1999 | Heagle et al. |
| 5,904,049 A | 5/1999 | Jaster et al. |
| 5,924,295 A | 7/1999 | Park |
| 5,930,773 A | 7/1999 | Crooks et al. |
| 5,939,974 A | 8/1999 | Heagle et al. |
| 5,946,922 A | 9/1999 | Viard et al. |
| 5,947,693 A | 9/1999 | Yang |
| 5,953,490 A | 9/1999 | Wiklund et al. |
| 5,956,658 A | 9/1999 | McMahon |
| 5,975,854 A | 11/1999 | Culp, III et al. |
| 5,984,645 A | 11/1999 | Cummings |
| 5,986,571 A | 11/1999 | Flick |
| 6,006,171 A | 12/1999 | Vines et al. |
| 6,035,661 A | 3/2000 | Sunaga et al. |
| 6,038,871 A | 3/2000 | Gutierrez et al. |
| 6,047,557 A | 4/2000 | Pham et al. |
| 6,052,731 A | 4/2000 | Holdsworth et al. |
| 6,081,750 A | 6/2000 | Hoffberg et al. |
| 6,088,659 A | 7/2000 | Kelley et al. |
| 6,088,688 A | 7/2000 | Crooks et al. |
| 6,098,893 A | 8/2000 | Berglund et al. |
| 6,122,603 A | 9/2000 | Budike, Jr. |
| 6,125,642 A | 10/2000 | Seener et al. |
| 6,129,527 A | 10/2000 | Donahoe et al. |
| 6,138,461 A | 10/2000 | Park et al. |
| 6,145,328 A | 11/2000 | Choi |
| 6,153,942 A | 11/2000 | Roseman et al. |
| 6,153,993 A | 11/2000 | Oomura et al. |
| 6,169,979 B1 | 1/2001 | Johnson |
| 6,176,686 B1 | 1/2001 | Wallis et al. |
| 6,178,362 B1 | 1/2001 | Woolard et al. |
| 6,179,214 B1 | 1/2001 | Key et al. |
| 6,191,545 B1 | 2/2001 | Kawabata et al. |
| 6,213,731 B1 | 4/2001 | Doepker et al. |
| 6,215,405 B1 | 4/2001 | Handley et al. |
| 6,223,544 B1 | 5/2001 | Seem |
| 6,240,733 B1 | 6/2001 | Brandon et al. |
| 6,240,736 B1 | 6/2001 | Fujita et al. |
| 6,244,061 B1 | 6/2001 | Takagi et al. |
| 6,266,968 B1 | 7/2001 | Redlich |
| 6,268,664 B1 | 7/2001 | Rolls et al. |
| 6,272,868 B1 | 8/2001 | Grabon et al. |
| 6,276,901 B1 | 8/2001 | Farr et al. |
| 6,290,043 B1 | 9/2001 | Ginder et al. |
| 6,293,114 B1 | 9/2001 | Kamemoto |
| 6,302,654 B1 | 10/2001 | Millet et al. |
| 6,324,854 B1 | 12/2001 | Jayanth |
| 6,327,541 B1 | 12/2001 | Pitchford et al. |
| 6,334,093 B1 | 12/2001 | More |
| 6,349,883 B1 | 2/2002 | Simmons et al. |
| 6,366,889 B1 | 4/2002 | Zaloom |
| 6,378,315 B1 | 4/2002 | Gelber et al. |
| 6,393,848 B2 | 5/2002 | Roh et al. |
| 6,397,606 B1 | 6/2002 | Roh et al. |
| 6,408,258 B1 | 6/2002 | Richer |
| 6,453,687 B2 | 9/2002 | Sharood et al. |
| 6,466,971 B1 | 10/2002 | Humpleman et al. |
| 6,471,486 B1 | 10/2002 | Centers et al. |
| 6,487,457 B1 | 11/2002 | Hull et al. |
| 6,502,409 B1 | 1/2003 | Gatling et al. |
| 6,510,350 B1 | 1/2003 | Steen, III et al. |
| 6,526,766 B1 | 3/2003 | Hiraoka et al. |
| 6,529,839 B1 | 3/2003 | Uggerud et al. |
| 6,535,859 B1 | 3/2003 | Yablonowski et al. |
| 6,553,774 B1 | 4/2003 | Ishio et al. |
| 6,571,280 B1 | 5/2003 | Hubacher |
| 6,571,566 B1 | 6/2003 | Temple et al. |
| 6,574,561 B2 | 6/2003 | Alexander et al. |
| 6,577,962 B1 | 6/2003 | Afshari |
| 6,578,373 B1 | 6/2003 | Barbier |
| 6,583,720 B1 | 6/2003 | Quigley |
| 6,591,620 B2 | 7/2003 | Kikuchi et al. |
| 6,601,397 B2 | 8/2003 | Pham et al. |
| 6,609,078 B2 | 8/2003 | Starling et al. |
| 6,618,709 B1 | 9/2003 | Sneeringer |
| 6,622,925 B2 | 9/2003 | Carner et al. |
| 6,636,893 B1 | 10/2003 | Fong |
| 6,662,584 B1 | 12/2003 | Whiteside |
| 6,675,591 B2 | 1/2004 | Singh et al. |
| 6,708,508 B2 | 3/2004 | Demuth et al. |
| 6,785,592 B1 | 8/2004 | Smith et al. |
| 6,816,811 B2 | 11/2004 | Seem |
| 6,889,173 B2 * | 5/2005 | Singh ........................... 702/188 |
| 6,892,546 B2 | 5/2005 | Singh et al. |
| 6,900,738 B2 | 5/2005 | Crichlow |
| 6,904,385 B1 | 6/2005 | Budike, Jr. |
| 6,922,155 B1 | 7/2005 | Evans et al. |
| 6,968,295 B1 | 11/2005 | Carr |
| 6,978,225 B2 | 12/2005 | Retlich et al. |
| 6,990,821 B2 | 1/2006 | Singh et al. |
| 6,996,441 B1 | 2/2006 | Tobias |
| 6,997,390 B2 | 2/2006 | Alles |
| 7,003,378 B2 | 2/2006 | Poth |
| 7,024,870 B2 | 4/2006 | Singh et al. |
| 7,039,532 B2 | 5/2006 | Hunter |
| 7,043,339 B2 | 5/2006 | Maeda et al. |
| 7,043,459 B2 | 5/2006 | Peevey |
| 7,091,847 B2 | 8/2006 | Capowski et al. |
| 7,114,343 B2 | 10/2006 | Kates |
| 7,130,832 B2 | 10/2006 | Bannai et al. |
| 7,159,408 B2 | 1/2007 | Sadegh et al. |
| 7,246,014 B2 | 7/2007 | Forth et al. |
| 7,290,398 B2 | 11/2007 | Wallace et al. |
| 7,328,192 B1 | 2/2008 | Stengard et al. |
| 7,330,886 B2 | 2/2008 | Childers et al. |
| 7,337,191 B2 | 2/2008 | Haeberle et al. |
| 7,440,560 B1 | 10/2008 | Barry |
| 7,454,439 B1 | 11/2008 | Gansner et al. |
| 7,490,477 B2 | 2/2009 | Singh et al. |
| 7,555,364 B2 | 6/2009 | Poth et al. |
| 7,594,407 B2 | 9/2009 | Singh et al. |
| 7,596,959 B2 | 10/2009 | Singh et al. |
| 7,636,901 B2 | 12/2009 | Munson et al. |
| 7,644,591 B2 | 1/2010 | Singh et al. |
| 7,665,315 B2 | 2/2010 | Singh et al. |
| 7,752,853 B2 | 7/2010 | Singh et al. |
| 7,752,854 B2 | 7/2010 | Singh et al. |
| 7,844,366 B2 | 11/2010 | Singh |
| 7,885,959 B2 | 2/2011 | Horowitz et al. |
| 7,885,961 B2 | 2/2011 | Horowitz et al. |
| 8,065,886 B2 | 11/2011 | Singh et al. |
| 2001/0025349 A1 | 9/2001 | Sharood et al. |
| 2001/0054291 A1 | 12/2001 | Roh et al. |
| 2002/0000092 A1 | 1/2002 | Sharood et al. |
| 2002/0020175 A1 | 2/2002 | Street et al. |
| 2002/0029575 A1 | 3/2002 | Okamoto |
| 2002/0082924 A1 | 6/2002 | Koether |
| 2002/0103655 A1 | 8/2002 | Boies et al. |
| 2002/0118106 A1 | 8/2002 | Brenn |
| 2002/0143482 A1 | 10/2002 | Karanam et al. |
| 2002/0161545 A1 | 10/2002 | Starling et al. |
| 2002/0163436 A1 | 11/2002 | Singh et al. |
| 2002/0173929 A1 | 11/2002 | Seigel |
| 2002/0198629 A1 | 12/2002 | Ellis |
| 2003/0004660 A1 | 1/2003 | Hunter |
| 2003/0005710 A1 | 1/2003 | Singh et al. |
| 2003/0070438 A1 | 4/2003 | Kikuchi et al. |
| 2003/0077179 A1 | 4/2003 | Collins et al. |

| | | | |
|---|---|---|---|
| 2003/0213851 A1 | 11/2003 | Burd et al. | |
| 2003/0216888 A1 | 11/2003 | Ridolfo | |
| 2004/0019584 A1 | 1/2004 | Greening et al. | |
| 2004/0068390 A1 | 4/2004 | Saunders | |
| 2004/0159113 A1 | 8/2004 | Singh et al. | |
| 2004/0239266 A1 | 12/2004 | Lee et al. | |
| 2004/0261431 A1 | 12/2004 | Singh et al. | |
| 2005/0043923 A1 | 2/2005 | Forster et al. | |
| 2005/0073532 A1 | 4/2005 | Scott et al. | |
| 2005/0086341 A1 | 4/2005 | Enga et al. | |
| 2005/0126190 A1 | 6/2005 | Lifson et al. | |
| 2005/0131624 A1 | 6/2005 | Gaessler et al. | |
| 2005/0169636 A1 | 8/2005 | Aronson et al. | |
| 2005/0198063 A1 | 9/2005 | Thomas et al. | |
| 2005/0204756 A1 | 9/2005 | Dobmeier et al. | |
| 2006/0020426 A1 | 1/2006 | Singh | |
| 2006/0021362 A1 | 2/2006 | Sadegh et al. | |
| 2006/0032245 A1 | 2/2006 | Kates | |
| 2006/0074917 A1 | 4/2006 | Chand et al. | |
| 2006/0138866 A1 | 6/2006 | Bergmann et al. | |
| 2006/0242200 A1 | 10/2006 | Horowitz et al. | |
| 2006/0271589 A1 | 11/2006 | Horowitz et al. | |
| 2006/0271623 A1 | 11/2006 | Horowitz et al. | |
| 2007/0006124 A1 | 1/2007 | Ahmed et al. | |
| 2007/0089434 A1 | 4/2007 | Singh et al. | |
| 2007/0089439 A1 | 4/2007 | Singh et al. | |
| 2007/0239894 A1 | 10/2007 | Thind et al. | |
| 2008/0058970 A1 | 3/2008 | Perumalsamy et al. | |
| 2009/0093916 A1 | 4/2009 | Parsonnet et al. | |
| 2010/0179703 A1 | 7/2010 | Singh et al. | |
| 2011/0071960 A1 | 3/2011 | Singh | |

FOREIGN PATENT DOCUMENTS

| | | |
|---|---|---|
| DE | 764179 C | 4/1953 |
| DE | 1144461 B | 2/1963 |
| DE | 1403516 A1 | 10/1968 |
| DE | 1403467 A1 | 10/1969 |
| DE | 3133502 A1 | 6/1982 |
| DE | 3422398 A1 | 12/1985 |
| EP | 0085246 A1 | 8/1983 |
| EP | 0254253 A2 | 1/1988 |
| EP | 0351833 A2 | 1/1990 |
| EP | 0410330 A2 | 1/1991 |
| EP | 0419857 A2 | 4/1991 |
| EP | 0453302 A1 | 10/1991 |
| EP | 0479421 A1 | 4/1992 |
| EP | 0557023 A1 | 8/1993 |
| EP | 0579374 A1 | 1/1994 |
| EP | 0660213 A2 | 6/1995 |
| EP | 0747598 A2 | 12/1996 |
| EP | 0877462 A2 | 11/1998 |
| EP | 0982497 A1 | 3/2000 |
| EP | 1008816 A2 | 6/2000 |
| EP | 1087142 A2 | 3/2001 |
| EP | 1138949 A2 | 10/2001 |
| EP | 1139037 A1 | 10/2001 |
| EP | 1187021 A2 | 3/2002 |
| EP | 1209427 A1 | 5/2002 |
| EP | 1241417 A1 | 9/2002 |
| EP | 1393034 A1 | 3/2004 |
| FR | 2582430 A1 | 11/1986 |
| FR | 2589561 A1 | 5/1987 |
| FR | 2628558 A1 | 9/1989 |
| FR | 2660739 A1 | 10/1991 |
| GB | 2062919 A | 5/1981 |
| GB | 2064818 A | 6/1981 |
| GB | 2116635 A | 9/1983 |
| JP | 5610639 | 2/1981 |
| JP | 59145392 A | 8/1984 |
| JP | 61046485 A | 3/1986 |
| JP | 62116844 A | 5/1987 |
| JP | 01014554 A | 1/1989 |
| JP | 02110242 A | 4/1990 |
| JP | 02294580 A | 12/1990 |
| JP | 04080578 A | 3/1992 |
| JP | 06058273 A | 3/1994 |
| JP | 08087229 A | 4/1996 |
| JP | 08284842 A | 10/1996 |
| JP | 2003018883 A | 1/2003 |
| JP | 2005241089 A | 9/2005 |
| JP | 2005345096 A | 12/2005 |
| WO | 8601262 A1 | 2/1986 |
| WO | 8703988 A1 | 7/1987 |
| WO | 8802527 A1 | 4/1988 |
| WO | 9718636 A2 | 5/1997 |
| WO | 9748161 A1 | 12/1997 |
| WO | 9917066 A1 | 4/1999 |
| WO | 0214968 A1 | 2/2002 |
| WO | 02090840 A2 | 11/2002 |
| WO | 02090913 A1 | 11/2002 |
| WO | 02090914 A1 | 11/2002 |
| WO | 2005022049 A2 | 3/2005 |
| WO | 2006091521 A2 | 8/2006 |
| WO | 2010138831 A2 | 12/2010 |

OTHER PUBLICATIONS

European Search Report regarding Application No. EP02729051, dated Feb. 17, 2005.
Second Examination Communication regarding European Application No. EP02729051.9, dated Jul. 3, 2006.
First Examination Communication regarding European Application No. EP02729051.9, dated Dec. 23, 2005.
International Preliminary Examination Report regarding PCT/US02/13459, dated Sep. 15, 2003.
Written Opinion regarding PCT/US02/13459, dated Apr. 23, 2003.
Final Office Action regarding U.S. Appl. No. 11/337,918, dated Feb. 17, 2011.
International Search Report regarding Application No. PCT/US2010/036601, mailed Dec. 29, 2010.
Written Opinion of the International Searching Authority regarding Application No. PCT/US2010/036601, mailed Dec. 29, 2010.
Notice of Allowance regarding U.S. Appl. No. 12/685,424, dated Apr. 25, 2011.
Office Action regarding U.S. Appl. No. 10/675,137, dated Sep. 7, 2004.
Office Action regarding U.S. Appl. No. 10/675,137, dated Feb. 4, 2005.
Office Action regarding U.S. Appl. No. 10/675,137, dated Jun. 29, 2005.
Notice of Allowance and Notice of Allowability regarding U.S. Appl. No. 10/675,137, dated Dec. 16, 2005.
European Search Report for EP 01 30 1752; Mar. 26, 2002; 4 Pages.
European Search Report for EP 01 30 7547; Feb. 20, 2002; 1 Page.
European Search Report for EP 02 25 0266; May 17, 2002; 3 Pages.
European Search Report for EP 02 72 9050, Jun. 17, 2004, 2 pages.
Supplementary European Search Report for EP 02 73 1544, Jun. 18, 2004, 2 Pages.
European Search Report for EP 82306809.3; Apr. 28, 1983; 1 Page.
European Search Report for EP 91 30 3518; Jul. 22, 1991; 1 Page.
European Search Report for EP 93 30 4470; Oct. 26, 1993; 1 Page.
European Search Report for EP 94 30 3484; Apr. 3, 1997; 1 Page.
European Search Report for EP 96 30 4219; Dec. 1, 1998; 2 Pages.
European Search Report for EP 98 30 3525; May 28, 1999; 2 Pages.
European Search Report for EP 99 30 6052; Dec. 28, 1999; 3 Pages.
First Office Action from the Patent Office of the People's Republic of China dated Jun. 8, 2007, Application No. 200480027753.6 and Translation provided by CCPIT.
First Official Report regarding Australian Patent Application No. 2007214381, dated Dec. 12, 2008.
International Search Report for PCT/US02/13459; ISA/US; date mailed Sep. 19, 2002.
International Search Report, Int'l. App. No. PCT/US 06/05917, dated Sep. 26, 2007.
International Search Report; International Application No. PCT/IB96/01435; May 23, 1997; 1 Page.
International Search Report; International Application No. PCT/US98/18710; Jan. 26, 1999; 1 Page.
Intl Search Report for PCT/US02/13456 dated Aug. 22, 2002.
Intl Search Report for PCT/US06/040964, dated Feb. 15, 2007.
Intl Search Report for PCT/US2004/027654 dated Aug. 25, 2004, 4 Pages.

Liao et al., "A Correlation of Optimal Heat Rejection Pressures in Transcritical Carbon Dioxide Cycles," Applied Thermal Engineering 20 (2000) 831-841.

Pin Carmen, Baranyi Jozsef, P, "Predictive models as means to quantify the interactions of spoilage organisms," International Journal of Food Microbiology, 41 (1998) 59-72.

Second Official Report regarding Australian Patent Application No. 2007214381, dated Oct. 30, 2009.

Supplementary European Search Report regarding Application No. PCT/US2006/005917, dated Nov. 23, 2009.

Torcellini, P., et al., "Evaluation of the Energy Performance and Design Process of the Thermal Test Facility at the National Renewable Energy Laboratory", dated Feb. 2005.

Vandenbrink et al., "Design of a Refrigeration Cycle Evaporator Unit," Apr. 18, 2003.

Written Opinion of the International Searching Authority, Int'l. App. No. PCT/US 06/05917, dated Sep. 26, 2007.

Office Action regarding U.S. Appl. No. 10/061,964, dated Oct. 3, 2003.

Final Office Action regarding U.S. Appl. No. 10/061,964, dated Mar. 8, 2004.

Notice of Allowance regarding U.S. Appl. No. 10/061,964, dated Jul. 19, 2004.

Restriction Requirement regarding U.S. Appl. No. 10/940,877, dated Jul. 25, 2005.

Office Action regarding U.S. Appl. No. 10/940,877, dated Nov. 14, 2005.

Final Office Action regarding U.S. Appl. No. 10/940,877, dated May 2, 2006.

Office Action regarding U.S. Appl. No. 10/940,877, dated Oct. 27, 2006.

Examiner Interview Summary regarding U.S. Appl. No. 10/940,877, dated Mar. 2, 2007.

Office Action regarding U.S. Appl. No. 10/940,877, dated May 21, 2007.

Final Office Action regarding U.S. Appl. No. 10/940,877, dated Nov. 13, 2007.

Examiner Interview Summary regarding U.S. Appl. No. 10/940,877, dated Mar. 25, 2008.

Office Action regarding U.S. Appl. No. 10/940,877, dated Jun. 5, 2008.

Office Action regarding U.S. Appl. No. 10/940,877, dated Dec. 8, 2008.

Examiner Interview Summary regarding U.S. Appl. No. 10/940,877, dated Dec. 8, 2008.

Final Office Action regarding U.S. Appl. No. 10/940,877, dated Apr. 27, 2009.

Notice of Allowance regarding U.S. Appl. No. 10/940,877, dated Sep. 4, 2009.

Notice of Allowance for U.S. Appl. No. 10/698,048, dated Sep. 1, 2005.

Office Action regarding U.S. Appl. No. 10/698,048, dated Mar. 21, 2005.

Office Action regarding U.S. Appl. No. 11/337,918, dated Mar. 25, 2008.

Office Action regarding U.S. Appl. No. 11/337,918, dated Oct. 28, 2008.

Office Action regarding U.S. Appl. No. 11/337,918, dated Aug. 17, 2009.

Final Office action regarding U.S. Appl. No. 11/337,918, dated Feb. 4, 2010.

UltraSite User's Guide, Computer Process Controls, Apr. 1, 1996.

UltraSite User's Guide RMCC Supplement, Computer Process Controls, Jun. 9, 1997.

UltraSite User's Guide BCU Supplement, Computer Process Controls, Sep. 4, 1997.

UltraSite User's Guide BEC Supplement, Computer Process Controls, Oct. 6, 1997.

UltraSite 32 User's Guide, Computer Process Controls, Sep. 28, 1999.

Office Action regarding U.S. Appl. No. 10/286,419, dated Jun. 10, 2004.

Notice of Allowance and Notice of Allowability regarding U.S. Appl. No. 10/286,419, dated Dec. 2, 2004.

Office Action regarding U.S. Appl. No. 11/120,166, dated Oct. 2, 2006.

Office Action regarding U.S. Appl. No. 11/120,166, dated Apr. 12, 2007.

Office Action regarding U.S. Appl. No. 11/120,166, dated Oct. 2, 2007.

Office Action regarding U.S. Appl. No. 11/120,166, dated Jun. 5, 2008.

Office Action regarding U.S. Appl. No. 11/120,166, dated Dec. 15, 2008.

Office Action regarding U.S. Appl. No. 11/120,166, dated Jul. 20, 2009.

Office Action regarding U.S. Appl. No. 11/120,166, dated Feb. 17, 2010.

Non-Final Office Action regarding U.S. Appl. No. 12/955,355, dated Sep. 11, 2012.

Office Action regarding U.S. Appl. No. 13/303,286, dated Mar. 26, 2012.

Notice of Allowance regarding U.S. Appl. No. 13/303,286, dated Jul. 19, 2012.

* cited by examiner

From: admin@set-point-monitor-server.com
Sent: Sunday, March 1, 2009 9:30 AM
To: "contractor 1" c1@c1.com
Subject: Your Attention Needed on Setpoint Exceptions Contractor or Service Provider, Please resolve the Setpoint Exceptions available at:

Setpoint Exceptions

If the above link does not work, copy and past the following link into your browser:

http://www.set-point-monitor-server.com/contractor_1/setpoint_exceptions

Thank you.

Admin
Set-Point Monitor Server

*Figure 26*

Contractor Setpoint Exceptions

| Site | Verification Date | Original Change | App. Type | App. Instance | Setpoint | Benchmark | Current | Eng. Units | State | Energy Specialist Comment |
|---|---|---|---|---|---|---|---|---|---|---|
| ALL | | | ALL | ALL | ALL | | | ALL | | |
| site 1 | 3/1/09 9:30 AM | 3/1/09 9:30 AM | Condensers | COND FAN C | MIN TEMP STPT | 65.0 | 90.0 | ⁰F | Pending Fix | Past is not in setting ASAP per Corporate Spec. |
| site 1 | 3/1/09 9:30 AM | 3/1/09 9:30 AM | Condensers | COND FAN | MIN TEMP STPT | 95.0 | 45.0 | ⁰F | Corrected | Past is not in setting ASAP per Corporate Spec. |

*Figure 27*

| A.SW Min Humidity Setpoint | 38.0 | 55.0 | | Contested | Please return to benchmark ASAP per Corporate Spec. | Disagree | Doors were sweaty |

Setpoint Resolution Failures

From: 2/28/2009  To: 3/7/2009  Directory: All  [Generate Report]

☐ Count Partial Successes as Failure 137 items found, displaying 1 to 10.
Pages: [First/Prev] 1, 2, 3, 4, 5, 6, 7, 8, 9, 10, 11 [Next/Last]

| Contractor ▼ | Site | City | State | Result | Last Time Succeeded |
|---|---|---|---|---|---|
| contrctr 30 | site 30 | POLSON | MT | Never Ran | |
| contrctr 31 | site 31 | SEAL BEACH | CA | Failed 6 times | |
| contrctr 32 | site 32 | Vancouver | CA | Failed 2 times | 2/28/2009 9:00 pm |
| contrctr 33 | site 33 | BAKERSFIELD | CA | Failed 6 times | |
| contrctr 34 | site 34 | FRESNO | CA | Failed 6 times | |
| contrctr 35 | site 35 | PASADENA | CA | Never Ran | |
| contrctr 36 | site 36 | Chula Vista | CA | Failed 6 times | |
| contrctr 37 | site 37 | Vista | CA | Failed 6 times | |
| contrctr 38 | site 38 | Chula Vista | CA | Failed 6 times | |
| contrctr 39 | site 39 | ESCONDIDO | CA | Failed 6 times | 2/28/2009 9:30 pm |

137 items found, displaying 1 to 10.
Pages: [First/Prev] 1, 2, 3, 4, 5, 6, 7, 8, 9, 10, 11 [Next/Last]

Benefit-Loss Summary Report

From: Mar 2009  To: Apr 2009  Directory: All

[Generate Report]

Benefit Summary

| | Load Reverted | | Annualized Amount ($) |
|---|---|---|---|
| | | Sum of KWH | Amount ($) | |
| Changes Reverted prior to 3/2009 | 0 | 0.00 | $0.00 | $0.00 |
| Changes Reverted from 3/2009 through 4/2009 | 0 | 0.00 | $0.00 | $0.00 |
| | 0 | 0.00 | $0.00 | $0.00 |

3202

Leakage Summary

| | Cost Not Reverted | | | Annualized Amount ($) |
|---|---|---|---|---|
| | | Sum of KWH | Amount ($) | |
| Changes Created prior to 3/2009 but NOT Reverted | 0 | 0.00 | $0.00 | $0.00 |
| Changes Created from 3/2009 through 4/2009 but NOT Reverted | 97 | 12,765.18 | $11,278.51 | $135,720.84 |
| | 97 | 12,765.18 | $11,278.51 | $135,720.84 |

It seems that for "ComTrol XML" controllers whenever the "SUCT PRESS SETPT" is lowered by more than 17 psi you reject the setpoint change.

Please choose one of the following:

○ Automatically apply this rule to [Site 1 ▾] and reject all changes where the [ComTrol Xml ▾] "SUCT PRESS SETPT" has been lowered by more than [17] psi for Controllers. — 4100

○ Use this rule to mark setpoint exceptions for [Site 1 ▾] and mark all changes for rejection where the "SUCT PRESS SETPT" has been lowered by more than [17] psi for [ComTrol Xml ▾] Controllers. I will use the approve reject page to accept and reject all setpoint changes. — 4102

○ This is reasonable rule remind me later. — 4104
○ Don't ask me about anymore rules today.
○ This is not a good rule. — 4106

[ OK ]  [ Cancel ]

*Figure 41*

SYSTEM AND METHOD FOR MONITORING AND EVALUATING EQUIPMENT OPERATING PARAMETER MODIFICATIONS

CROSS-REFERENCE TO RELATED APPLICATIONS

This application claims the benefit of U.S. Provisional Application No. 61/182,436, filed on May 29, 2009. The entire disclosure of the above application is incorporated herein by reference.

FIELD

The present disclosure relates to monitoring equipment operating parameter modifications, evaluating an impact of operating parameter modifications, and, more particularly, to a system and method for monitoring and evaluating operating parameter modifications of equipment for refrigeration, HVAC, lighting, anti-condensate heating, and other systems.

BACKGROUND

This section includes certain background and other information related to the present disclosure and is not necessarily prior art.

Retail outlets, particularly food retailers, require a plurality of systems during operation. Such systems often include refrigeration, HVAC, lighting, anti-condensate heating (ACH), defrost, and other building control systems. Each of these systems include associated equipment to perform various functions. For example, refrigeration systems include compressors, condensers, evaporators, and the like, to cool refrigeration cases to a desired temperature.

The various types of equipment may operate at certain operating parameters, or setpoints. A setpoint may define an operating condition of the equipment and may be adjusted to provide a desired output from the equipment. For example, a setpoint of an electronic pressure regulator may be adjusted to maintain a desired pressure within an evaporator of a refrigeration system. Further, a compressor rack may have a suction pressure setpoint whereby capacity of the compressor rack is increased if monitored suction pressure exceeds the suction pressure setpoint and capacity of the compressor rack is decreased if monitored suction pressure falls below the suction pressure setpoint. Similarly, an HVAC system may have a room temperature setpoint whereby the HVAC system provides heating if the room temperature falls below the room temperature setpoint and/or provides cooling if the room temperature exceeds the room temperature setpoint.

Because the equipment of the various systems consumes power during operation, the amount of power consumed by a particular piece of equipment may be affected by the setpoint value. A modification of a setpoint value may result in increased or decreased energy consumption by the corresponding piece of equipment.

Generally, a retailer may configure particular systems of its associated retail locations to operate at an optimized level. Thus, optimized set points may be determined and set so that the systems operate in an efficient manner. However, setpoints may be modified for various reasons by contractors working at local retailer site locations. For example, setpoint changes may be made during maintenance or cleaning activities. Contractors at the site locations may not return the setpoints to their previous levels, resulting in undesired or inefficient operation of the corresponding equipment. Further, a setpoint modification may be made to respond to localized conditions. A contractor at a site location, however, may incorrectly adjust the setpoint or overcompensate for the localized condition. Additionally, a contractor may not adjust the correct setpoint to address the localized condition. Moreover, the adjustment of one or more setpoints to address a particular localized condition may have an effect on other systems at the local site, resulting in additional conditions for the contractor to address, and additional setpoint modifications for additional systems. As a result, the iterations of setpoint modifications may result in inefficient overall operation of the equipment.

Traditionally, it is difficult for a retailer to routinely monitor the setpoints of the systems and equipment at its various retail locations.

A system for monitoring optimal equipment operating parameters is described in the commonly assigned patent titled "System For Monitoring Optimal Equipment Operating Parameters," U.S. Pat. No. 6,889,173, issued on May 3, 2005, and in the commonly assigned application titled "System For Monitoring Optimal Equipment Operating Parameters," U.S. Pub. No. 2006/0020426, published on Jan. 26, 2006, both of which are explicitly incorporated herein by reference in their entirety. An enterprise control and monitoring system and method is described in the application titled "Enterprise Control and Monitoring System and Method," U.S. Pub. No. 2006/0242200, published on Oct. 26, 2006 and assigned to Computer Process Controls, Inc., which is also explicitly incorporated herein by reference in its entirety.

SUMMARY

This section provides a general summary of the disclosure, and is not a comprehensive disclosure of its full scope or all of its features.

A system is provided including a controller that operates at least one piece of equipment according to a current setpoint value, a setpoint monitor in communication with the controller that monitors the current setpoint value and compares the current setpoint value with a benchmark setpoint value. The system also includes a first terminal in communication with the setpoint monitor, the first terminal outputting the current setpoint value and the benchmark setpoint value and receiving input indicating one of approval of the current setpoint value or rejection of the current setpoint value. The second terminal is in communication with the setpoint monitor and outputs an indicator indicating that the current setpoint value has been rejected when the input to the first terminal indicates rejection of the current setpoint value. The second terminal receives input indicating one of agreement or disagreement with the rejection of the current setpoint value.

In other features, when the input to the first terminal indicates rejection of the current setpoint value, the first terminal receives data related to an explanation for the rejection.

In other features, the second terminal receives data related to an explanation for the disagreement with the rejection of the current setpoint value.

In other features, the setpoint monitor sends a notification indicating rejection of the current setpoint value.

In other features, the notification includes an email notification.

In other features, the setpoint monitor monitors a plurality of current setpoint values and compares each current setpoint value of the plurality with a corresponding benchmark setpoint value, and the first terminal receives input indicating one of approval of each current setpoint value or rejection of each current setpoint value.

In other features, when a plurality of the current setpoint values have been rejected, the setpoint monitor groups the plurality of the current setpoint values that have been rejected according to at least one of a corresponding system or a corresponding contractor associated with each current setpoint value that has been rejected.

In other features, the setpoint monitor sends a notification corresponding to each grouping of the plurality of current setpoint values that have been rejected.

In other features, the notification includes an email notification.

In other features, the controller operates the at least one piece of equipment according to the benchmark setpoint value when the indicator indicates that the current setpoint value has been rejected.

A method is also described that includes receiving a current setpoint value from a controller that operates at least one piece of equipment according to the current setpoint value, the current setpoint value being set by a first user. The method also includes comparing the current setpoint value with a benchmark setpoint value and outputting the current setpoint value and the benchmark setpoint value on a terminal when the current setpoint value is different than the benchmark setpoint value. The method also includes receiving, with the terminal, input from a second user indicating one of approval of the current setpoint value or rejection of the current setpoint value and notifying the first user that the current setpoint value has been rejected when the input from the second user indicates rejection of the current setpoint value. The method also includes communicating, to the terminal, input from the first user indicating one of agreement or disagreement with the rejection of the current setpoint value.

In other features, when the notification indicates that the current setpoint value has been rejected, the notification directs the first user to change the current setpoint value for the controller to the benchmark setpoint value.

In other features, when the input from the second user indicates rejection of the current setpoint value, the input from the second user includes data related to an explanation for rejection of the current setpoint value.

In other features, when the input from the first user to the terminal indicates disagreement with the rejection of the current setpoint value, the method may include communicating input from the first user to the terminal related to an explanation for the disagreement with the rejection of the current setpoint value.

In other features, notifying the first user includes sending an email notification to the first user.

In other features, the method may include determining an energy consumption loss associated with a difference between the current setpoint value and the benchmark setpoint value.

In other features, the method may include monitoring a plurality of current setpoint values, each current setpoint value being set by a corresponding first user, comparing each current setpoint value of the plurality with a corresponding benchmark setpoint value, and receiving input from a second user indicating one of approval of each current setpoint value or rejection of each current setpoint value.

In other features, the method may include determining a plurality of energy consumption loss values associated with a difference between each said current setpoint value of said plurality of current setpoint values and said corresponding benchmark setpoint value.

In other features, the plurality of current setpoint values may be set by a plurality of first users, and the method may include ranking the plurality of first users based on the plurality of energy consumption loss values.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of exemplary embodiments and not all possible implementations, and are not intended to limit the scope of the present disclosure.

FIG. 8 is a screenshot of a user interface for a setpoint modification monitoring system;

FIG. 25 is a screenshot of a user interface for a setpoint modification monitoring system;

FIG. 26 is a screenshot of a user interface for a setpoint modification monitoring system;

FIG. 27 is a screenshot of a user interface for a setpoint modification monitoring system;

FIG. 29 is a screenshot of a user interface for a setpoint modification monitoring system;

FIG. 30 is a screenshot of a user interface for a setpoint modification monitoring system;

FIG. 32 is a screenshot of a user interface for a setpoint modification monitoring system;

FIG. 36 is a screenshot of a user interface for a setpoint modification monitoring system;

FIG. 41 is a screenshot of a user interface for a setpoint modification monitoring system;

Corresponding reference numerals indicate corresponding parts throughout the several views of the drawings.

DETAILED DESCRIPTION

Example embodiments will now be described more fully with reference to the accompanying drawings.

As used herein, the term module, control module, computer, and/or controller refer to one or more of the following: a processor (shared, dedicated, or group) and memory that execute one or more software or firmware programs or a portion of one or more software or firmware programs; an application specific integrated circuit (ASIC); an electronic circuit; a combinational logic circuit; and/or other suitable components that provide the described functionality. As used herein, computer readable medium may refer to any medium capable of storing data for a computer or module, including, but not limited to, memory, RAM, ROM, PROM, EPROM, EEPROM, flash memory, CD-ROM, floppy disk, magnetic tape, other magnetic medium, optical medium, or any other device or medium capable of storing data that is readable by a computer.

The present system and method for monitoring and evaluating equipment operating parameter modifications provides a comprehensive tool for remote energy managers or energy specialists to monitor and evaluate equipment operating parameter, or setpoint, modifications made by contractors or other local repair persons or users at local site locations, to approve or reject each setpoint modification made at the local site location, to correspond with local users at the local site locations, to provide further instructions to local users with respect to the setpoint modification, to request additional information regarding the setpoint modification from the local users, to receive requested additional information from the local users, and to confirm whether the local users have agreed or disagreed with rejected setpoint modifications. In this way, the present system and method provides an interface for remote energy managers or energy specialists and local contractors or users to challenge and dispute each other with respect to proposed setpoint modifications.

Figure 1:
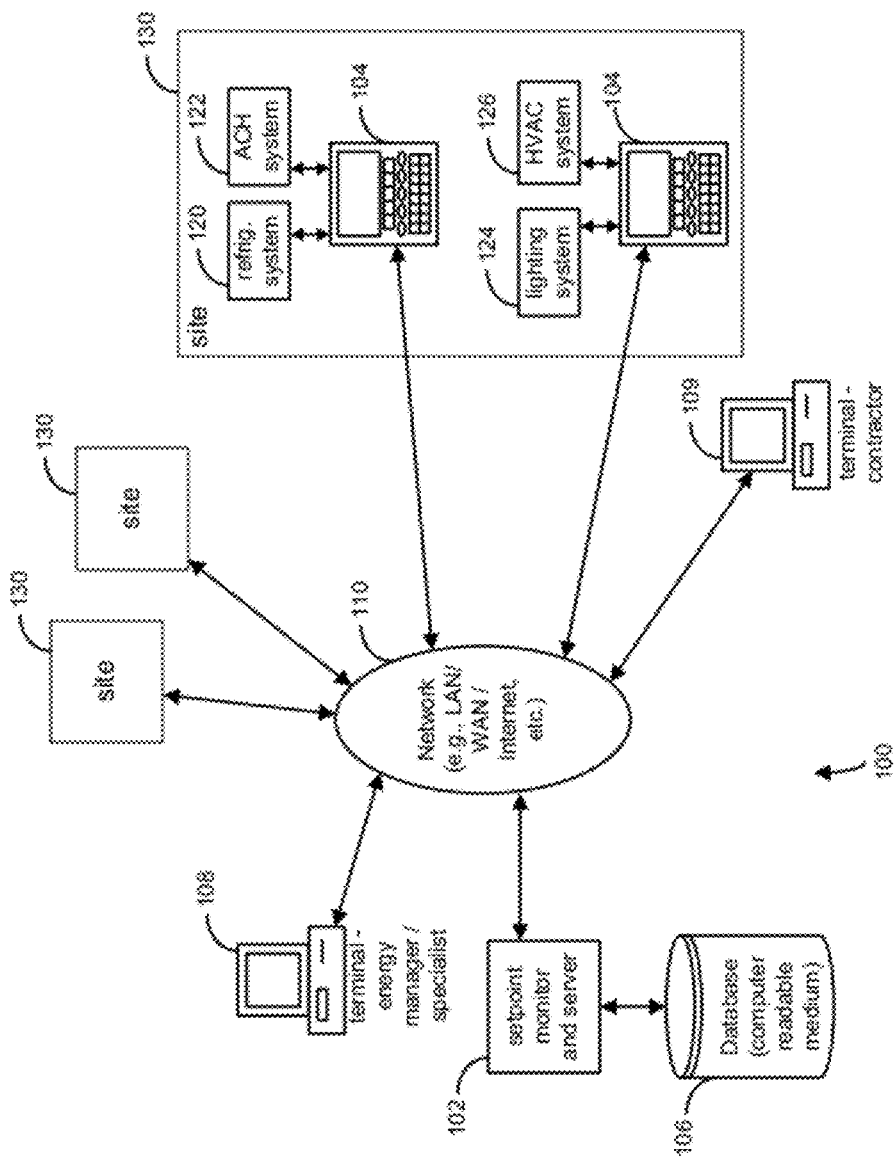
FIG. 1 is a schematic illustration of a setpoint modification monitoring system.

With reference to FIG. 1, a setpoint modification monitoring system 100 may include a setpoint monitor and server 102 in communication with one or more building system controllers 104 and with a database 106. Setpoint monitor and server 102 may be connected to and accessible by one or more computer terminals 108/109 through a connected network 110, such as a LAN, a WAN, the Internet, or other suitable network. Computer terminals 108/109 may access setpoint monitor and server 102, and the data stored within database 106, through a web-based user interface, as shown in FIGS. 3-25 and 27-36 and described in further detail below.

A single controller 104 may control one or more building systems 120, 122, 124, 126 located at a particular location or site 130. For example, a single controller 104 may control both a refrigeration system 120 and an ACH system 122. Further, a single controller 104 may also control both a lighting system 124 and an HVAC system 126. The controllers 104 may be Einstein or E2 controllers available from Computer Process Controls, Inc., 1640 Airport Road, Suite # 104, Kennesaw, Ga., 31044, such as the E2 RX refrigeration controller, the E2 BX HVAC controller, or the E2 CX convenience store controller. A single controller 104 may control a single building system, such as refrigeration system 120, ACH system 122, lighting system 124, or HVAC system 126 or any combination of refrigeration system 124, ACH system 122, lighting system 124, or HVAC system 126. While only one of the sites 130 is expanded in FIG. 1 to show controllers 104 and building systems 120, 122, 124, 126, it is understood that each of the sites may include controllers 104 and building systems 120, 122, 124, 126.

Controller 104 may store setpoints for any building systems 120, 122, 124, 126 under its control and may operate any building systems 120, 122, 124, 126 under its control according to the stored setpoints.

Controller 104 may communicate with setpoint monitor and server 102 through network 110. For example, setpoint monitor and server 102 may poll controllers 104 at each of the sites 130 to determine whether any setpoints have been modified at that particular controller 104. Setpoint monitor and server 102 may compare all setpoints associated with a particular controller 104 with the setpoints previously stored in database 106 for that particular controller 104 to determine whether any setpoints have been modified. Alternatively, controllers 104 may store a setpoint modification flag indicating setpoint modifications have been made at that particular controller 104. Controllers 104 may also maintain a log of setpoint modifications. In such case setpoint monitor and server 102 can check the log each time it polls the particular controller 104 to determine whether any setpoint modifications have occurred since the last time the particular controller 104 was polled.

Alternatively, controllers 104 may be configured to initiate communication with setpoint monitor and server 102 to alert setpoint monitor and server 102 each time a setpoint modification is made at the controller. In such case, setpoint monitor and server 102 may, at any time, have the most current and up-to-date data with respect to the setpoints associated with each controller 104. Alternatively, controllers 104 may be configured to report to setpoint monitor and server 102 at predetermined time intervals (e.g., once per day or once per hour) to update setpoint monitor and server 102 as to any setpoint modifications since the last report. For example, each controller 104 may communicate all of its associated setpoints to setpoint monitor and server 102 at the predetermined time. Setpoint monitor and server 102 can then compare each setpoint with the previously stored setpoints to determine whether a setpoint modification has occurred. For another example, each controller 104 may communicate setpoint modifications to setpoint monitor and server 102 at the predetermined time.

Exemplary building systems are described with reference to FIGS. 43-46.

Figure 43:
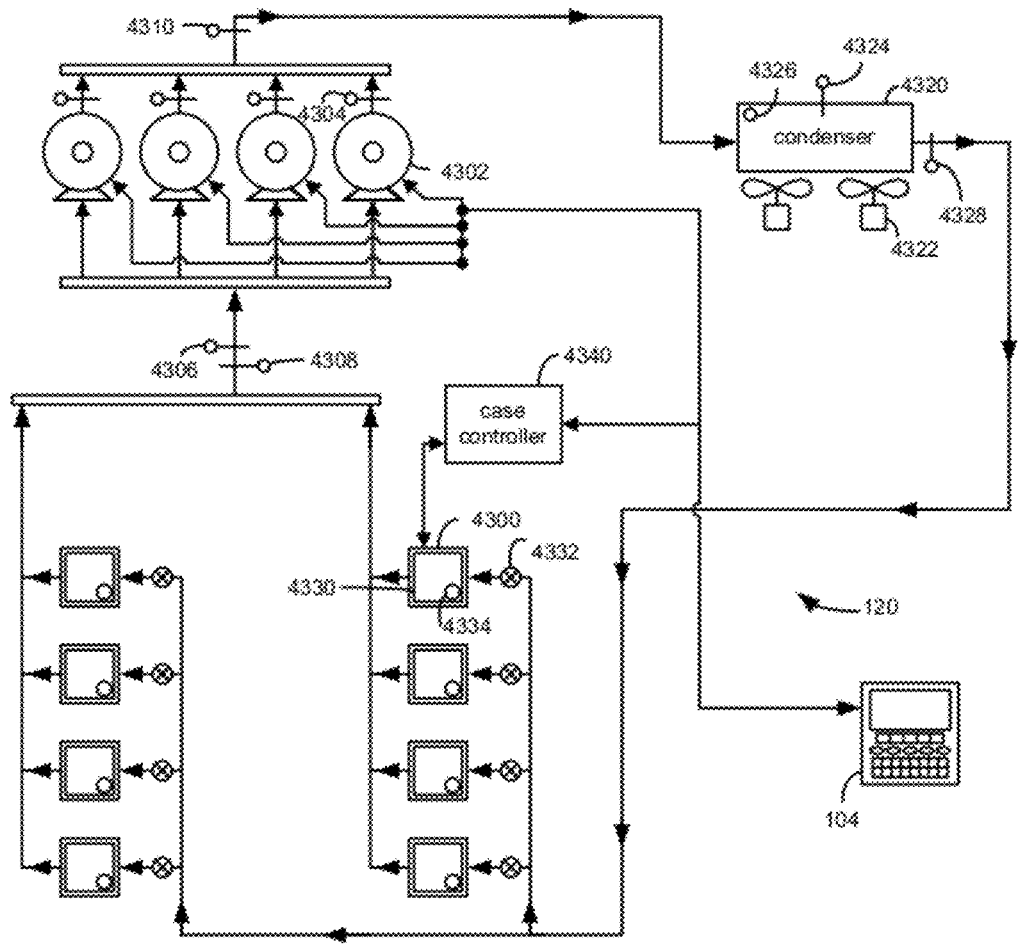
FIG. 43 is a schematic illustration of a refrigeration system.

In FIG. 43, a refrigeration system 120 may include refrigeration cases 4300, as well as a plurality of compressors 4302 piped together. A discharge output of each compressor may include a respective compressor temperature sensor 4304. A suction inlet may include both a suction pressure sensor 4306 and a suction temperature sensor 4308. Further, a discharge outlet may include a compressor discharge pressure sensor 4310. The various sensors may be connected to controller 104 which controls and monitors compressor operation.

Compressors 4302 compress refrigerant vapor that is delivered to a condenser 4320. Condenser fans 4322 may enable improved heat transfer from the condenser 4320. Condenser 4320 may include an associated ambient temperature sensor 4324, a condenser temperature sensor 4326, and a condenser discharge pressure sensor 4328. The various sensors may each be connected to the controller 104 which controls condenser fan operation.

Each refrigeration case 4300 may include its own evaporator 4330, its own expansion valve 4332 for controlling the superheat of the refrigerant, and its own temperature sensor 4334. A case controller 4340 may control the refrigeration cases 4300 and may be connected to controller 104. Additional case controllers 4340 may be used as needed. Alternatively, controller 104 may control refrigeration cases 4300 directly. Refrigerant passes through expansion valve 4332 where a pressure drop causes the high pressure liquid refrigerant to achieve a lower pressure combination of liquid and vapor. The temperature sensor 4334 may be connected to the case controller 4340 which communicates with controller 104.

As with all of the building systems, controller 104 may receive operating data for the refrigeration system 120 from the respective temperature, pressure, and current sensors. The operating data, along with various operating parameters such as the stored setpoints, may be used by the controller 104 to operate refrigeration system 120.

To adjust operation of refrigeration system 120, a user, such as a contractor, may input setpoint modifications into controller 104.

Figure 44:
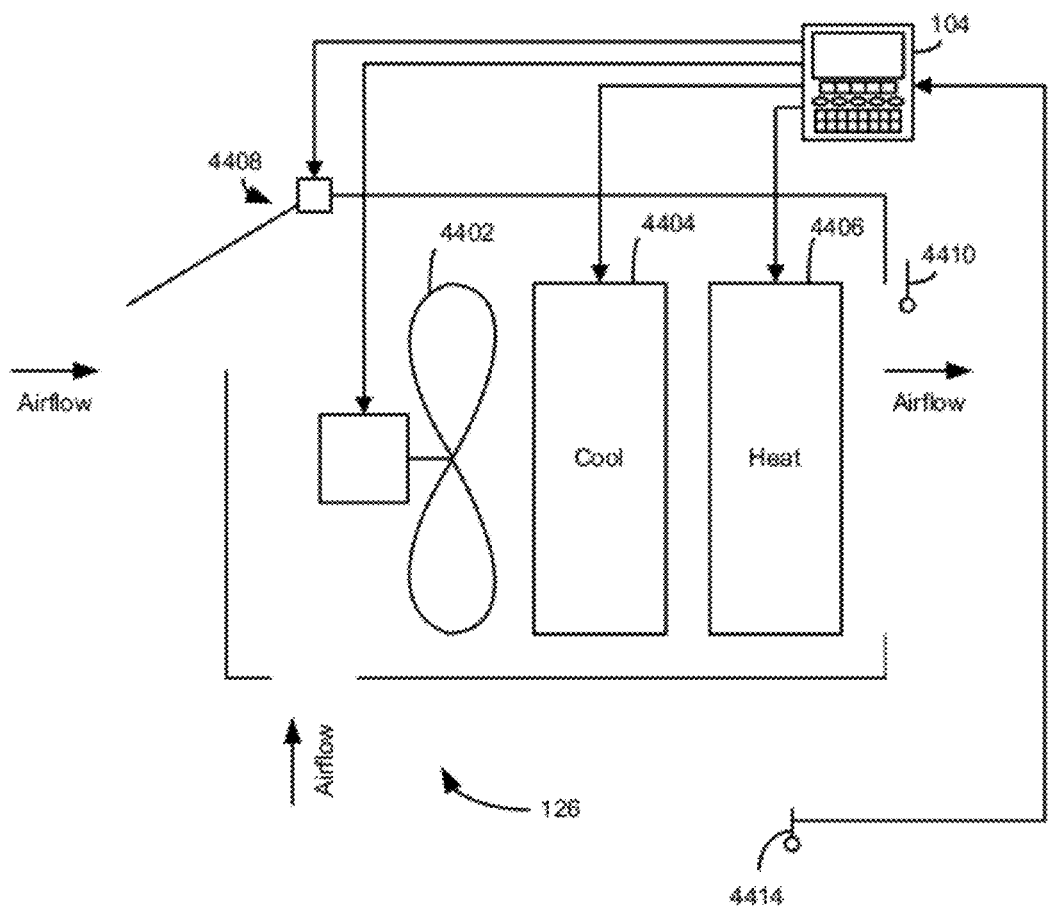
FIG. 44 is a schematic illustration of an HVAC system.

Referring now to FIG. 44, HVAC system 126 may include a fan 4402 as well as a cooling apparatus 4404, a heating apparatus 4406, and a damper 4408, if appropriate. Controller 104 may control the fan 4402, cooling apparatus 4404, heating apparatus 4406, and damper 4408 to heat or cool as desired. A temperature sensor 4410 may indicate a temperature of air exiting the cooling apparatus 4404 or heating apparatus 4406. A room temperature sensor 4414 may be placed proximate a heated/cooled area. Controller 104 may receive temperature data from temperature sensor 4414. To adjust operation of HVAC system 126, a user, such as a contractor, may input setpoint modifications into controller 104.

Figure 45:
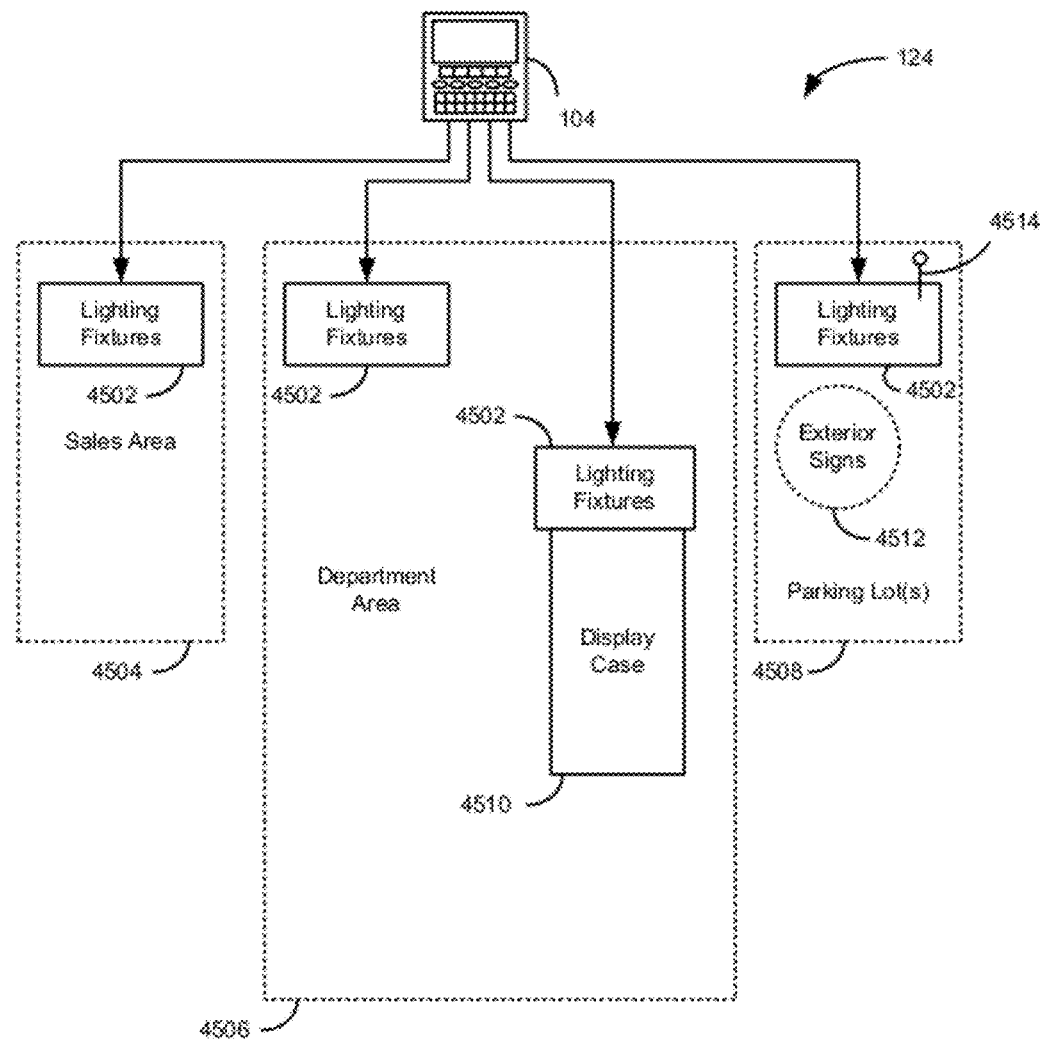
FIG. 45 is a schematic illustration of a lighting system.

Referring now to FIG. 45, a lighting system 124 may include one or more lighting fixtures 4502 which communicate with controller 104. Lighting fixtures 4502 are shown in various areas of the building and its exterior, with some areas including multiple types of fixtures. For example, a sales area 4502, a department area 4506, and a parking lot 4508 each include lighting fixtures 4502. The department area 4506 may include lighting fixtures 4502 for a display case 4510 therein. Parking lot 4508 may include lighting fixtures 4502 as well as exterior sign lighting 4512. Parking lot lighting fixtures 4502 may be equipped with a light sensor 4514 and configured to turn on at dusk. To adjust operation of lighting system 124, a user, such as a contractor, may input setpoint modifications into controller 104.

Figure 46:
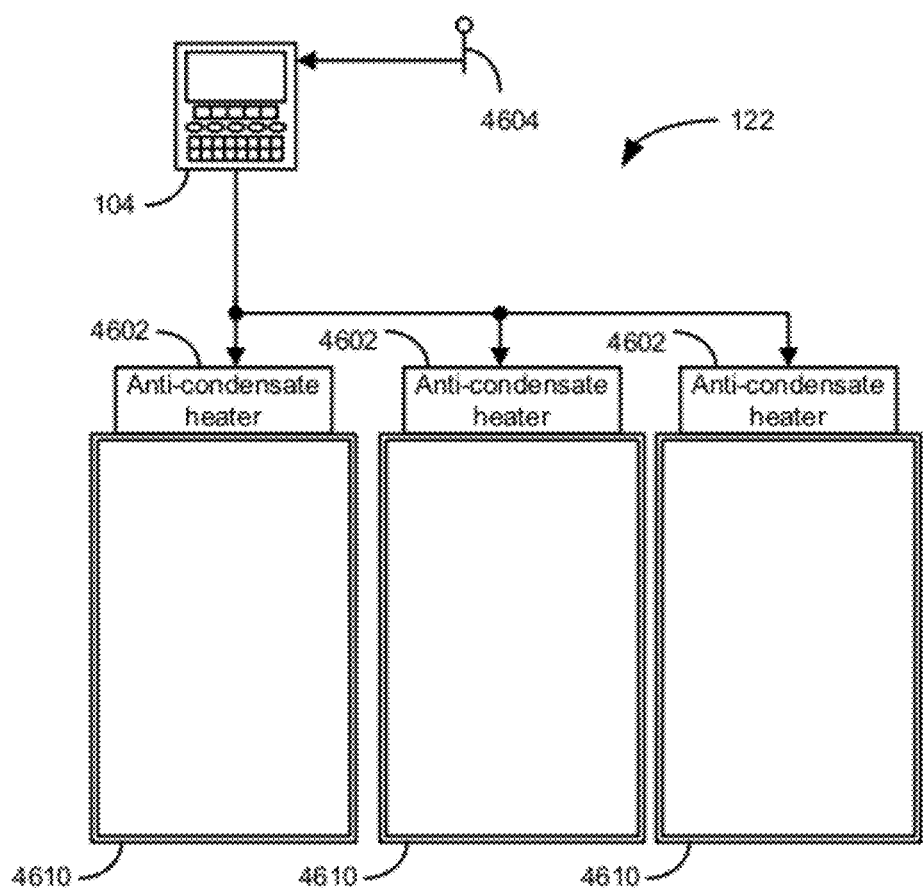
FIG. 46 is a schematic illustration of an anti-condensate heater system.

Referring to FIG. 46, an ACH system 122 may include anti-condensate heaters 4602 in communication with controller 104. Controller 104 may receive dew point data from a dew point sensor 4604. Alternatively, controller 104 may receive temperature and relative humidity data from temperature and relative humidity sensors and calculate the dew point. Controller 104 may operate anti-condensate heaters 4602 based on the dew point to heat glass refrigeration case displays 4610 to prevent condensation. To adjust operation of ACH system 122, a user, such as a contractor, may input setpoint modifications into controller 104.

Figure 2A:
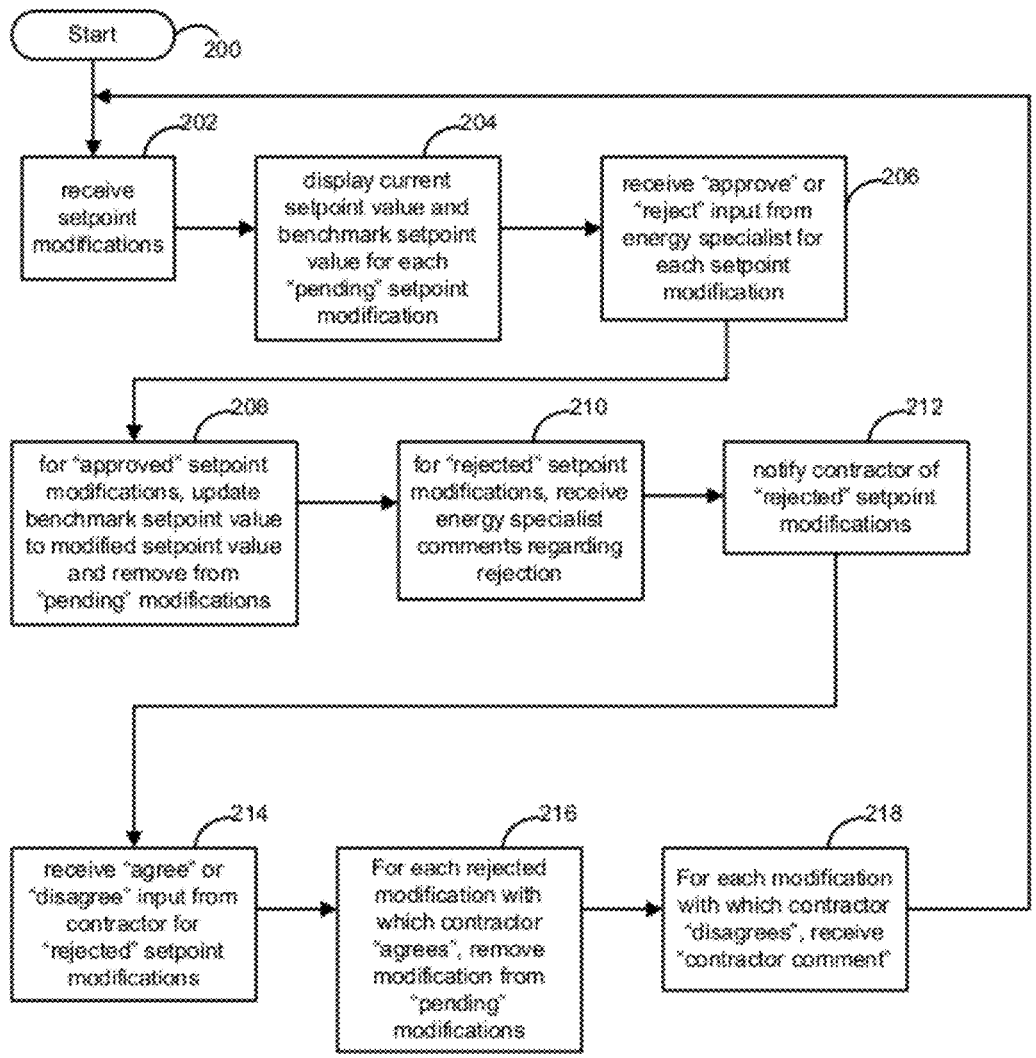
FIG. 2a is a flowchart of an algorithm for a setpoint modification monitoring system.

With reference to FIG. 2a, a flowchart for monitoring and evaluating equipment operating parameter modifications may start in block 200. In block 202, setpoint modifications may be received. As described in detail above, setpoint monitor and server 102 may poll controllers 104 to detect setpoint modifications. Alternatively, controllers 104 may report setpoint modifications to setpoint monitor and server 102.

In block 204, setpoint monitor and server 102 may display a current setpoint value and a benchmark value for each "pending" setpoint modification received. The benchmark value for a particular setpoint may be the last accepted or approved value for the benchmark. If a value for the particular setpoint has not yet been accepted or approved, the benchmark value may be displayed as "not set."

Figure 5:
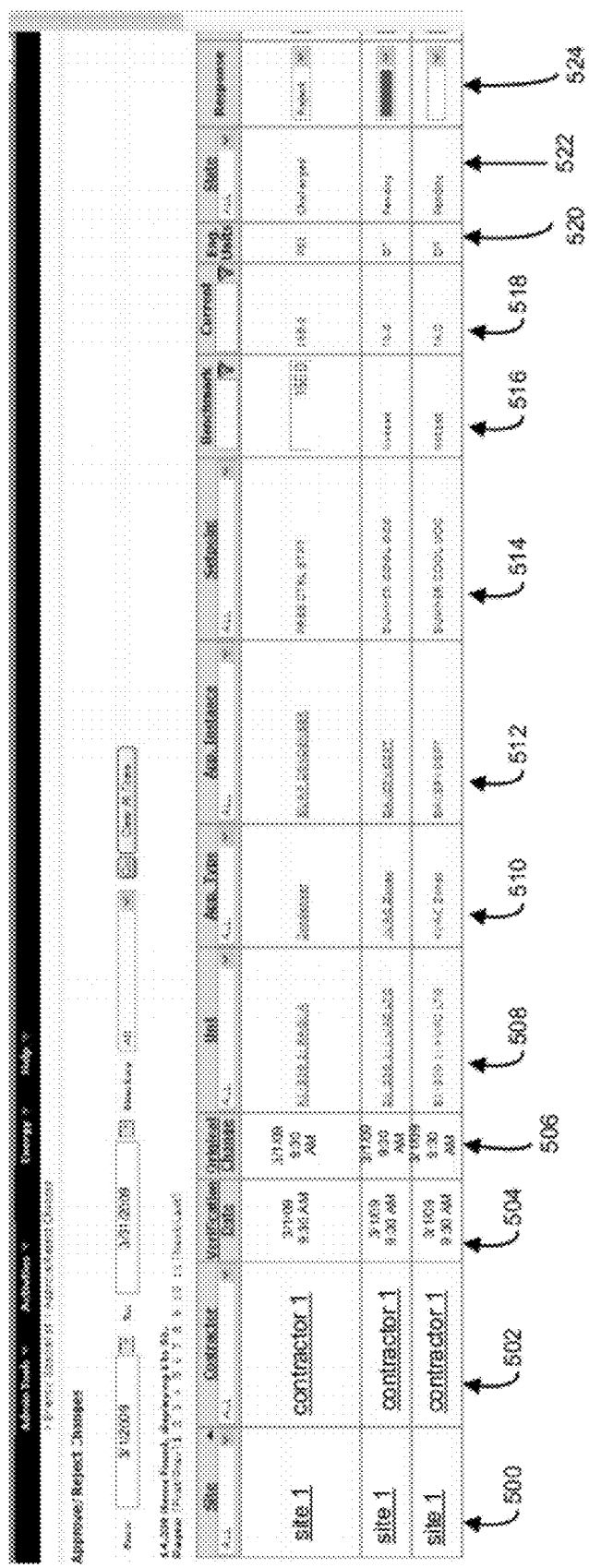
FIG. 5 is a screenshot of a user interface for a setpoint modification monitoring system.

For example, as shown in FIG. 5, "pending" setpoint modification are displayed. "Pending" setpoint modifications are setpoint modifications that have not yet been "approved" by an energy specialist. In the first row of the list in FIG. 5, a pressure control setpoint for a condenser is shown. The benchmark value is 155.0 PSI. The current, or modified, value of the setpoint is 165.0 PSI.

Figure 13:
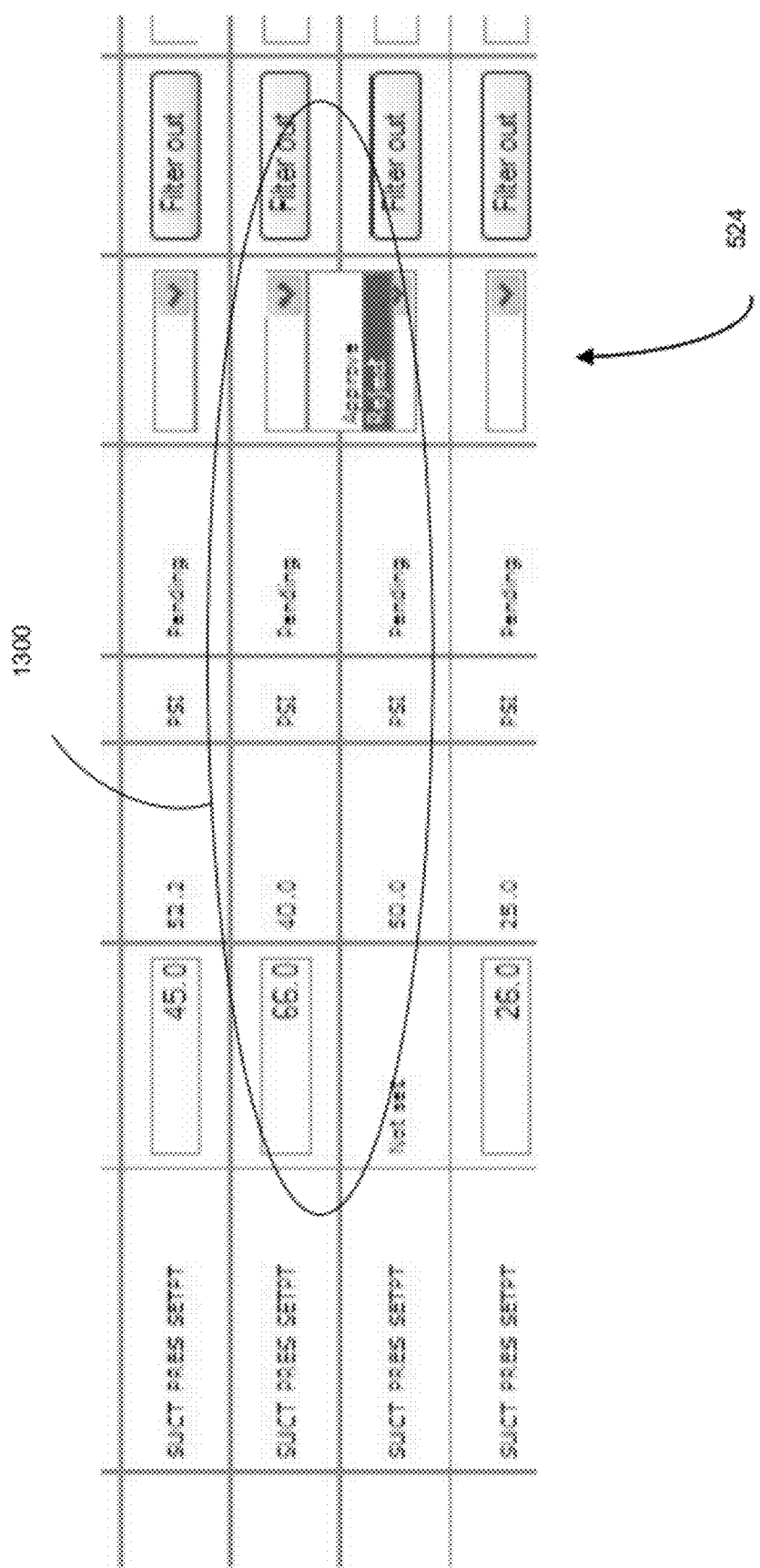
FIG. 13 is a screenshot of a user interface for a setpoint modification monitoring system.

As another example, as shown in FIG. 13, a list of suction pressure setpoints is displayed. As indicated at 1300, a particular suction pressure setpoint has been modified from a previous benchmark value of 66.0 PSI to 40.0 PSI.

With reference again to FIG. 2a, in block 206 setpoint monitor and server 102 may receive "approve" or "reject" input from an energy specialist for each setpoint modification. As discussed below, an energy specialist or energy manager may login to the setpoint monitor and server 102. Energy specialists in particular may review the listing of setpoint modifications and either "approve" or "reject" each of the modifications.

Figure 6:
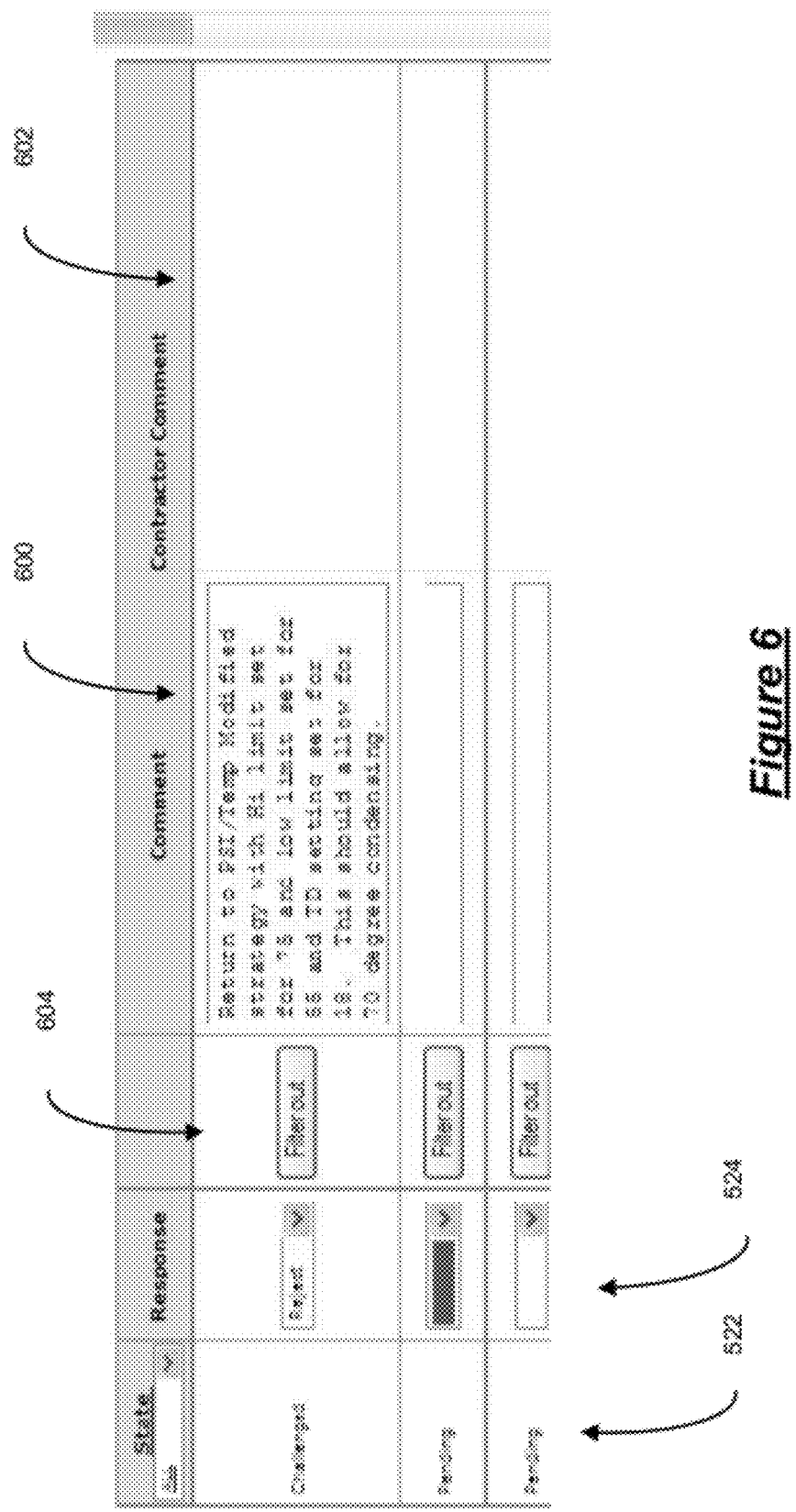
FIG. 6 is a screenshot of a user interface for a setpoint modification monitoring system.

For example, in the first row of the listing shown in FIGS. 5 and 6, an energy specialist has "rejected" a setpoint modification that would change the pressure control setpoint from 155.0 PSI to 165.0 PSI. (FIGS. 5 and 6 show the same screen shot. FIG. 5 shows the left hand portion of the screen and FIG. 6 shows the right hand portion of the same screen. A "rejected" setpoint modification is also shown in the screenshots of FIGS. 13, 14, 16, 17, 21, and 24.

With reference again to FIG. 2a, in block 208 setpoint monitor and server 102 may update the "benchmark setpoint value" for each "approved" setpoint modification. For each setpoint modification that is "approved" by an energy specialist, setpoint monitor and server 102 may update the value in the database 106 associated with the particular setpoint to reflect the modification. For example, if a pressure control setpoint is modified from a benchmark value of 155.0 PSI to a value of 165.0 PSI, and if an energy specialist "approves" the modification, setpoint monitor and server 102 may update database 106 to reflect the modification, storing the 165.0 PSI as the new benchmark value for that setpoint. Further, in block 208, setpoint monitor and server 102 may remove any "approved" modifications from the list of "pending" setpoint modifications. Setpoint monitor and server 102 may also remove the "approved" modification from the display list.

Figure 14:
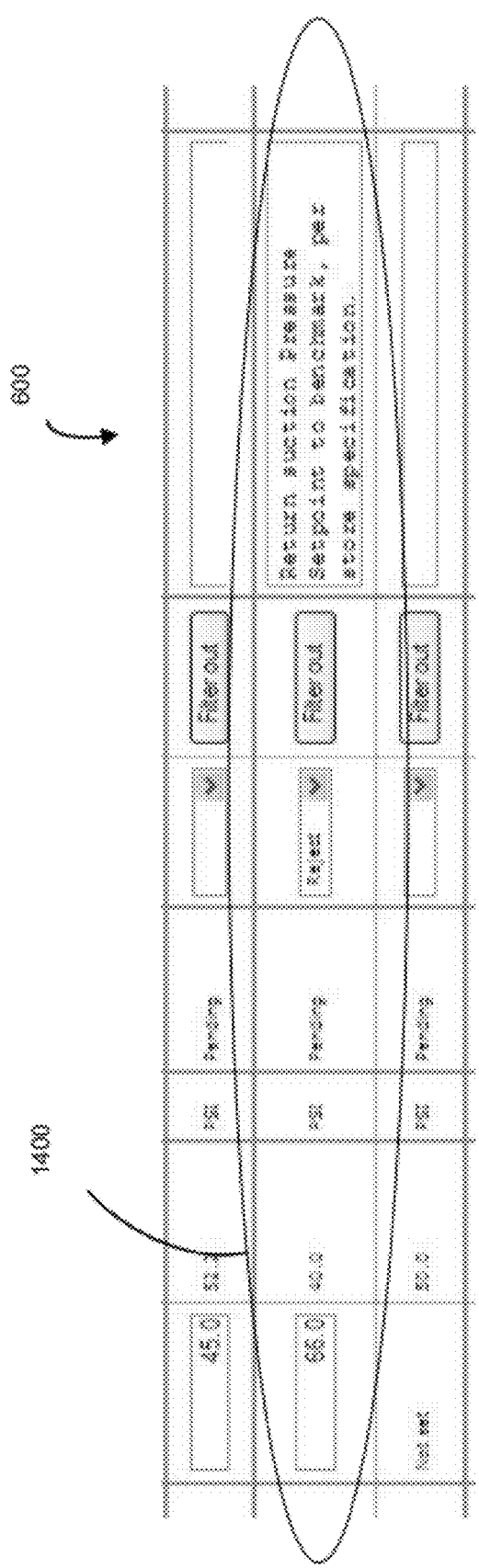
FIG. 14 is a screenshot of a user interface for a setpoint modification monitoring system.
Figure 17:
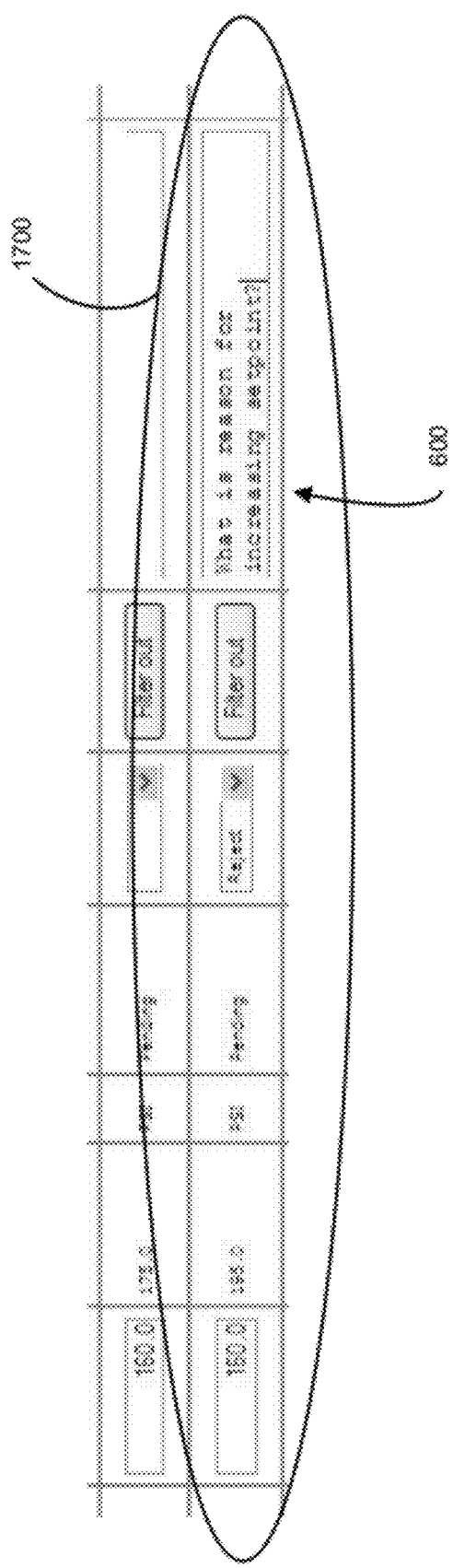
FIG. 17 is a screenshot of a user interface for a setpoint modification monitoring system.
Figure 21:
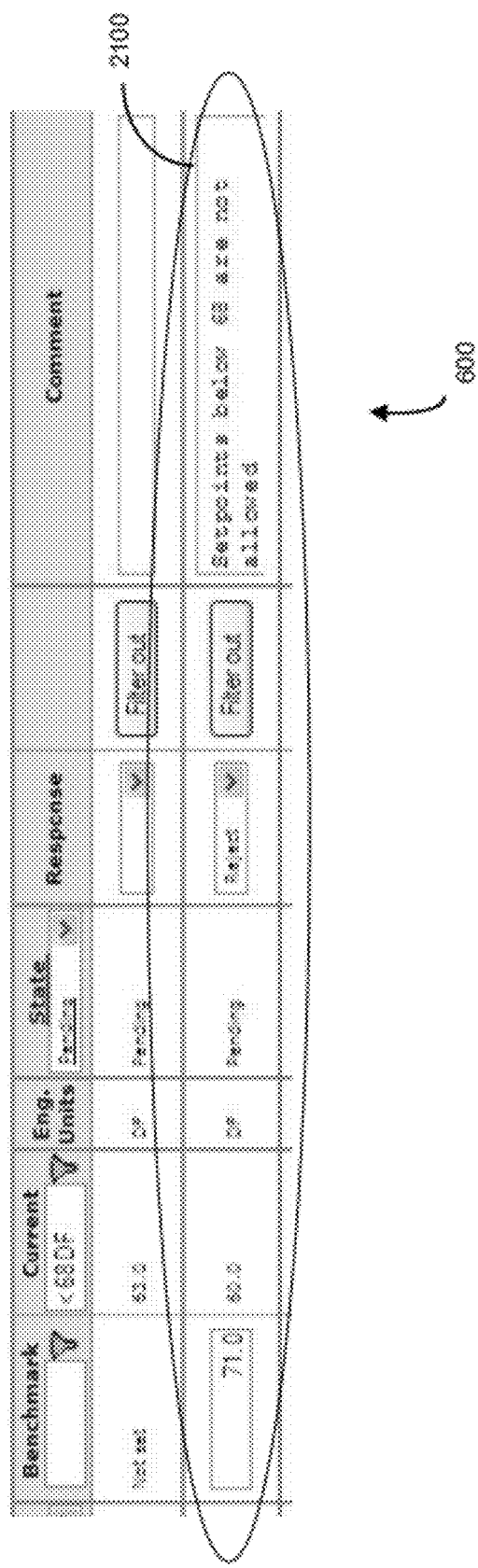
FIG. 21 is a screenshot of a user interface for a setpoint modification monitoring system.

In block 210, for each "rejected" setpoint modification, setpoint monitor and server 102 may receive comments from an energy specialist regarding the rejection. For example, as shown in FIG. 6 the proposed setpoint modification has been rejected and the energy specialist has entered the comment "Return to PSI/Temp Modified strategy with Hi limit set for 75 and low limit set for 55 and TD setting set for 18. This should allow for 70 degree condensing." As another example, as shown in FIG. 14, the proposed setpoint modification has been rejected and the energy specialist has entered the comment "Return suction Pressure Setpoint to benchmark, per store specification." As another example, as shown in FIG. 17, the proposed setpoint modification has been rejected and the energy specialist has entered the comment "What is reason for increasing setpoint?". As discussed in further detail below, the "comments" may include questions directed to the contractor or person that made the setpoint modification. As another example, as shown in FIG. 21, the proposed setpoint modification has been rejected and the energy specialist has entered the comment "Setpoints below 68 are not allowed."

Figure 25:
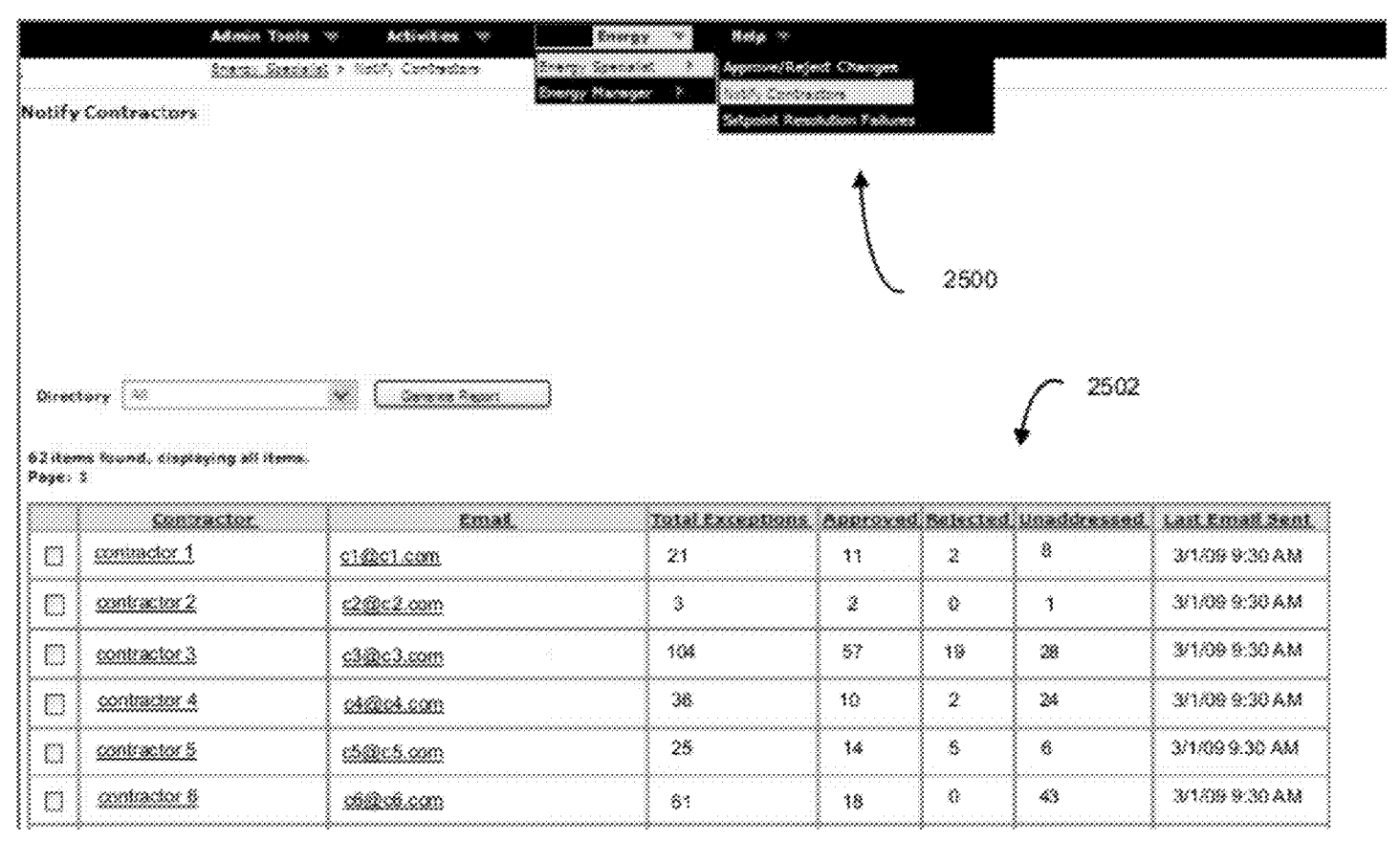

With reference again to FIG. 2a, in block 212, setpoint monitor and server 102 may notify the appropriate contractors of any "rejected" setpoint modifications. After approving or rejecting pending setpoint modifications, an energy specialist may direct the setpoint monitor and server 102 to notify contractors. As shown in FIG. 25, a listing of contractors for notification is shown, along with corresponding emails address and data with respect to the total number of exceptions, the number of approved modifications, the number of rejected modifications, the number of unaddressed modifications, and the date and time of the last email sent. FIG. 26 shows an example email that may be sent by the setpoint monitor and server 102 to a particular contractor (e.g., contractor 1) notifying the contractor that setpoint exceptions are available for the contractor to review and providing a link to the setpoint monitor and server web address where the exceptions can be viewed.

Figure 2B:
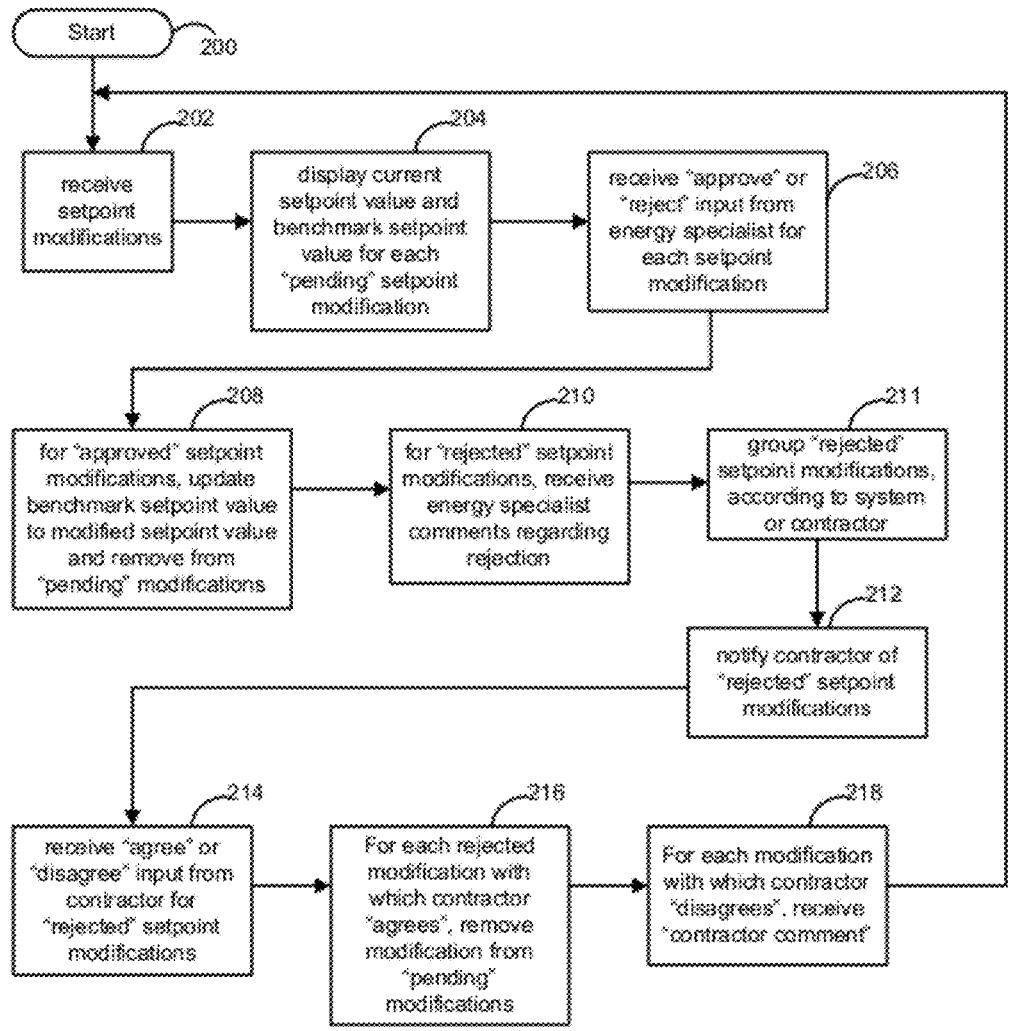
FIG. 2b is a flowchart of an algorithm for a setpoint modification monitoring system.

With reference now to FIG. 2b, another flowchart for monitoring and evaluating equipment operating parameter modifications is shown. FIG. 2b differs from FIG. 2a in that FIG. 2b includes block 211. In block 211, setpoint monitor and server 102 may group "rejected" setpoint modification according to a designated criteria before notifying the contractor in block 212. For example, setpoint monitor and server 102 may group all "rejected" setpoint modifications for a specific system, such as a refrigeration system or an HVAC system. In block 212, setpoint monitor and server 102 may then notify the contractor or contractors of the setpoint modifications for the grouped set of "rejected" setpoint modifications all at once. As another example, setpoint monitor and server 102 may group all "rejected" setpoint modifications for a specific contractor. In block 212, setpoint monitor and server 102 may then notify that contractor of the grouped set of "rejected" setpoint modifications associated with that contractor all at once.

Figure 28:
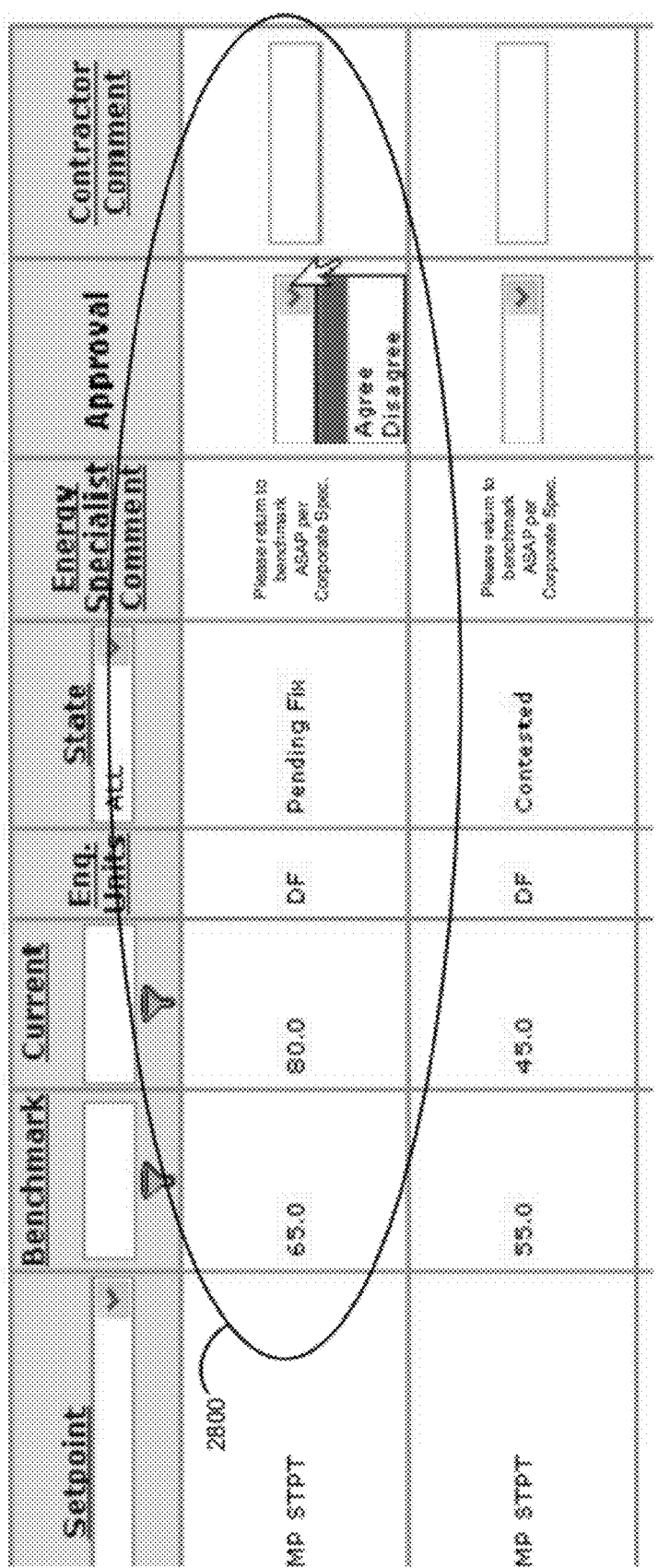
FIG. 28 is a screenshot of a user interface for a setpoint modification monitoring system.

With reference again to FIG. 2a, in block 214, setpoint monitor and server 102 may receive "agree" or "disagree" input from contractors for any setpoint modifications that were previously "rejected" by an energy specialist. As shown in FIGS. 27-29, a listing of previously "rejected" setpoint modifications is displayed for a contractor. As shown in FIG. 28, the contractor can either "Agree" or "Disagree" with the energy specialist.

With reference again to FIG. 2a, in block 216, for each rejected setpoint modification with which the contractor "agrees", the setpoint monitor and server 102 may remove the previously rejected modification from the "pending" modifications.

By "agreeing" with the energy specialist, the contractor is indicating that the setpoint will be returned to its original value that it had prior to the proposed setpoint modification. For example, in the first row of the listing in FIG. 29, the contractor has agreed with the energy specialist and will change the "minimum temperature setpoint" from its current value of 80.0 degrees Fahrenheit back to its original benchmark value of 65.0 degrees Fahrenheit. Alternatively, the setpoint may be returned to its original or benchmark value, or some other value, remotely by the energy specialist or another person in charge of changing setpoints.

As shown in FIG. 29, when a contractor "agrees" to return a setpoint to its original or benchmark value, the modification may appear in a "Pending Fix" state. The modification may remain in the "Pending Fix" state until the next time the particular controller 104 communicates with setpoint monitor and server 102 and the setpoint is confirmed to have been returned to the original or benchmark value.

Figure 24:
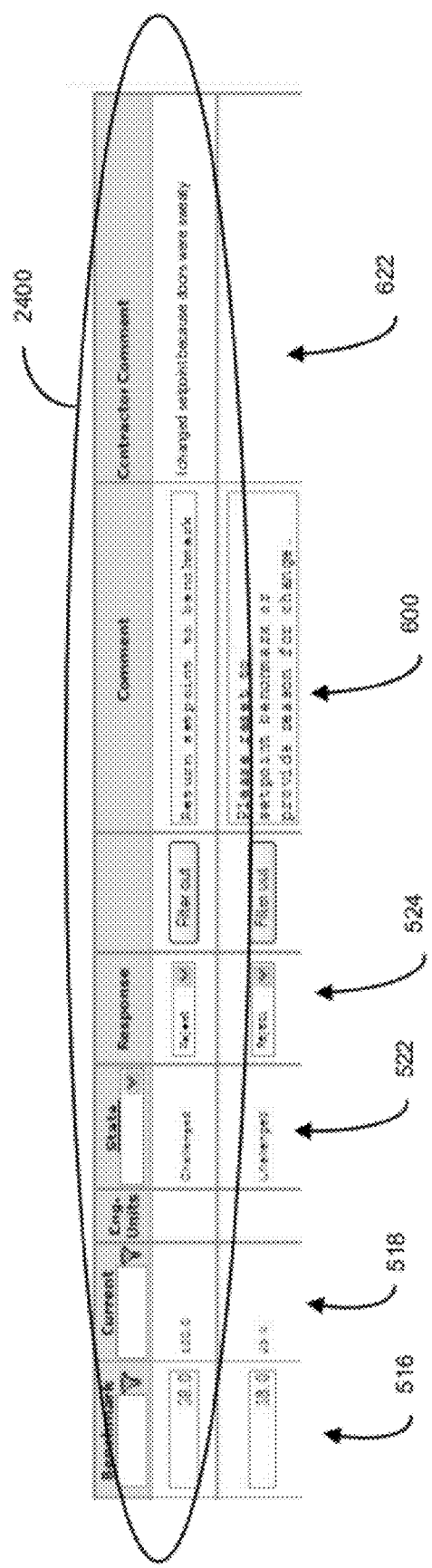
FIG. 24 is a screenshot of a user interface for a setpoint modification monitoring system.

With reference again to FIG. 2a, in block 218, for each modification with which contractor "disagrees," setpoint monitor and server 102 may receive a "contractor comment" with respect to the "disagreement." For example, in FIG. 24, a contractor has commented that "I changed setpoint because doors were sweaty." Likewise, in FIG. 29, a contractor has commented that "Doors were sweaty" indicating that this was the reason for the setpoint modification. In this way, the contractor's comments provide an explanation to the energy specialist as to why the setpoint was modified in the first place. In response, and based on the contractor's comment or explanation, the energy specialist may ultimately approve the setpoint modification by changing the initial "rejection" to an "approval."

With reference again to FIG. 2a, after receiving contractor comment in block 218, setpoint monitor and server may return to block 202 to receive additional setpoint modifications and display "pending" setpoint modifications in block 204. As such, the setpoint monitor and server, energy specialist or energy manager, and contractor, may iteratively review the status of pending setpoint modifications.

In this way, a contest may arise between an energy specialist and a contractor with respect to certain challenged setpoint modifications and with respect to the reasons for the modification and the reasons for returning the setpoint modification to its original or benchmark value. A pending setpoint modification will remain challenged or pending until an energy specialist "approves" the modification or until a contractor "agrees" to return the setpoint to its original or benchmark value. Alternatively, an energy specialist and a contractor may agree to a compromise value for the particular setpoint.

Operation of the setpoint monitor and server will now be described with reference to FIGS. 3-42.

Figure 3:
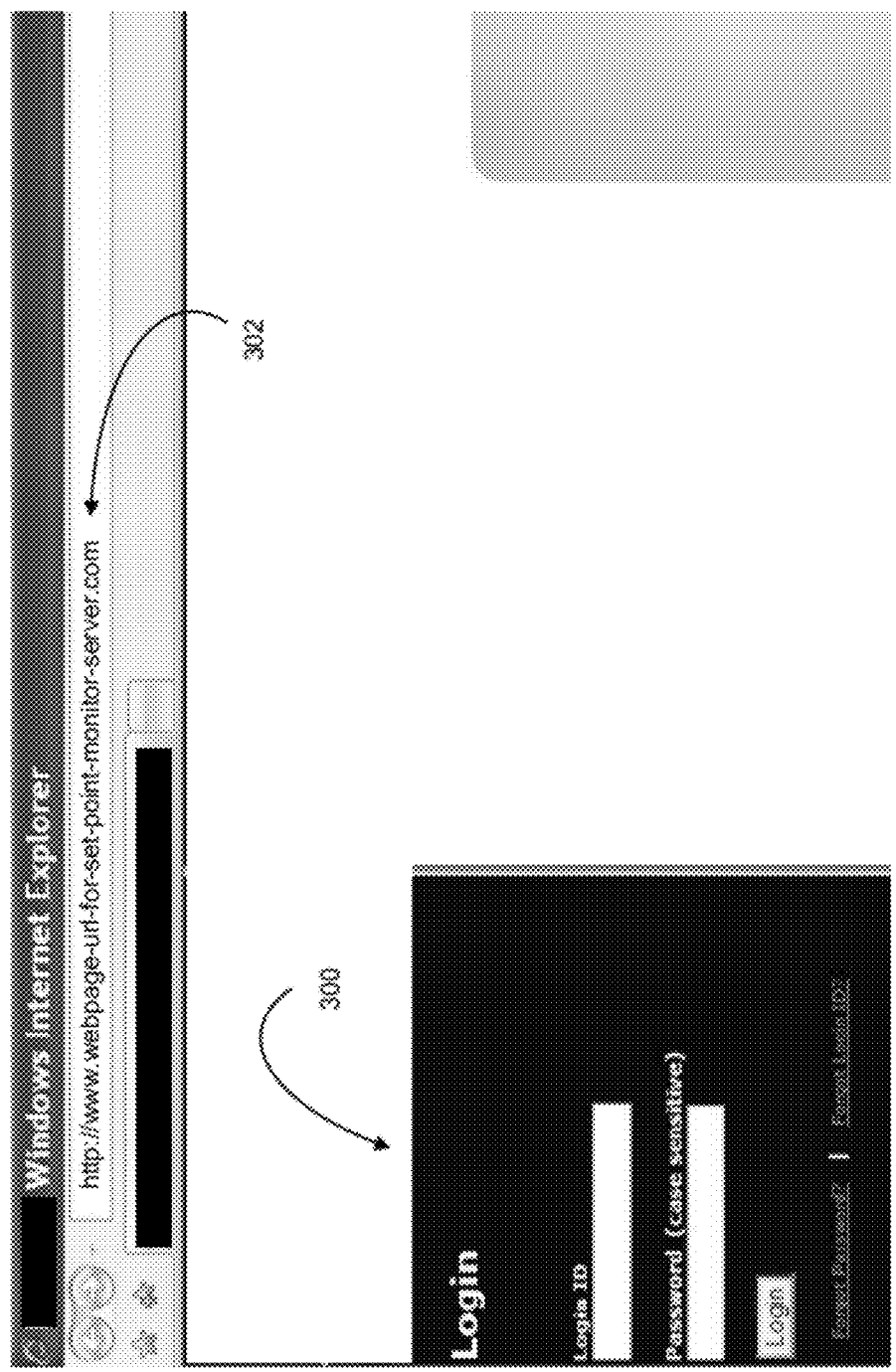
FIG. 3 is a screenshot of a user interface for a setpoint modification monitoring system.

With reference to FIG. 3, a login screen for the setpoint monitor and server is shown. As shown at 300, the login process may require a Login ID or user ID and a Password. Users may be categorized as "Energy Specialists", "Energy Managers", or "Contractors." Energy Specialists may be responsible for approving or rejecting setpoint modifications. Energy Managers may be able to access and create various reports, as discussed in further detail below. Contractors may be on-site and may be responsible for setting and modifying setpoints at the location of particular sites 130. Additionally, a particular user may be categorized as both an Energy Manager and an Energy Specialist.

As shown in FIG. 3, and other screen-shot figures, the user interface may be a web-based user interface, accessible by pointing an internet browser to a url associated with the setpoint monitor and server. For example, as shown in FIG. 3, a url for logging in and accessing the setpoint monitor and server is shown as: http://www.webpage-url-for-set-point-monitor-server.com.

Figure 4:
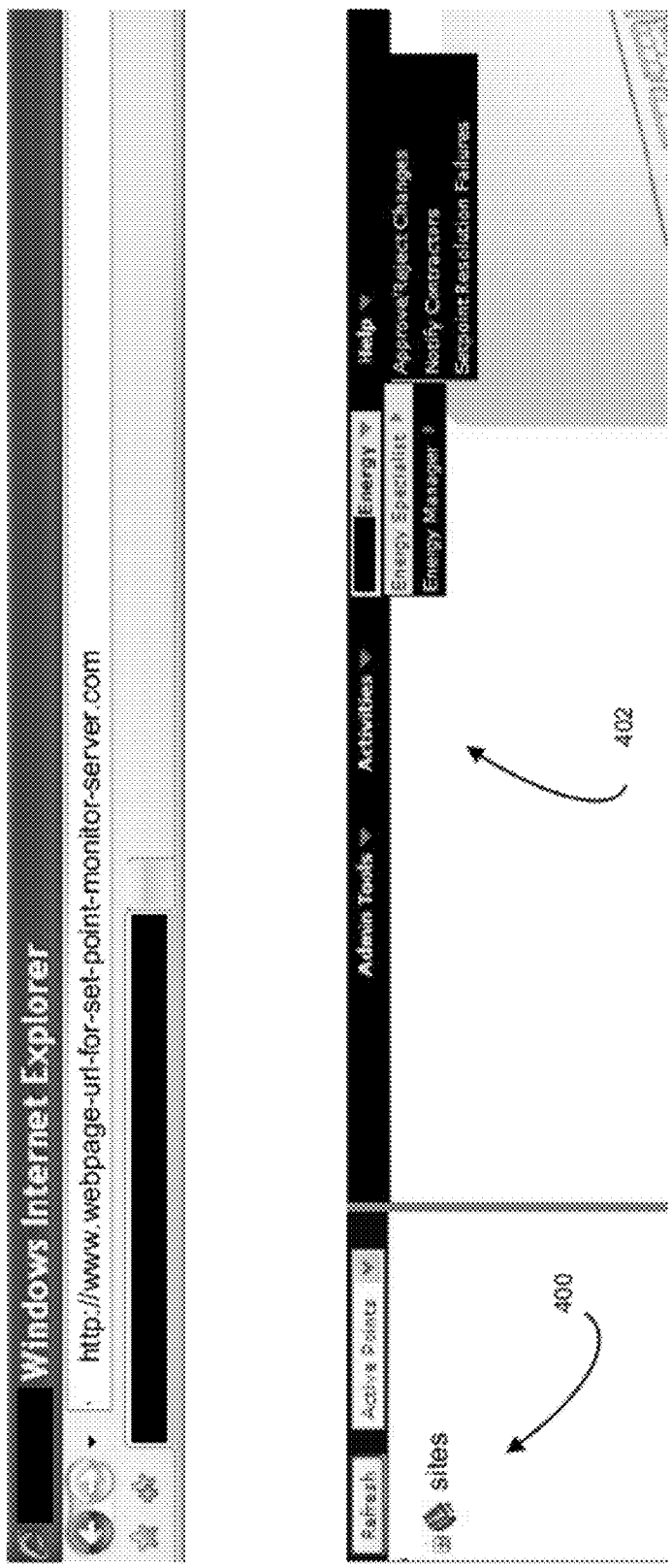
FIG. 4 is a screenshot of a user interface for a setpoint modification monitoring system.

With reference to FIG. 4, once a user has logged in, a menu of options 402 may be presented. Additionally, a list of "sites" 400 which the user has access to may be provided. As shown in FIG. 4, by clicking on the "+" next to the "sites", the list of sites may be expanded.

The menu of options 402 may include only those options/actions available to the particular user. For example, Energy Manager users may see only Energy Manager options/actions. Energy Specialist users may see only Energy Specialist options/actions. Contractors may see only Contractor options/actions.

Figure 31:
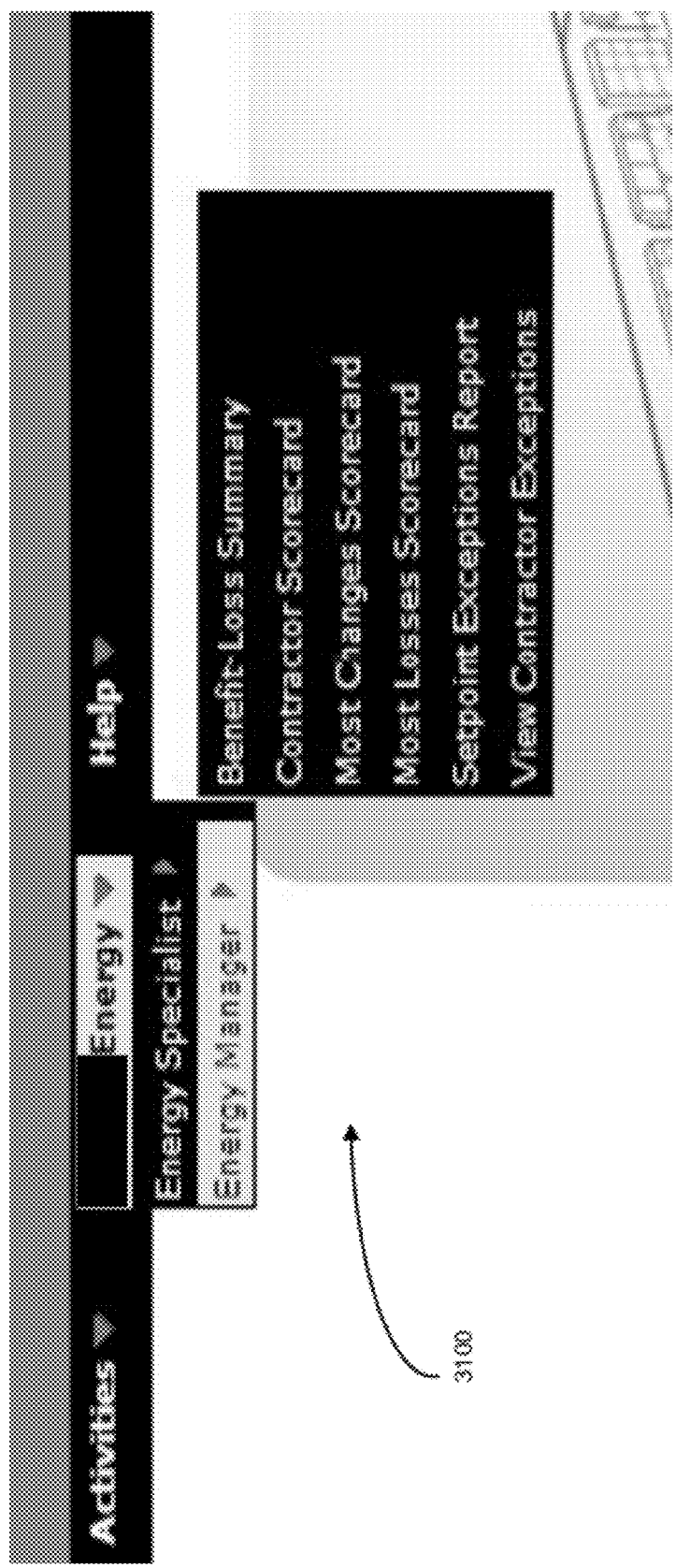
FIG. 31 is a screenshot of a user interface for a setpoint modification monitoring system.

In FIG. 4, the particular user qualifies as both an Energy Specialist and an Energy Manager. For example, the Energy Specialist options/actions may include "Approve/Reject Changes," "Notify Contractors," and "Setpoint Resolution Failures." As shown in FIG. 31, the Energy Manager options/actions may include "Benefit Loss Summary," "Contractor Scorecard," "Most Changes Scorecard," "Most Losses Scorecard," "Setpoint Exceptions Report," and "View Contractor Exceptions."

With reference to FIG. 5, the "Approve/Reject Changes" option from the "Energy Specialist" menu has been selected. The "Approve/Reject Changes" window allows for entry of a desired date range. For example, in FIG. 5 the "From" date is set to "Mar. 1, 2009" and the "To" date is set to "Mar. 31, 2009." Further, the "Approve/Reject Changes" window shows setpoint modifications within the entered date range. FIG. 5, shows the left hand portion of the row. FIG. 6 shows the right hand portion of the same "Approve/Reject Changes" window.

As shown in FIGS. 5 and 6, each setpoint modification entry may be shown in a single horizontal row of the chart, showing data for: Site 500, Contractor 502, Verification Date 504, Original Change date 506, Unit 508, Application Type 510, Application Instance 512, Setpoint 514, Benchmark setpoint 516, Current setpoint 518, Units 520, State 522, Response by Energy Specialist 524, Energy Specialist Comment 600, and Contractor Comment 602. In addition, each entry includes a "filter out" button 604 to filter out the particular entry from the display.

The Site 500 corresponds with the site where the equipment corresponding with the particular setpoint modification is located. The Contractor 502 corresponds with the particular contractor responsible for the particular setpoint modification. A single site may have one or more contractors that perform service on equipment at the site. The Verification Date 504 corresponds with the date and time when the setpoint monitor and server 102 last verified the current value of the particular setpoint. The Original Change date 506 corresponds with the date when the setpoint modification was initially made. The Unit 508 corresponds with the particular unit of equipment corresponding with the particular setpoint modification. The Application Type 510 corresponds with the particular type of application of the equipment corresponding to the particular setpoint modification. The Application Instance 512 corresponds with the name of the particular instances of the particular unit of equipment at the site corresponding with the particular setpoint modification. The Setpoint 514 corresponds with the particular setpoint that is the subject of the particular setpoint modification. The Benchmark setpoint 516 corresponds with the benchmark or previously approved value for the corresponding setpoint. The Current setpoint 518 correspond with the current value for the corresponding setpoint. The Units 520 corresponds with the units for the Benchmark setpoint 516 and Current setpoint 518 values. The State 522 corresponds with the current state of the corresponding setpoint modification. The Response by Energy Specialist 524 corresponds with the current Energy Specialist response to the corresponding setpoint modification. The Energy Specialist Comment 600 corresponds with the comment entry field for any Energy Specialist comments on the corresponding setpoint modification. The Contractor Comment 602 corresponds with the comment entry field for any Contractor comments on the corresponding setpoint modification.

Figure 7:
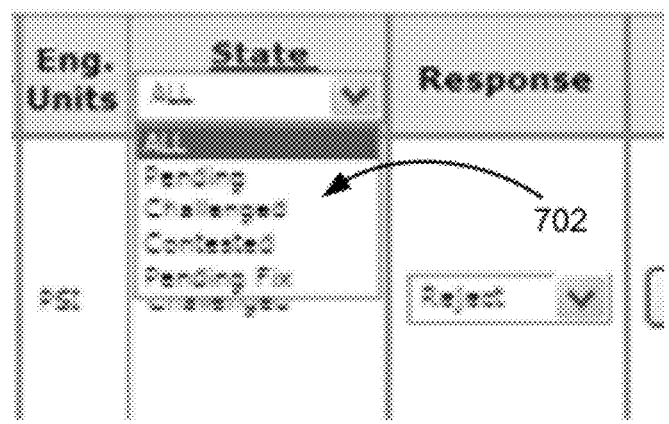
FIG. 7 is a screenshot of a user interface for a setpoint modification monitoring system.

With reference to FIG. 7, the State 522 field has been expanded to show the different possible states for a setpoint modification. Selecting a particular state will show the setpoint modifications having that state and will filter out from the display any setpoint modifications that are not in the selected state. As shown in FIG. 7, at circle 702, the possible states include "Pending," "Challenged," "Contested," and "Pending Fix." The "Pending" state corresponds with setpoint modifications that have not yet been approved or rejected by an Energy Specialist. The "Contested" state corresponds with setpoint modifications that have been rejected by the Energy Specialist. The "Challenged" state corresponds with setpoint modifications that have been rejected by the Energy Specialist and with which the contractor "Disagrees." The "Pending Fix" state corresponds with setpoint modifications that were rejected by the Energy Specialist and with which the contractor "Agreed." The setpoint modification will remain in the "Pending Fix" state until the setpoint monitor and server 102 verifies that the setpoint was changed back to its benchmark value.

Figure 8:
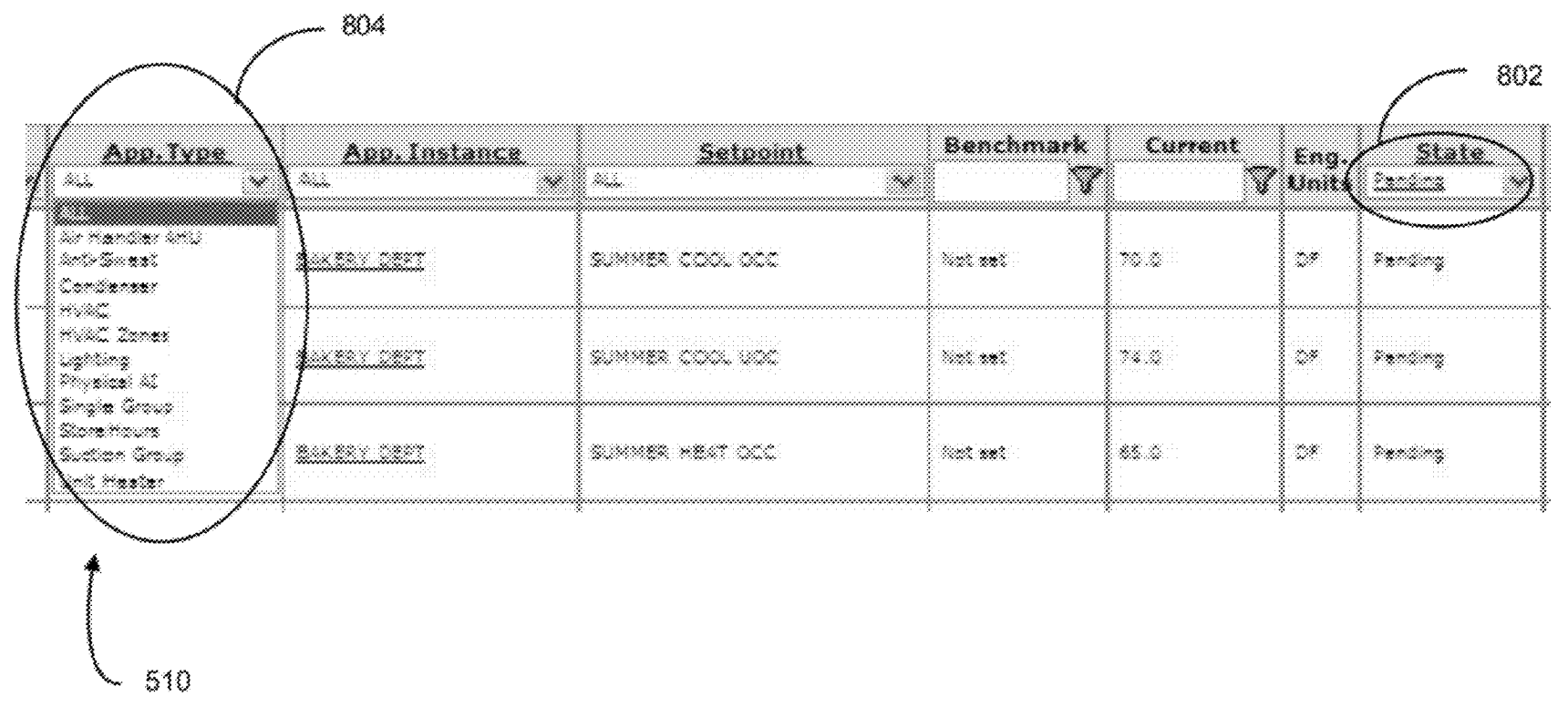

With reference to FIG. 8, as shown at 802, the "Pending" state filter has been selected. Thus, "Pending" setpoint modifications are shown. Also, as shown at 804, the Application Type 510 has been expanded to show different Application Types, including Air Handler AHU, Anti-Sweat, Condenser, HVAC, HVAC Zones, Lighting, Physical AI, Single Group, Store Hours, Suction Group, and Unit Heater.

Figure 9:
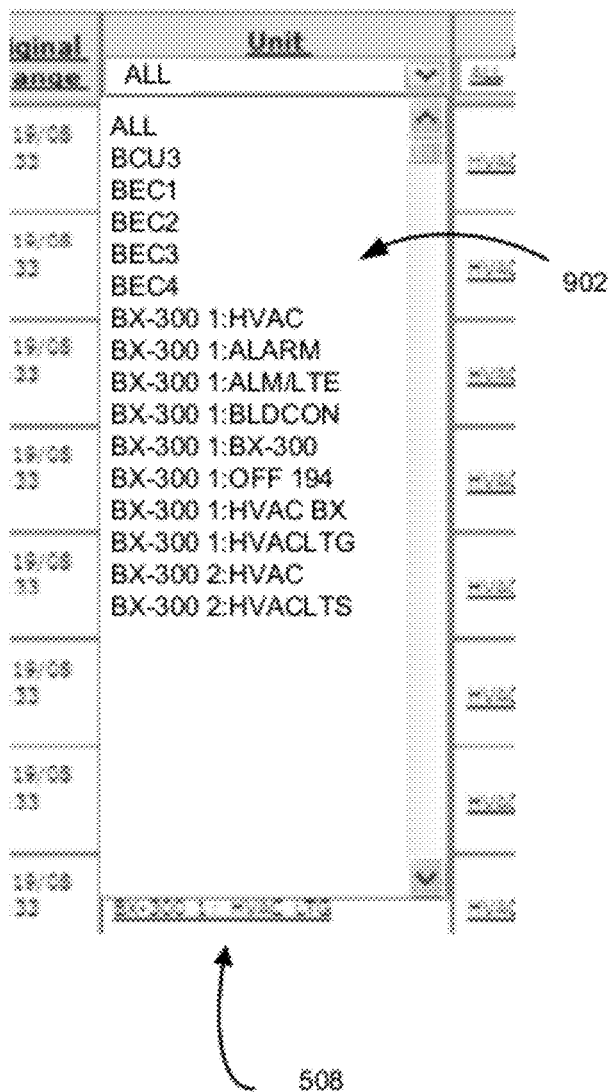
FIG. 9 is a screenshot of a user interface for a setpoint modification monitoring system.

With reference to FIG. 9, as shown at 902, the Unit 508 has been expanded to show particular units of equipment that have corresponding setpoint modifications.

Figure 10:
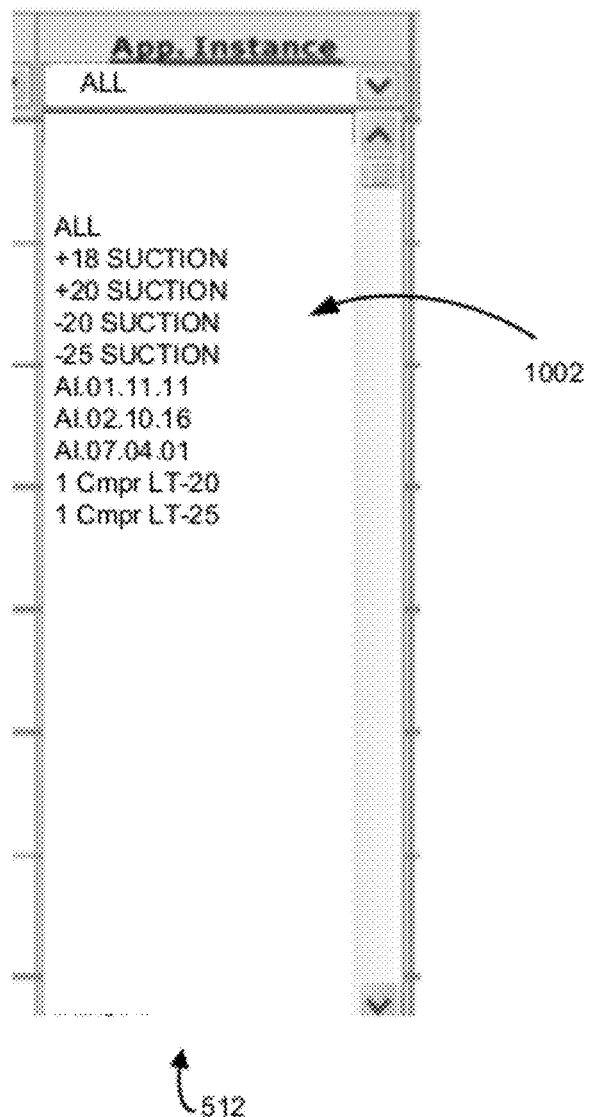
FIG. 10 is a screenshot of a user interface for a setpoint modification monitoring system.

With reference to FIG. 10, as shown at 1002, the Application Instance 512 has been expanded to show particular application instances that have corresponding setpoint modifications.

Figure 11:
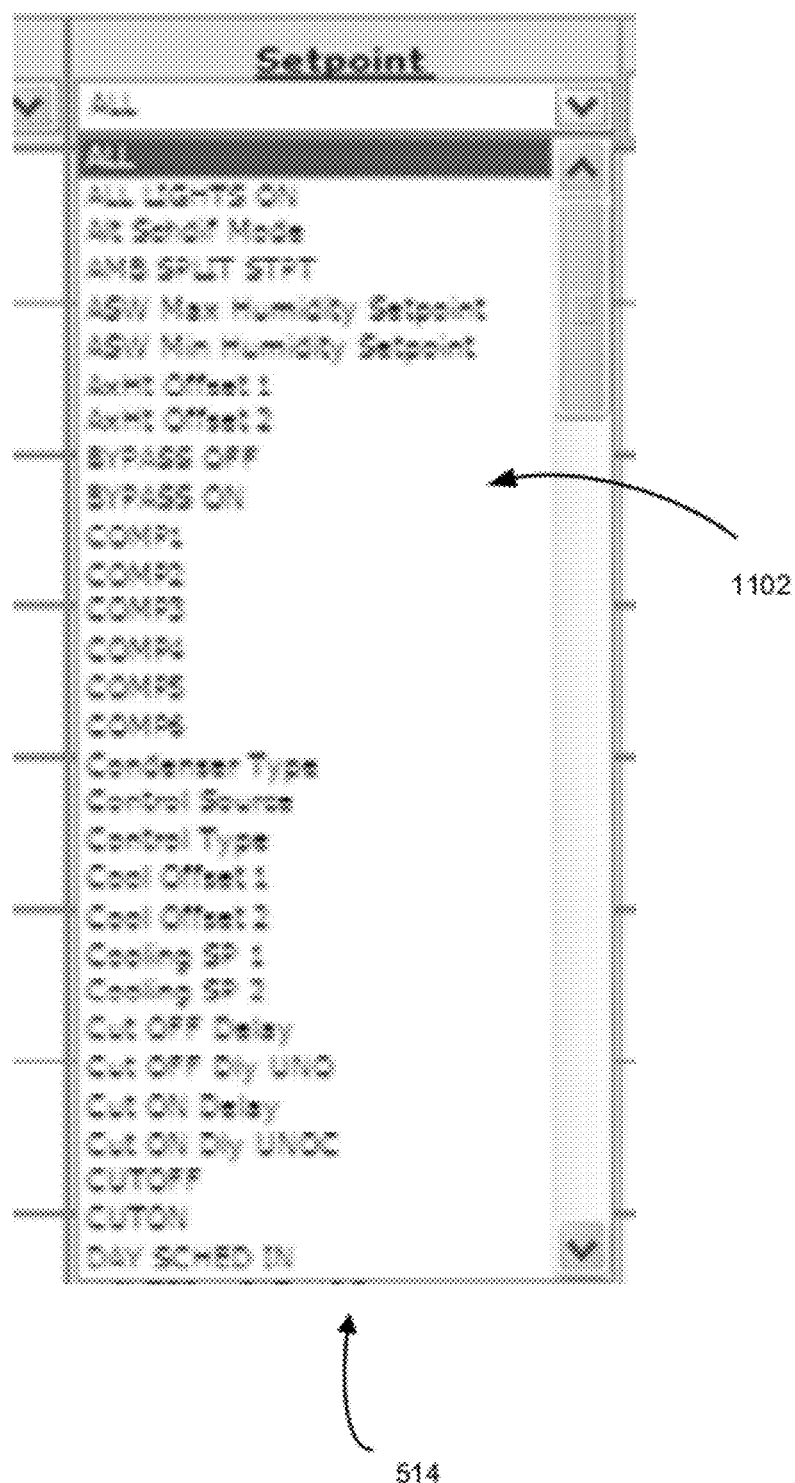
FIG. 11 is a screenshot of a user interface for a setpoint modification monitoring system.

With reference to FIG. 11, as shown at 1102, Setpoint 514 has been expanded to show particular setpoints that have corresponding setpoint modifications.

Figure 12:
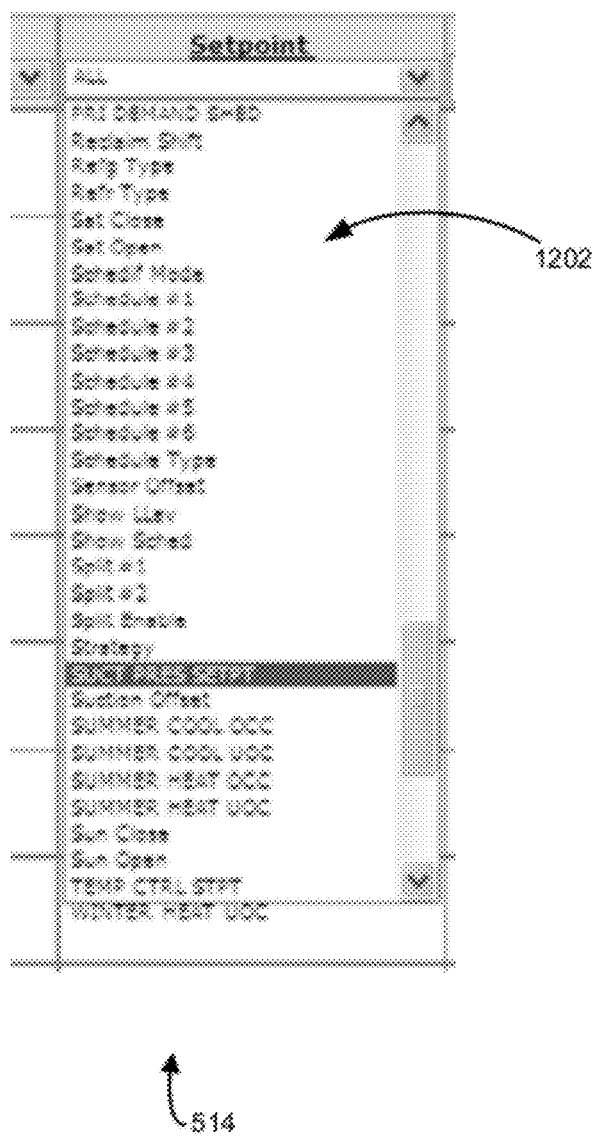
FIG. 12 is a screenshot of a user interface for a setpoint modification monitoring system.

With reference to FIG. 12, as shown at 1202, "SUCT PRES SETPT" is being selected from the Setpoint 514 field. In this way, once selected, Suction Pressure Setpoints will be shown in the display.

With reference to FIG. 13, as shown at 1300, the Response by Energy Specialist 524 is being expanded for a particular setpoint modification. For example, in FIG. 13 the suction pressure setpoint for a particular suction group has been modified from a benchmark value of 66.0 PSI to a current value of 40.0. In this example, the "Reject" response is being selected.

With reference to FIG. 14, as shown at 1400, the setpoint modification has been "Rejected" and the Energy Specialist Comment 600 is being filled in for the particular setpoint modification as follows: "Return suction Pressure Setpoint to benchmark, per store specification."

Figure 15:
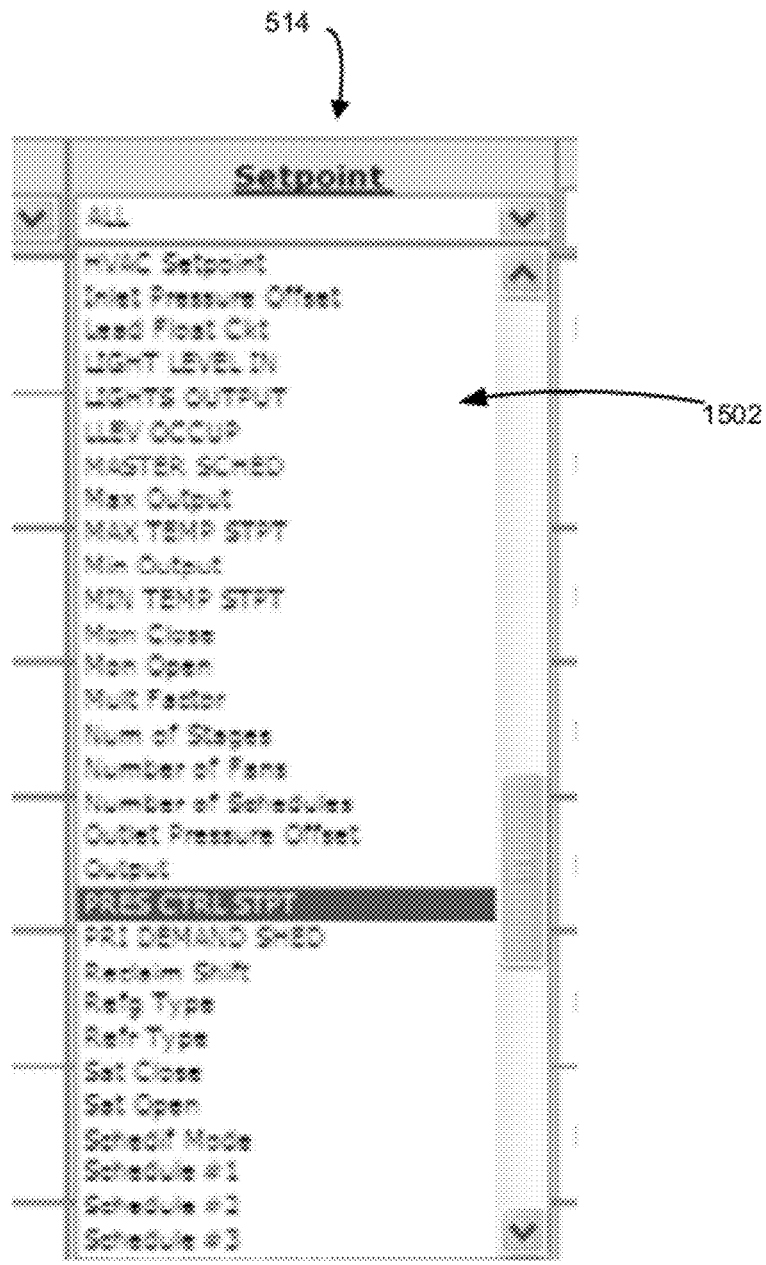
FIG. 15 is a screenshot of a user interface for a setpoint modification monitoring system.

With reference to FIG. 15, as shown at 1502, "PRES CTRL STPT" is being selected from the Setpoint 514 field. In this way, once selected, Pressure Control Setpoints will be shown in the display.

Figure 16:
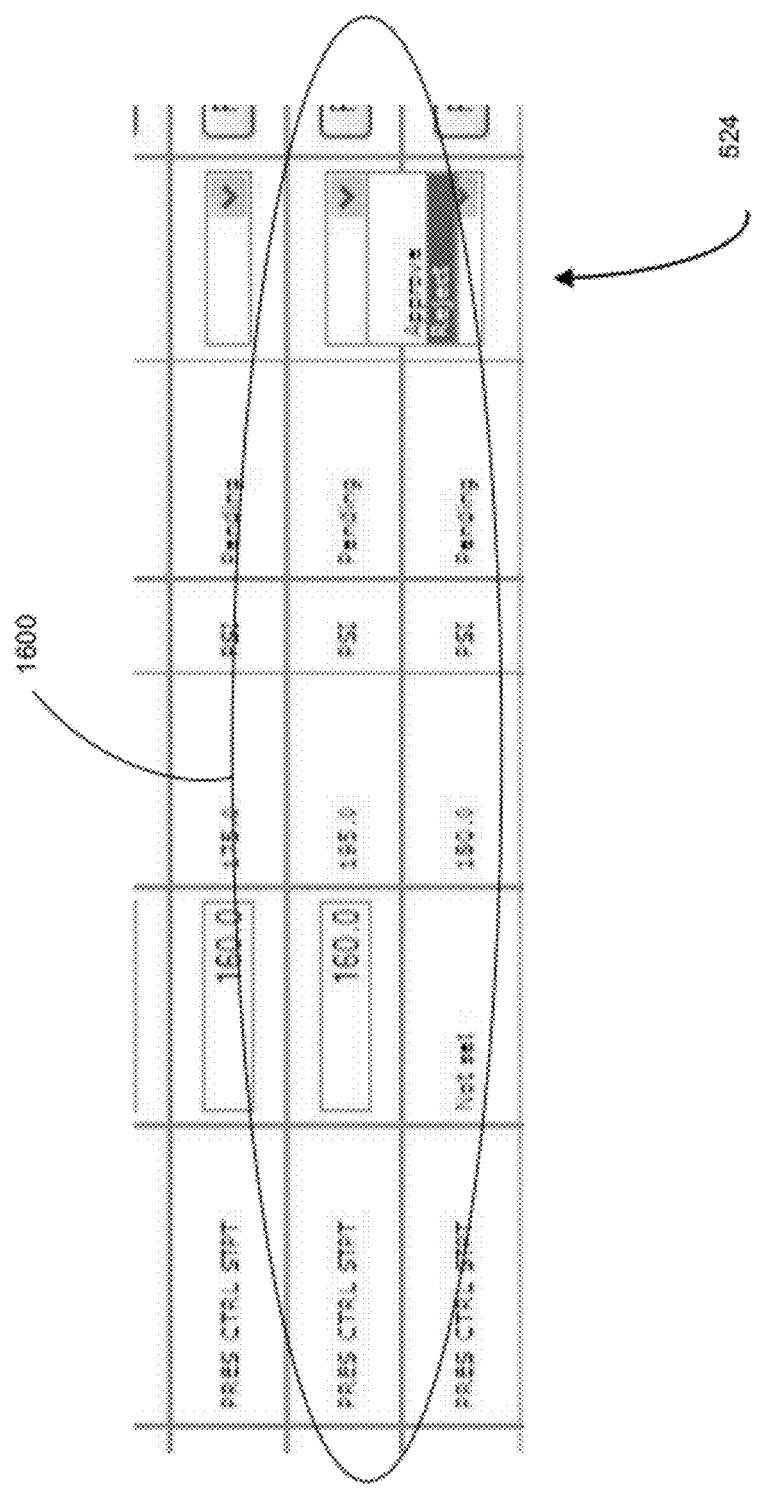
FIG. 16 is a screenshot of a user interface for a setpoint modification monitoring system.

With reference to FIG. 16, as shown at 1600, the Response by Energy Specialist 524 is being expanded for a particular setpoint modification. For example, in FIG. 16 the pressure control setpoint for a particular condenser application has been modified from a benchmark value of 160.0 PSI to a current value of 195.0. In this example, the "Reject" response is being selected.

With reference to FIG. 17, as shown at 1700, the setpoint modification has been "Rejected" and the Energy Specialist Comment 600 is being filled in for the particular setpoint modification as follows: "What is reason for increasing setpoint?".

Figure 18:
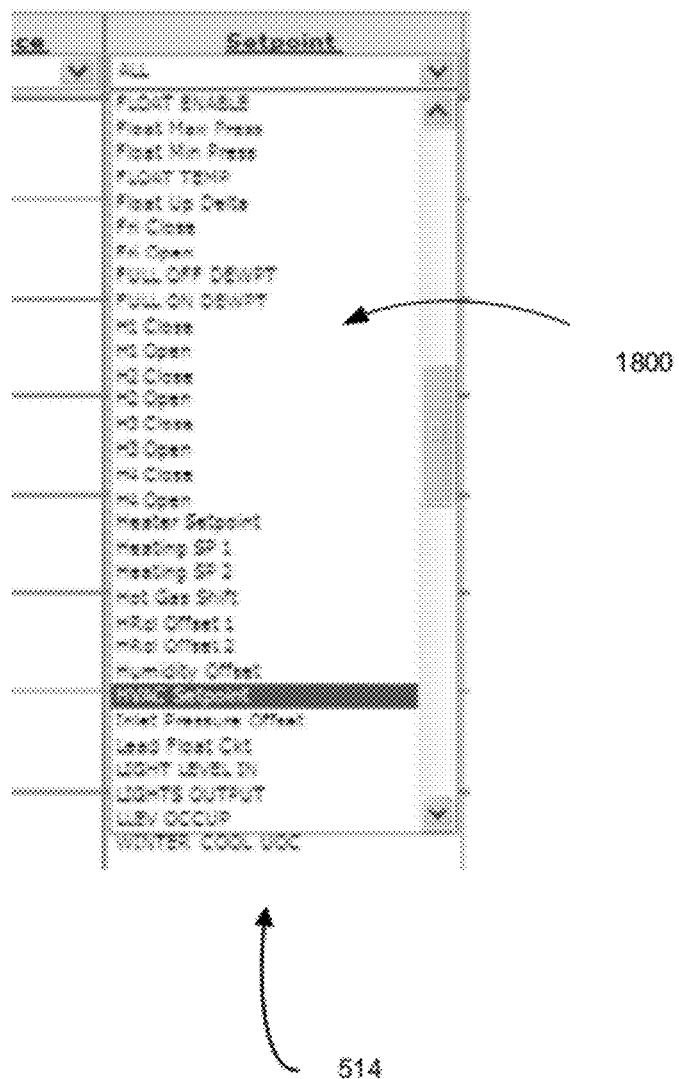
FIG. 18 is a screenshot of a user interface for a setpoint modification monitoring system.

With reference to FIG. 18, as shown at 1800, "HVAC Setpoint" is being selected from the Setpoint 514 field. In this way, once selected, HVAC Setpoints will be shown in the display.

Figure 19:
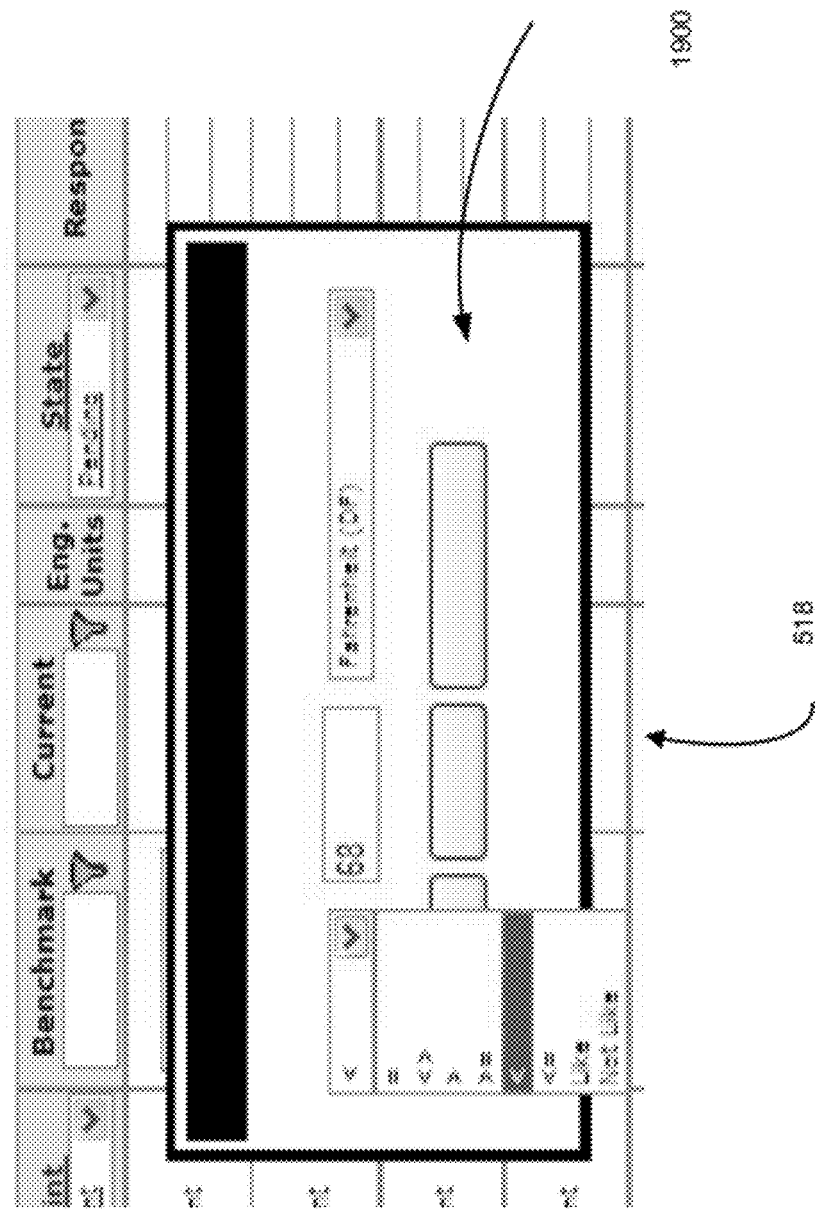
FIG. 19 is a screenshot of a user interface for a setpoint modification monitoring system.

With reference to FIG. 19, as shown at 1900, a particular value filter may be inputted for the current or benchmark setpoint value fields. For example, in FIG. 19, input is being received for the Current setpoint 518 to be filtered to show current setpoints that are set "less than" 68 degrees Fahrenheit.

Figure 20:
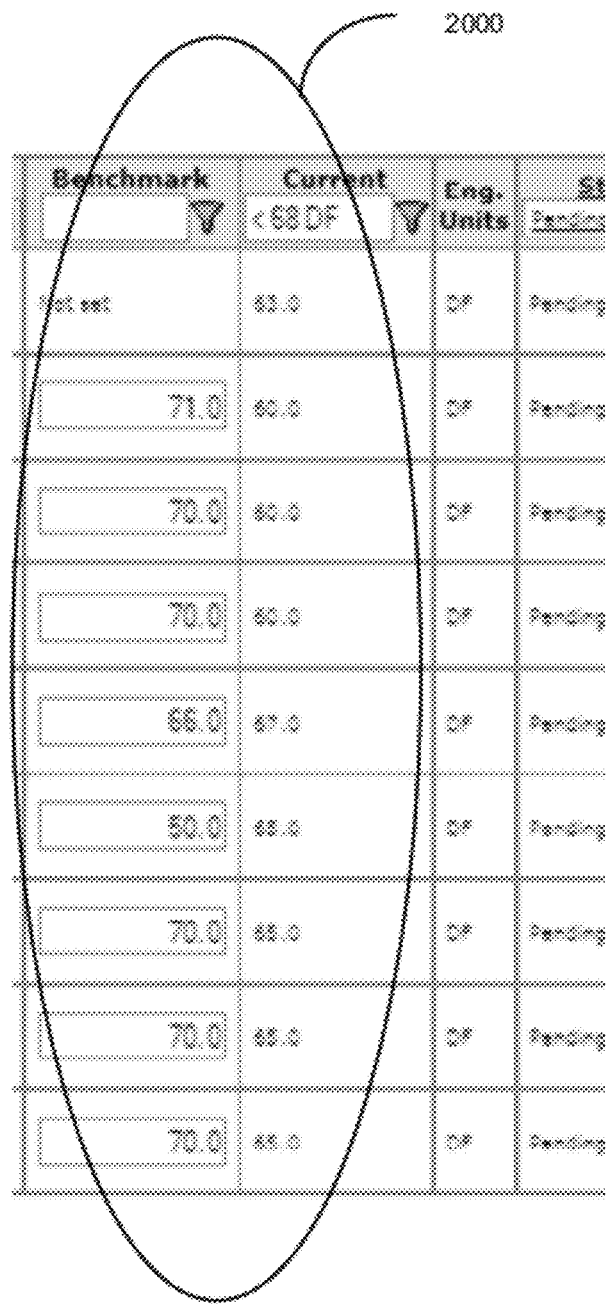
FIG. 20 is a screenshot of a user interface for a setpoint modification monitoring system.

With reference to FIG. 20, as shown at 2000, setpoint modifications with current setpoint values that are less than 68 degrees Fahrenheit are shown.

With reference to FIG. 21, as shown at 2100, a setpoint modification has been "Rejected" and the Energy Specialist Comment 600 is being filled in for the particular setpoint modification as follows: "Setpoints below 68 are not allowed."

Figure 22:
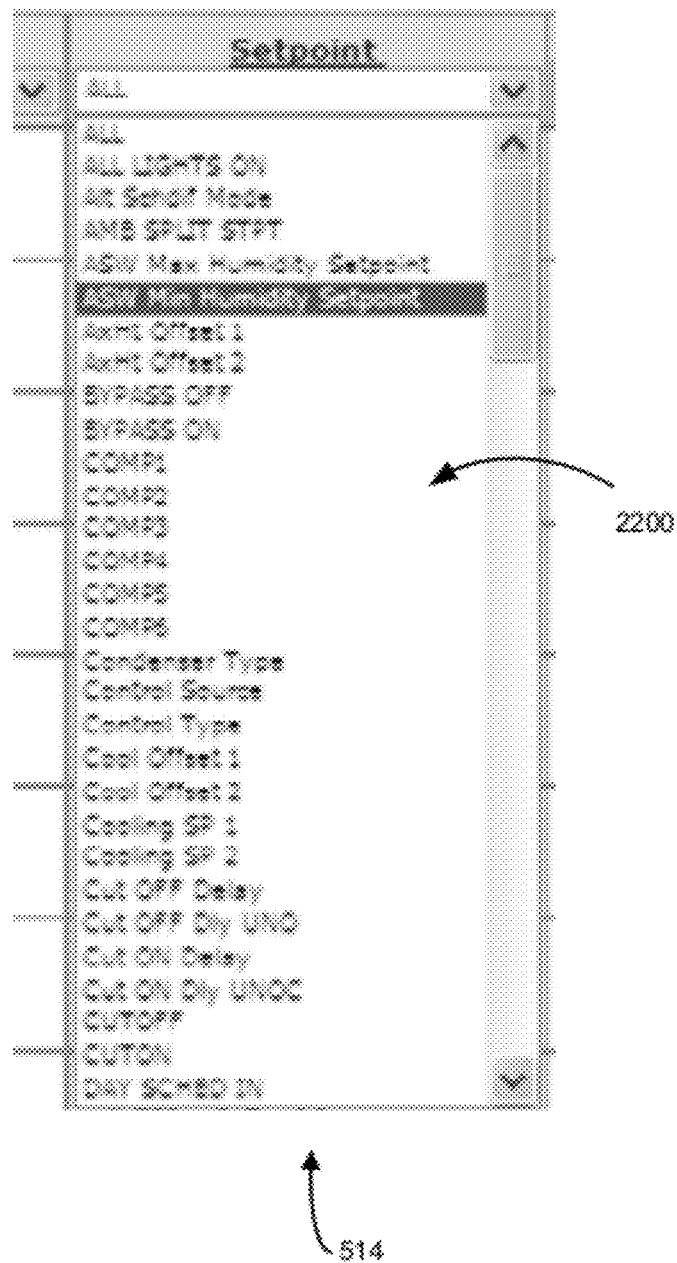
FIG. 22 is a screenshot of a user interface for a setpoint modification monitoring system.

With reference to FIG. 22, as shown at 2200, "ASW Min. Humidity Setpoint" is being selected from the Setpoint 514 field. In this way, once selected, Anti-Sweat Minimum Humidity Setpoints will be shown in the display.

Figure 23:
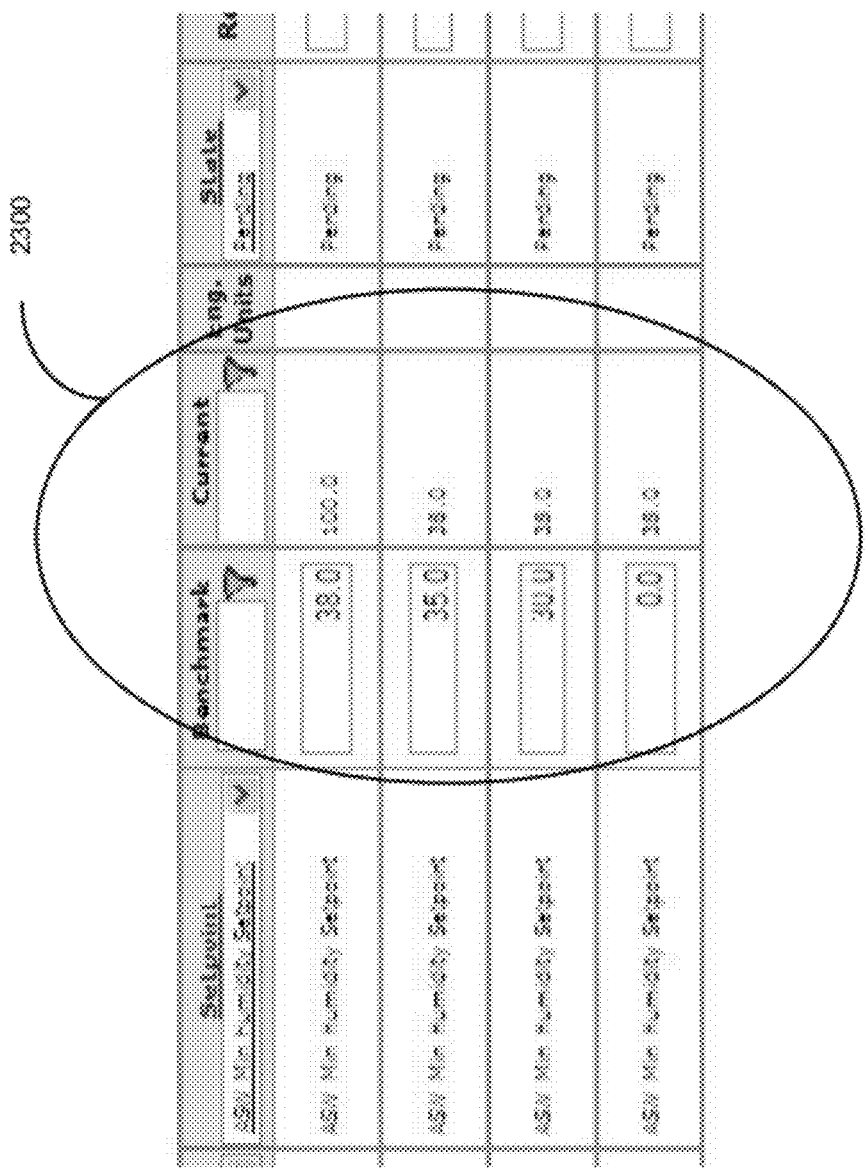
FIG. 23 is a screenshot of a user interface for a setpoint modification monitoring system.

With reference to FIG. 23, as shown at 2300, setpoint modifications for Anti-Sweat Minimum Humidity Setpoints are shown.

With reference to FIG. 24, as shown at 2400, a particular setpoint modification has been contested. The benchmark setpoint value is 38.0. The current setpoint value is 100.0. The state is "challenged." The Energy Specialist has "rejected" the change and entered the comment "Return setpoint to benchmark." The contractor has disagreed with the rejection, and entered a contractor comment: "I changed setpoint because doors were sweaty." The setpoint modification will remain in the challenged state until either the Energy Specialist Approves the setpoint modification or the Contractor Agrees with the Energy Specialist and returns the setpoint to the benchmark value. Alternatively, the Energy Specialist and the Contractor may compromise and agree on an intermediate setting. In which case, the contractor could "agree" with the Energy Specialists rejection and then modify the setpoint to the new agreed value. The new agreed value would then generate a new setpoint modification entry. The Energy Specialist could then approve the new setpoint modification entry to arrive at the compromised setpoint value.

With reference to FIG. 25, as shown at 2500, the "Notify Contractors" option has been selected and a table of contractors with pending setpoint modification exceptions is shown at 2502. In particular, for each contractor with pending setpoint exceptions, the contractor is listed along with the contractor's email and data with respect to the total number of exceptions, the number of approved setpoint modifications, the number of rejected setpoint modifications, the number of unaddressed setpoint modifications, and the date and time the last email was sent to the particular contractor. The contractors are notified via email of setpoint exceptions.

With reference to FIG. 26, an example email to a contractor as a result of selecting the "Notify Contractors" option is shown. In FIG. 26, the email notifies the contractor that the contractor's attention is needed on setpoint exceptions. The email provides a link to the web based user interface of the setpoint monitor and server 102 so that the contractor can click on the link, login to the setpoint monitor and server, and address any pending setpoint exceptions, i.e., any setpoint modifications that have been rejected by an Energy Specialist. In this way, the contractor may be notified in one email of all setpoint exceptions associated with that contractor that are currently outstanding. In this way, as noted above with respect to blocks 211 and 212 of FIG. 2b, the contractor may be notified of the grouped set of "rejected" setpoint modifications all at once.

With reference to FIG. 27, Contractor Setpoint Exceptions, including two particular setpoint exceptions, are shown.

With reference to FIG. 28, as shown at 2800, the Contractor has "Agreed" with the Energy Specialist. In other words, the Contractor has agreed to return the setpoint to the benchmark value. The setpoint modification appears in the "Pending Fix" state.

With reference to FIG. 29, as shown at 2900, the Contractor "Disagreed" with the Energy Specialist. Further, the contractor has entered Contractor Comments indicating: "Doors were sweaty." The setpoint modification appears in the "Contested" state.

With reference to FIG. 30, the "Setpoint Resolution Failures" option has been selected from the Energy Specialist menu. As a result, a setpoint resolution failures table 3000 is displayed. The table shows particular contractors and particular sites, along with the City and State corresponding to the particular Site. Further, the table shows the Result that caused the failure, i.e., setpoint resolution procedure was never ran, or the setpoint resolution procedure failed a number of times. Further, the table shows the last time the setpoint resolution procedure succeeded.

With reference to FIG. 31, menu options for an Energy Manager are shown at 3100 and include: "Benefit Loss Summary," "Contractor Scorecard," "Most Changes Scorecard," "Most Losses Scorecard," "Setpoint Exceptions Report," and "View Contractor Exceptions." By selecting one or more of these options, an Energy Manager may view various reports related to estimated energy consumption benefits and losses resulting from setpoint modifications. An Energy manager may also view reports related to the number of modifications and number of outstanding exceptions, etc.

Figure 37:
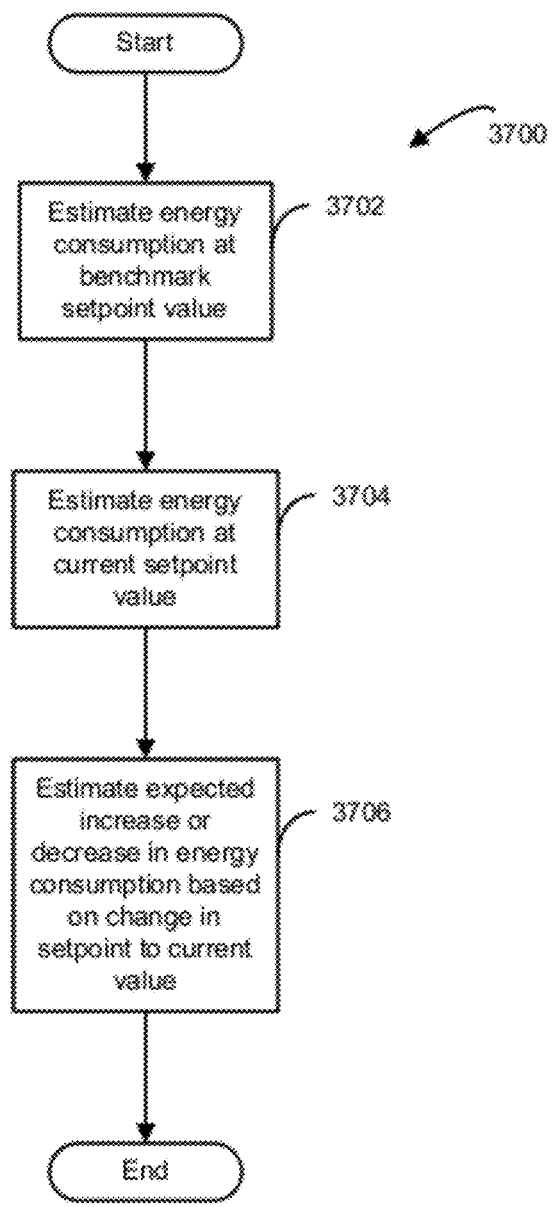
FIG. 37 is a flowchart of an algorithm for a setpoint modification monitoring system.

With reference to FIG. 37, a flow chart 3700 for a setpoint monitor and server 102 to estimate expected increase or decrease in energy consumption related to a setpoint modification is shown. In block 3702, setpoint monitor and server 102 may estimate energy consumption of a particular piece of equipment or grouping of pieces of equipment operating at a benchmark setpoint value. For example, setpoint monitor and server 102 may estimate energy consumption of a suction group having one or more compressors, a condenser or condenser group having one or more condensers, or an anti-sweat heater or anti-sweat heater group having one or more anti-sweat heaters. In block 3704, setpoint monitor and server 102 may estimate energy consumption of the particular piece of equipment or grouping of pieces of equipment operating at the current setpoint value. In block 3706, setpoint monitor and server 102 may estimate an expected increase or decrease in energy consumption based on the change in the setpoint value to the current value by comparing the results of the estimate from block 3702 with the results of the estimate from block 3704.

As an example, a 10 ton compressor rack may use around 15 KW of electricity when operating at a suction pressure setpoint of 50 PSI. As a general rule, for example, a 1 PSI suction pressure setpoint change for the rack may result in a 1.5% increase in energy usage. Thus, when the suction pressure setpoint of the compressor rack is lowered from 50 PSI to 45 PSI, the estimated impact may be 1.1 KW, i.e., 15 KW*(50−45)*0.015=1.1 KW.

Figure 38A:
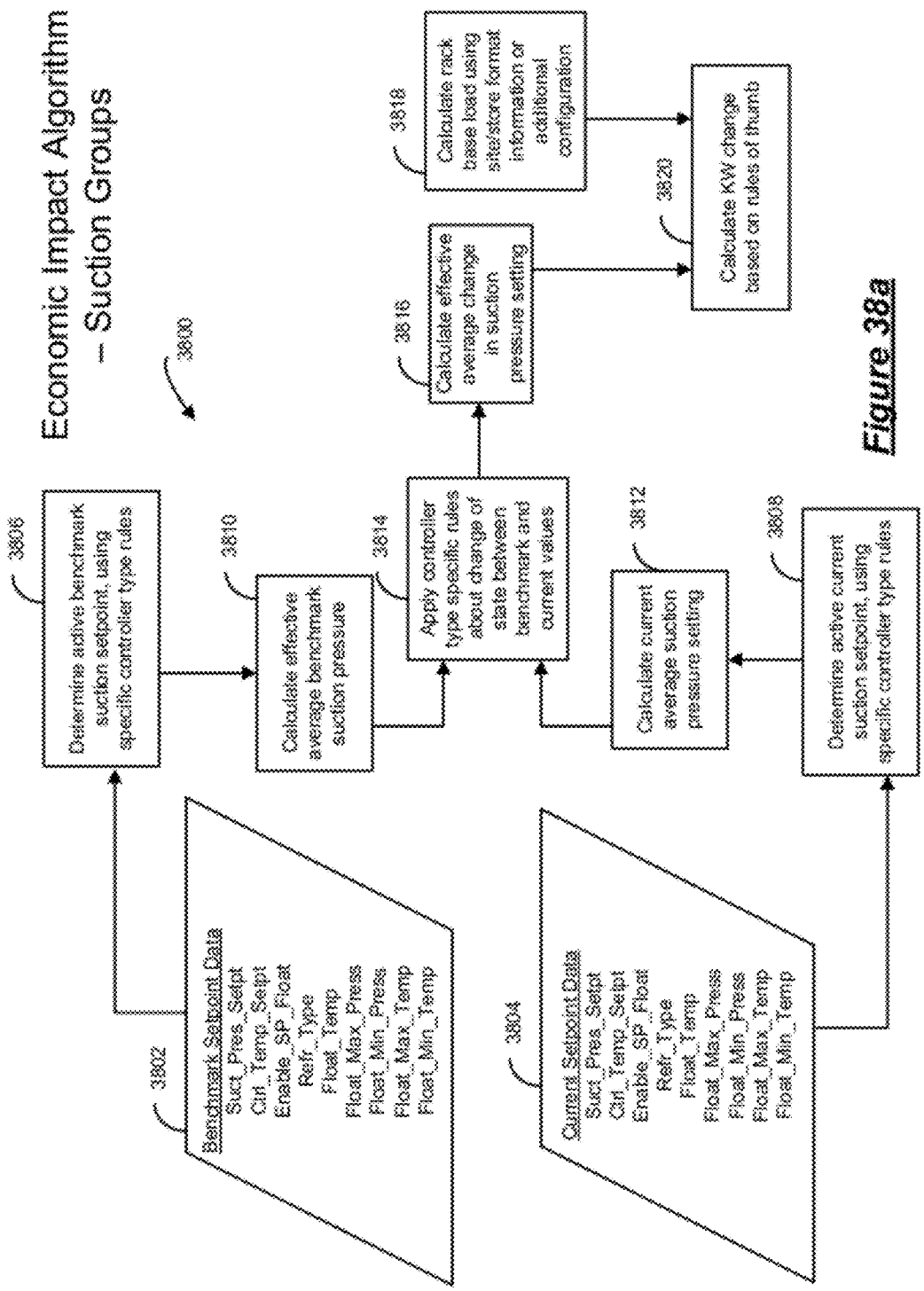
FIG. 38a is a flowchart of an algorithm for a setpoint modification monitoring system.

With reference to FIG. 38a, a flow chart 3800 for a setpoint monitor and server 102 to calculate KW Change resulting from a setpoint modification for a suction group having one or more compressors is shown. Benchmark setpoint data 3802 and current setpoint data 3804 may be retrieved from database 106. As shown, Benchmark setpoint data 3802 may include benchmark setpoint values for setpoints such as: suction pressure setpoint, control temperature setpoint, enable setpoint float, refrigerant type, float temperature, float maximum pressure, float minimum pressure, float maximum temperature, float minimum temperature, or any other applicable setpoint. Current setpoint data 3804 may likewise include current setpoint values for setpoints such as: suction pressure setpoint, control temperature setpoint, enable setpoint float, refrigerant type, float temperature, float maximum pressure, float minimum pressure, float maximum temperature, float minimum temperature, or any other applicable setpoint.

In block 3806, setpoint monitor and server 102 may determine an active benchmark suction setpoint using specific rules for the specific type of controller used with the particular suction group. In block 3808, setpoint monitor and server 102 may determine an active current suction setpoint using specific rules for the specific type of controller used with the particular suction group. In block 3810, setpoint monitor and server 102 may calculate an effective average benchmark suction pressure over a predetermined time period. In block 3812, setpoint monitor and server 102 may calculate a current average suction pressure setting. In this way, blocks 3802, 3806, and 3810 relate to benchmark setpoint values and blocks 3804, 3808, and 3812 relate to current setpoint values.

In block 3814, setpoint monitor and server 102 may apply controller type specific rules, corresponding to the specific type of controller used with the particular suction group, about the change of state between the benchmark value or values, e.g., the average benchmark suction pressure from block 3810, and the current value or values, e.g., the current average suction pressure setting from block 3812.

In block 3816, setpoint monitor and server 102 may calculate an effective average change in the suction pressure setting, for example. In block 3818, setpoint monitor and server 102 may calculate a rack base load using site or store format information or additional configuration information.

In block 3820, setpoint monitor and server 102 may calculate a KW change based, for example, on the calculated effective average change in the suction pressure setting from block 3816 and the calculated rack base load from block 3818. In this way, setpoint monitor and server 102 may calculate an estimated change in energy consumption based on a setpoint modification for a suction group.

Figure 38B:
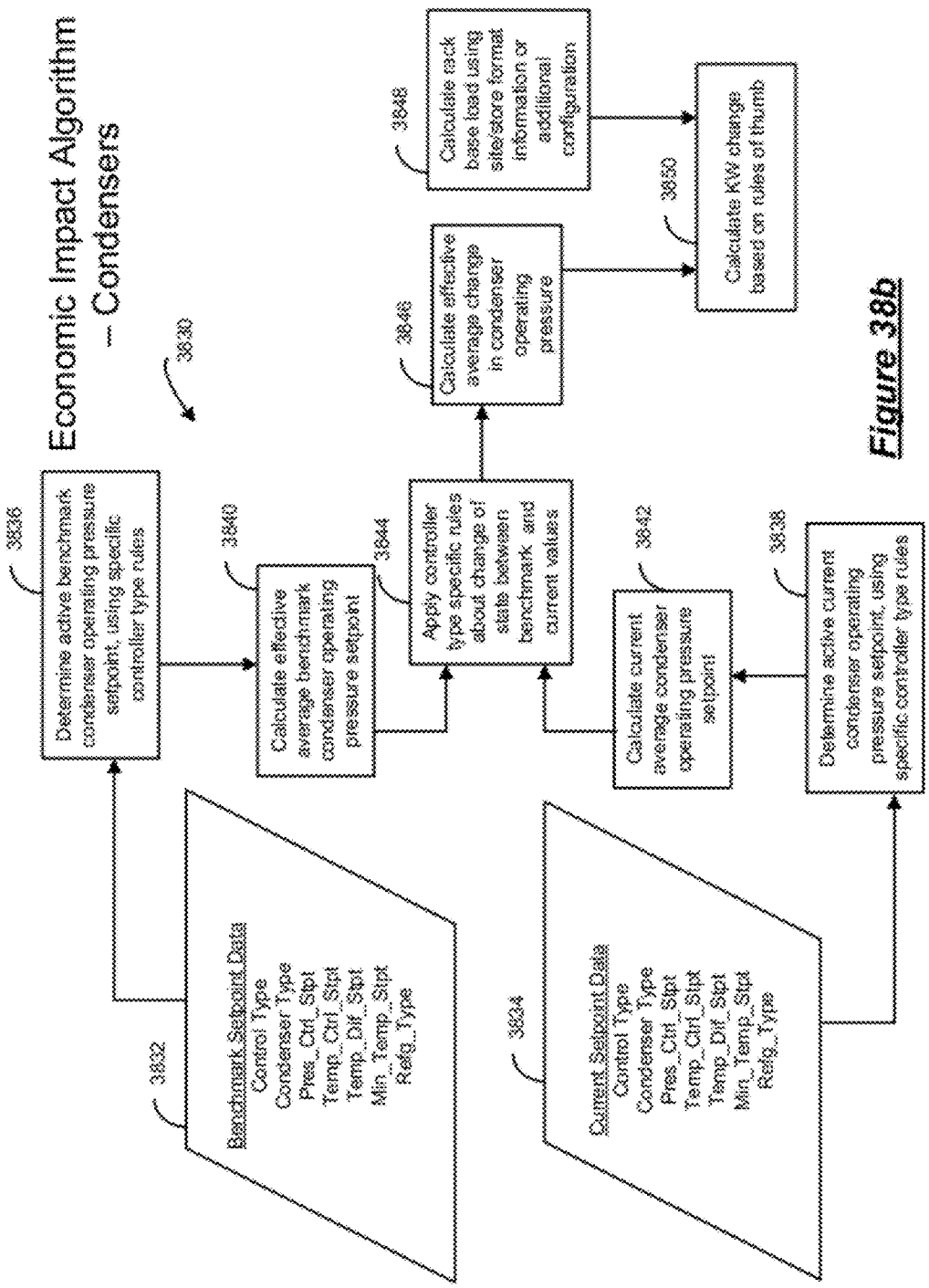
FIG. 38b is a flowchart of an algorithm for a setpoint modification monitoring system.

With reference to FIG. 38b, a flow chart 3830 for a setpoint monitor and server 102 to calculate KW Change resulting from a setpoint modification for a condenser or condenser group having one or more condensers is shown. Benchmark setpoint data 3832 and current setpoint data 3834 may be retrieved from database 106. As shown, Benchmark setpoint data 3832 may include benchmark setpoint values for setpoints such as: control type, condenser type, pressure control setpoint, temperature control setpoint, temperature difference setpoints, minimum temperature setpoint, refrigeration type, or any other applicable setpoint. Current setpoint data 3834 may likewise include current setpoint values for setpoints such as: control type, condenser type, pressure control setpoint, temperature control setpoint, temperature difference setpoints, minimum temperature setpoint, refrigeration type, or any other applicable setpoint.

In block 3836, setpoint monitor and server 102 may determine an active benchmark condenser operating pressure setpoint using specific rules for the specific type of controller used with the particular condenser or condenser group. In block 3838, setpoint monitor and server 102 may determine an active current condenser operating pressure setpoint using specific rules for the specific type of controller used with the particular condenser or condenser group. In block 3840, setpoint monitor and server 102 may calculate an effective average benchmark condenser operating pressure setpoint over a predetermined time period. In block 3842, setpoint monitor and server 102 may calculate a current average condenser operating pressure setpoint. In this way, blocks 3832, 3836, and 3840 relate to benchmark setpoint values and blocks 3834, 3838, and 3842 relate to current setpoint values.

In block 3844, setpoint monitor and server 102 may apply controller type specific rules, corresponding to the specific type of controller used with the particular condenser or condenser group, about the change of state between the benchmark value or values, e.g., the average benchmark condenser operating pressure setpoint from block 3840, and the current value or values, e.g., the current average condenser operating pressure setpoint from block 3842.

In block 3846, setpoint monitor and server 102 may calculate an effective average change in the condenser operating pressure, for example. In block 3848, setpoint monitor and server 102 may calculate a rack base load using site or store format information or additional configuration information.

In block 3850, setpoint monitor and server 102 may calculate a KW change based, for example, on the calculated effective average change in condenser operating pressure from block 3846 and the calculated rack base load from block 3848. In this way, setpoint monitor and server 102 may calculate an estimated change in energy consumption based on a setpoint modification for a condenser or condenser group.

Figure 38C:
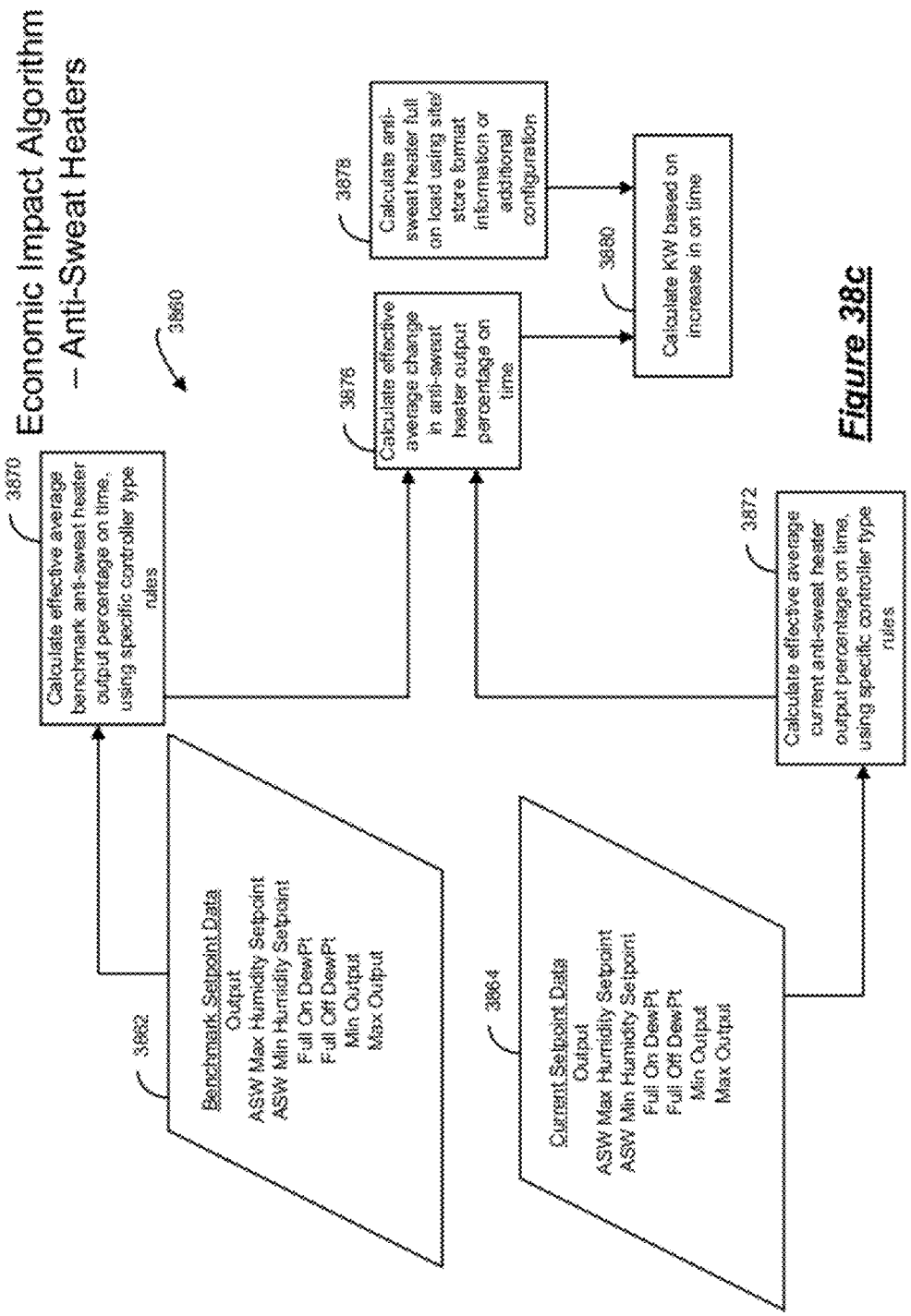
FIG. 38c is a flowchart of an algorithm for a setpoint modification monitoring system.

With reference to FIG. 38c, a flow chart 3860 for a setpoint monitor and server 102 to calculate KW Change resulting from a setpoint modification for an anti-sweat heater or anti-sweat heater group having one or more anti-sweat heaters is shown. Benchmark setpoint data 3862 and current setpoint data 3864 may be retrieved from database 106. As shown, Benchmark setpoint data 3862 may include benchmark setpoint values for setpoints such as: output, ASW maximum humidity setpoint, ASW minimum humidity setpoint, full on dewpoint, full off dewpoint, minimum output, maximum output, or any other applicable setpoint. Current setpoint data 3864 may likewise include current setpoint values for setpoints such as: output, ASW maximum humidity setpoint, ASW minimum humidity setpoint, full on dewpoint, full off dewpoint, minimum output, maximum output, or any other applicable setpoint.

In block 3870, setpoint monitor and server 102 may calculate an effective average benchmark anti-sweat heater output percentage on time using controller type specific rules, corresponding to the specific type of controller used with the particular anti-sweat heater or anti-sweat heater group over a predetermined time period. In block 3872, setpoint monitor and server 102 may calculate an effective average current anti-sweat heater output percentage on time using controller type specific rules, corresponding to the specific type of controller used with the particular anti-sweat heater or anti-sweat heater group over a predetermined time period. In this way, blocks 3862 and 3870 relate to benchmark setpoint values and blocks 3864 and 3872 relate to current setpoint values.

In block 3876, setpoint monitor and server 102 may calculate an effective average change in anti-sweat heater output percentage on time, for example. In block 3878, setpoint monitor and server 102 may calculate an anti-sweat full on load using site or store format information or additional configuration information.

In block 3880, setpoint monitor and server 102 may calculate a KW change based, for example, on the calculated effective average change in anti-sweat heater output percentage on time from block 3876 and the calculated anti-sweat heater full on load from block 3878. In this way, setpoint monitor and server 102 may calculate an estimated change in energy consumption based on a setpoint modification for an anti-sweat heater or anti-sweat heater group.

Figure 39A:
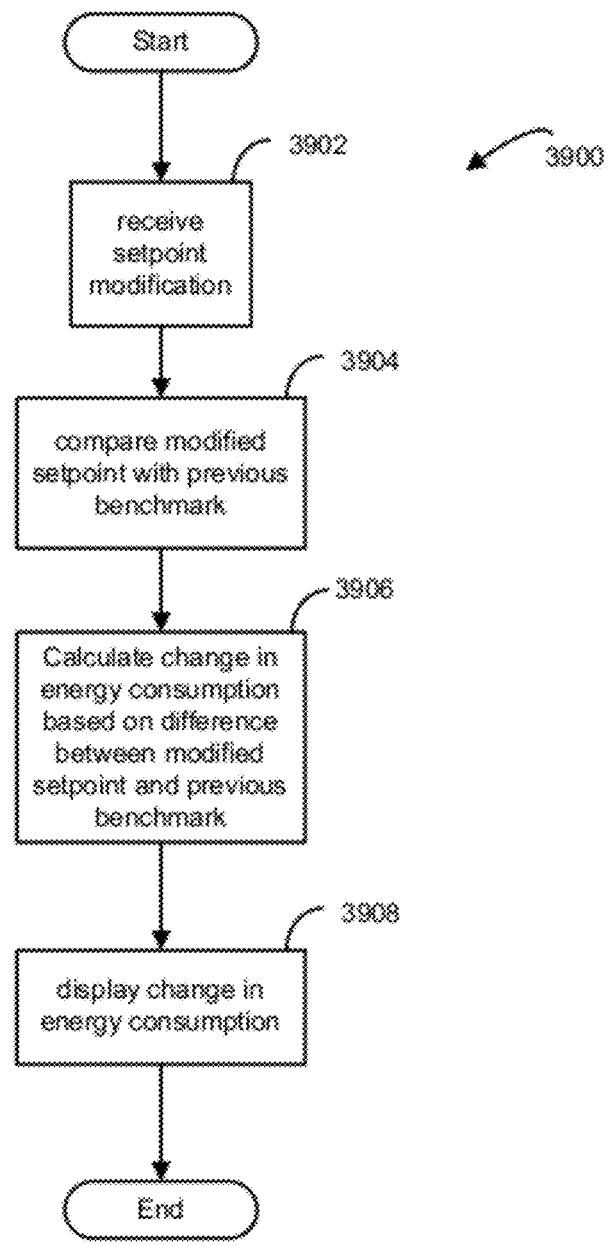
FIG. 39a is a flowchart of an algorithm for a setpoint modification monitoring system.

With reference to FIG. 39a, a flow chart 3900 for a setpoint monitor and server 102 to calculate and display change in energy consumption is shown. In block 3902, setpoint monitor and server 102 may receive setpoint modifications. In block 3904, setpoint monitor and server 102 may compare the modified setpoint value with previous benchmark value. In block 3906, setpoint monitor and server 102 may calculate a change in energy consumption based on the difference between the modified setpoint and the previous benchmark. In block 3908, setpoint monitor and server 102 may display the change in energy consumption calculated in block 3906.

Figure 39B:
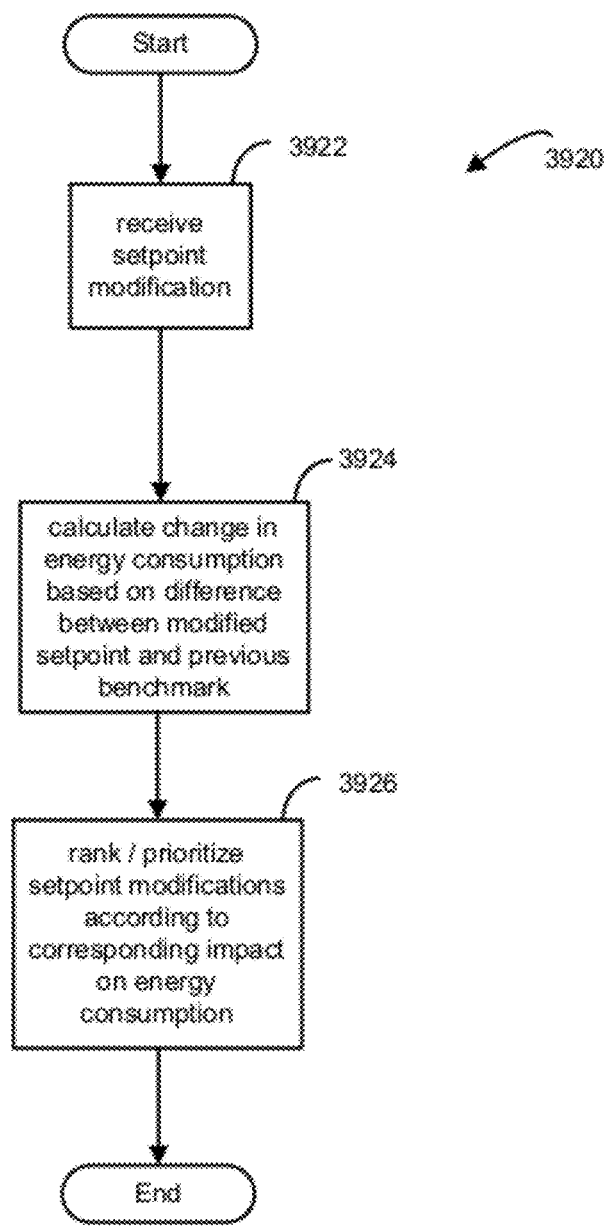
FIG. 39b is a flowchart of an algorithm for a setpoint modification monitoring system.

With reference to FIG. 39b, a flow chart 3920 for a setpoint monitor and server 102 to calculate and rank or prioritize setpoint modifications according to a corresponding impact on energy consumption is shown. In block 3922, setpoint monitor and server 102 may receive setpoint modifications. In block 3924, as described above, setpoint monitor and server 102 may calculate a change in energy consumption based on the difference between the modified setpoint and the previous benchmark. In block 3926, setpoint monitor and server 102 may rank or prioritize all pending setpoint modifications according to a calculated change in energy consumption associated with the setpoint modification. For example, setpoint modifications may be ranked such that the setpoints modifications with the highest corresponding increase in energy consumption may be ranked highest. Setpoint modifications with a lower corresponding increase in energy consumption may be ranked lower in priority. Setpoint modifications that do not effect energy consumption may be ranked lower still. Setpoint modifications that decrease energy consumption may be ranked lower still. Setpoint monitor and server 102 may then display the setpoint modifications, as described above, in order of priority according to the ranking. In this way, energy managers or energy specialists may be presented with the setpoint modifications in order of priority according to the ranking and may perform their analysis, including approval, rejections, etc., according to the established order of priority.

As part of the ranking/prioritizing of the setpoint modifications according to corresponding impact on energy consumption in block 3926, setpoint monitor and server 102 may also categorize the setpoint modifications. For example, setpoints modifications with a corresponding increase in energy consumption that is greater than a predetermined threshold may be categorized in a "high priority" or "urgent" category. When a high priority setpoint modification is received, setpoint monitor and server 102 may notify or alert an energy manager or energy specialist as appropriate.

In this way, based on the prioritizing/ranking/categorizing of setpoint modifications according to a corresponding impact on energy consumption, energy specialists and energy managers may be able to focus attention on the setpoint modifications that have the largest impact on energy consumption.

With reference to FIG. 32, a Benefit-Loss Summary Report 3200 is shown. The Benefit-Loss Summary Report may be selected from the Energy Manager menu options 3100, as shown in FIG. 31. The Benefit-Loss Summary Report may include date range entry fields. In this case, March 2009 has been inputted as the "From" date and April 2009 has been inputted as the "To" date.

The Benefit-Loss Summary Report may include a Benefit Summary table 3202 and a Leakage Summary table 3204.

The Benefit Summary table 3202 may summarize energy savings, or "benefits," resulting from setpoint modifications being reverted to benchmark setpoint values over the specified time periods. For example, Benefit Summary table 3202 may include data for changes reverted prior to the specified time period, e.g., prior to March 2009, data for changes reverted during the specified time period, e.g., between March 2009 and April 2009, and data for all changes reverted to the end of the specified time period, e.g., all changes reverted through April 2009. In each case, the Benefit Summary table 3202 may include the total count of reverted setpoint modifications, i.e., the total number of times a setpoint modification was changed back to a benchmark value. In each case, the Benefit Summary table 3202 may also include the total sum of Kilo-Watt Hours (KWH) associated with the reverted changes, the total monetary amount associated with the total KWH, e.g., the total dollar amount, and the annualized monetary amount, e.g., the annualized dollar amount. The total monetary amount and the annualized dollar amount may be based on applicable energy costs for the associated local site. In this way, setpoint monitor and server 102 may apply energy cost data to the estimated/calculated energy savings data, to display the total dollar cost savings and the annualized dollar cost savings associated with the reverted setpoint modifications in the Benefit Summary table 3202. In this way, the Benefit Summary table 3202 may display the total and annualized monetary savings associated with having reverted setpoint modifications over the specified time period.

The Leakage Summary table 3204 may summarize energy losses or "leakages" resulting from setpoint modifications not being reverted to benchmark setpoint values over the specified time periods. For example, Leakage Summary table 3204 may include data for changes that were not reverted prior to the specified time period, e.g., prior to March 2009, data for changes that were not reverted during the specified time period, e.g., between March 2009 and April 2009, and data for all changes that were not reverted to the end of the specified time period, e.g., all changes not reverted through April 2009. In each case, the Leakage Summary table 3204 may include the total count of reverted setpoint modifications that were not reverted, i.e., the total number of times a setpoint modification was not changed back to a benchmark value. In each case, the Leakage Summary table 3204 may also include the total sum of Kilo-Watt Hours (KWH) associated with not having reverted the changes, the total monetary amount associated with the total KWH, e.g., the total dollar amount, and the annualized monetary amount, e.g., the annualized dollar amount. The total monetary amount and the annualized dollar amount may be based on applicable energy costs for the associated local site. In this way, setpoint monitor and server 102 may apply energy cost data to the estimated/calculated energy savings data, to display the total dollar cost and the annualized dollar cost associated with not having reverted setpoint modifications in the Leakage Summary table 3204. In this way, the Leakage Summary table 3204 may display the total and annualized monetary loss associated with not having reverted setpoint modifications over the specified time period.

Figure 33:
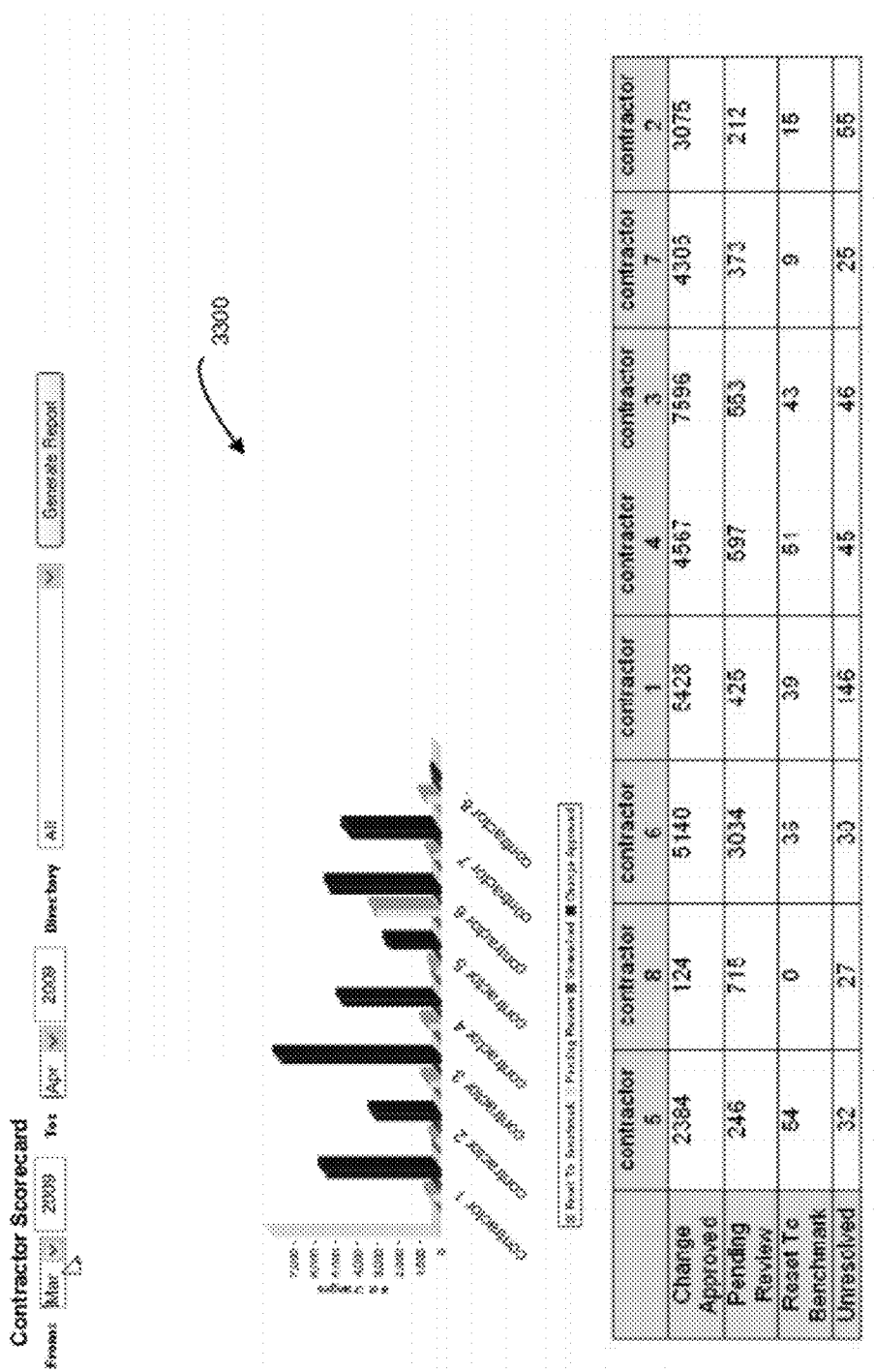
FIG. 33 is a screenshot of a user interface for a setpoint modification monitoring system.

With reference to FIG. 33, a Contractor Scorecard 3300 is shown. The Contractor Scorecard 3300 may be selected from the Energy Manager menu options 3100, as shown in FIG. 31. The Contractor Scorecard 3300 may include date range entry fields. In this case, March 2009 has been inputted as the "From" date and April 2009 has been inputted as the "To" date.

The Contractor Scorecard 3300 may display, in bar graph format and in table format, the number of setpoint modifications that were approved, the number of setpoint modifications that are currently pending review by an Energy Specialist, the number of setpoint modifications that were reverted or reset to the benchmark setpoint value, and the total number of unresolved setpoint modifications.

Figure 34:
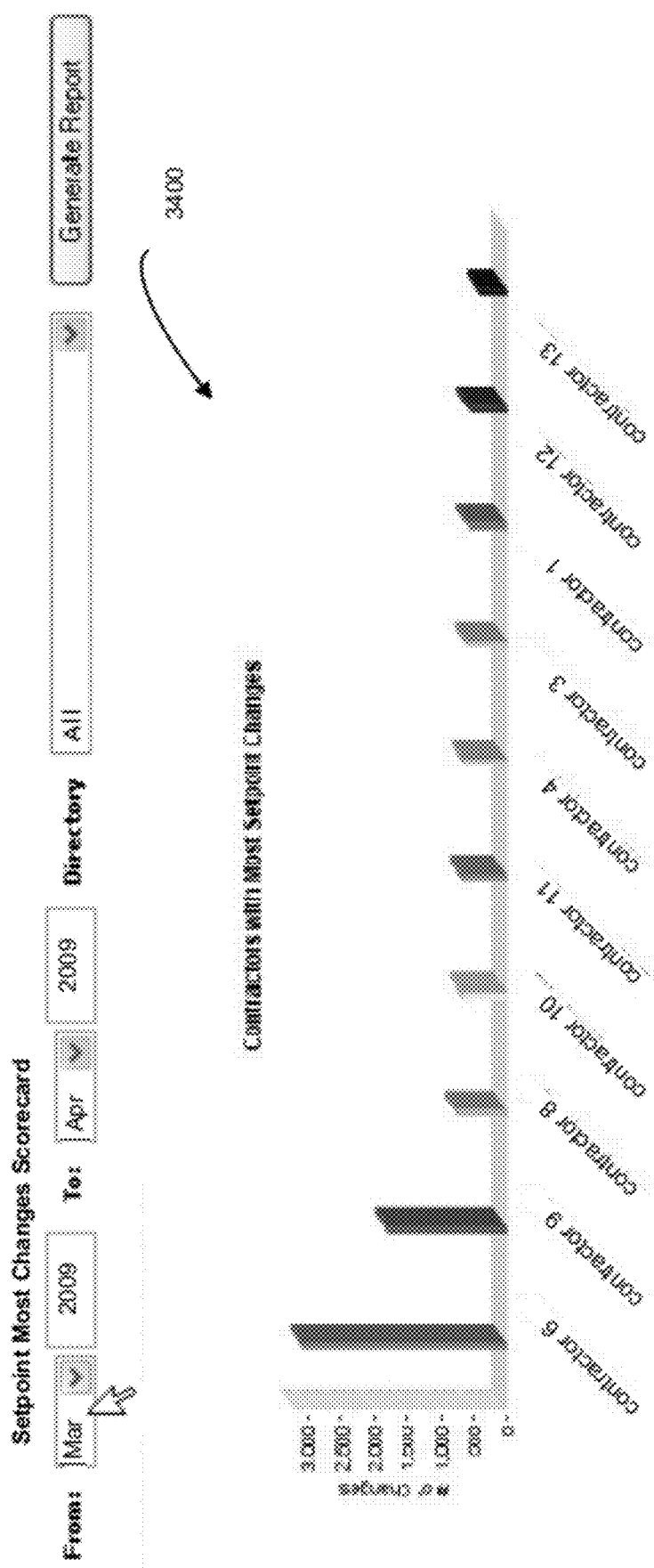
FIG. 34 is a screenshot of a user interface for a setpoint modification monitoring system.

With reference to FIG. 34, a Setpoint Most Changes Scorecard 3400 is shown. The Setpoint Most Changes Scorecard 3400 may be selected from the Energy Manager menu options 3100, as shown in FIG. 31. The Setpoint Most Changes Scorecard 3400 may include date range entry fields. In this case, March 2009 has been inputted as the "From" date and April 2009 has been inputted as the "To" date.

The Setpoint Most Changes Scorecard 3400 may display the contractors with the most setpoint changes or modifications in a bar graph format. Alternatively, the Setpoint Most Changes Scorecard 3400 may display the contractors with the most setpoint changes or modifications in a table format.

Figure 35:
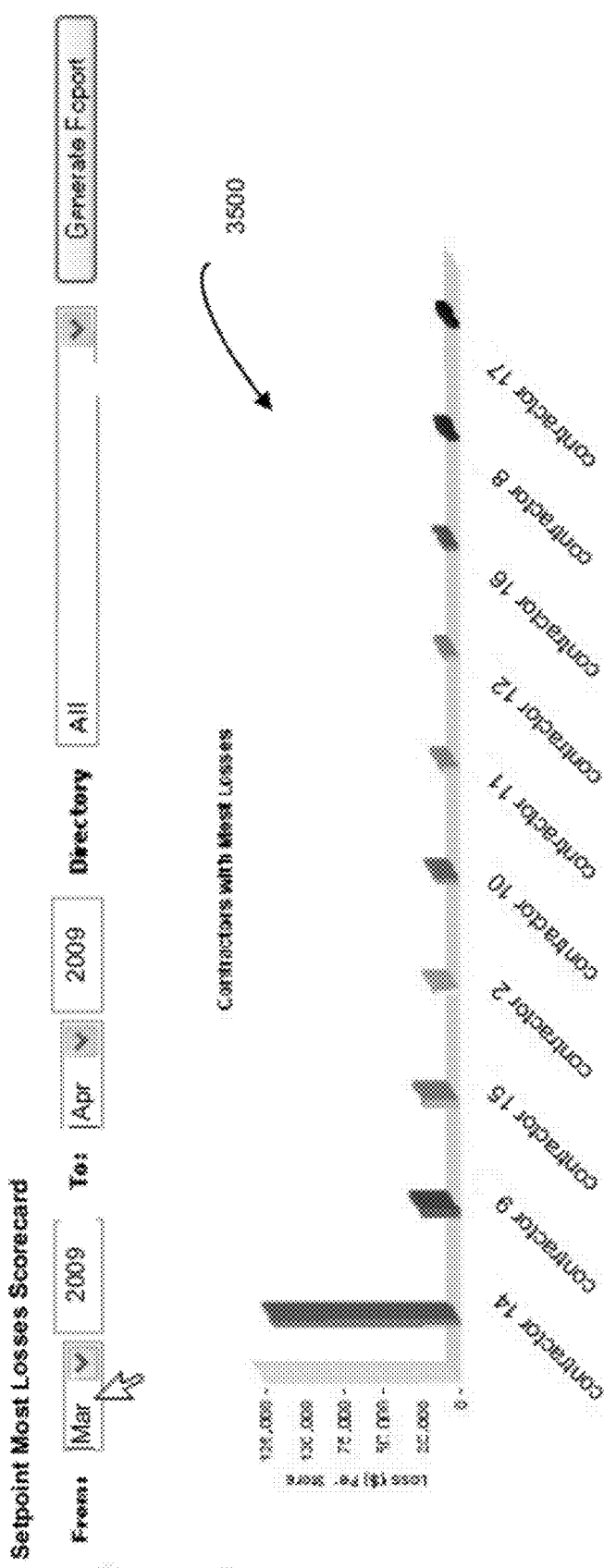
FIG. 35 is a screenshot of a user interface for a setpoint modification monitoring system.

With reference to FIG. 35, a Setpoint Most Losses Scorecard 3500 is shown. The Setpoint Most Losses Scorecard 3500 may be selected from the Energy Manager menu options 3100, as shown in FIG. 31. The Setpoint Most Losses Scorecard 3500 may include date range entry fields. In this case, March 2009 has been inputted as the "From" date and April 2009 has been inputted as the "To" date.

The Setpoint Most Losses Scorecard 3500 may display the contractors that have the most associated energy losses resulting from not having reverted setpoint modifications to benchmark values. The data may be displayed in a bar graph format showing total monetary amount lost. Alternatively, the Setpoint Most Losses Scorecard 3500 may display the contractors with the most losses in a table format.

Figure 36:
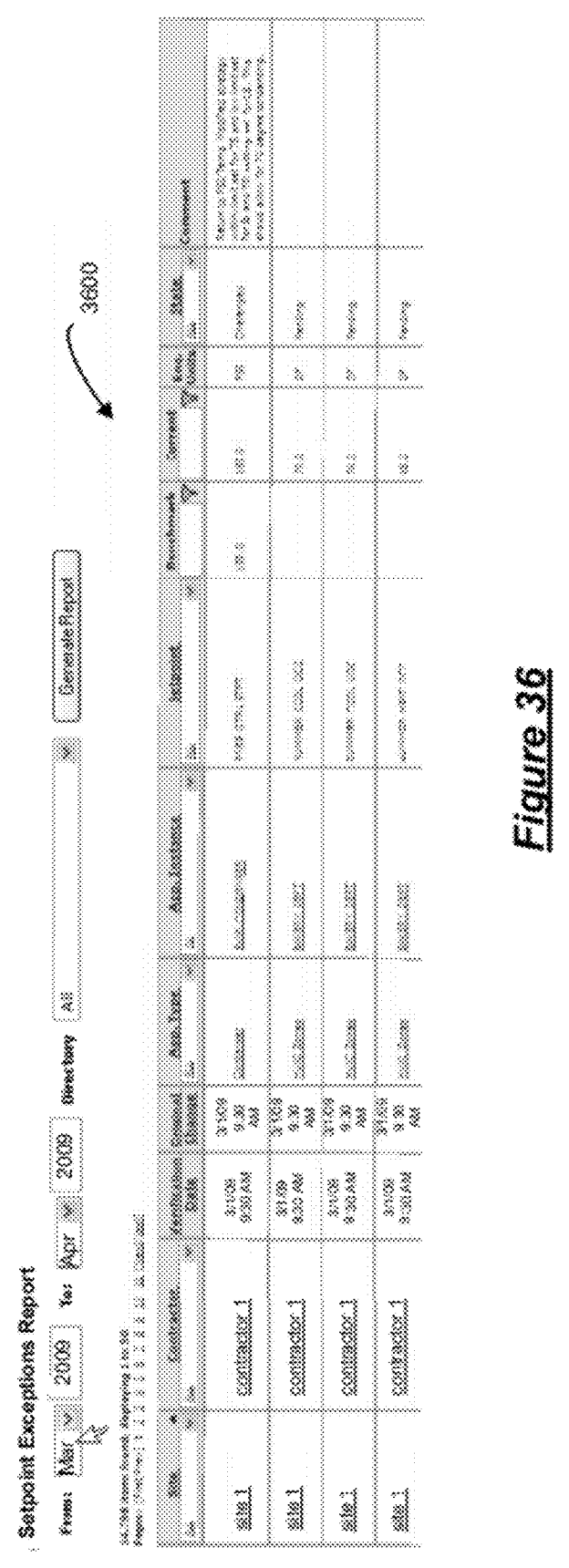

With reference to FIG. 36, a Setpoint Exceptions Report 3600 is shown. The Setpoint Exceptions Report 3600 may be selected from the Energy Manager menu options 3100, as shown in FIG. 31. The Setpoint Exceptions Report 3600 may include date range entry fields. In this case, March 2009 has been inputted as the "From" date and April 2009 has been inputted as the "To" date.

The Setpoint Exceptions Report 3600 may display all setpoint exceptions for the inputted time period. Similar to the "Approve/Reject Changes" display, discussed above with respect to FIGS. 5 and 6, the Setpoint Exceptions Report 3600 may include, for each setpoint exception, the site, the contractor, the verification date, the original change date, the application type, the application instances, the particular setpoint, the benchmark setpoint value, the current setpoint value, the units of the setpoint values, the current state, the Energy Specialist's comments, and the Contractor's comments.

As described above, an Energy Specialist may approve or reject setpoint modifications made by a contractor. Setpoint monitor and server 102 may notice or monitor trends that develop in the approval or rejection of setpoint modifications and may suggest rules to apply to future setpoint modifications. Once certain rules are developed, future setpoint modifications may be automatically approved or rejected based on the rule. Further, an Energy Specialist may enter a rule for application to future setpoint modifications.

Figure 40:
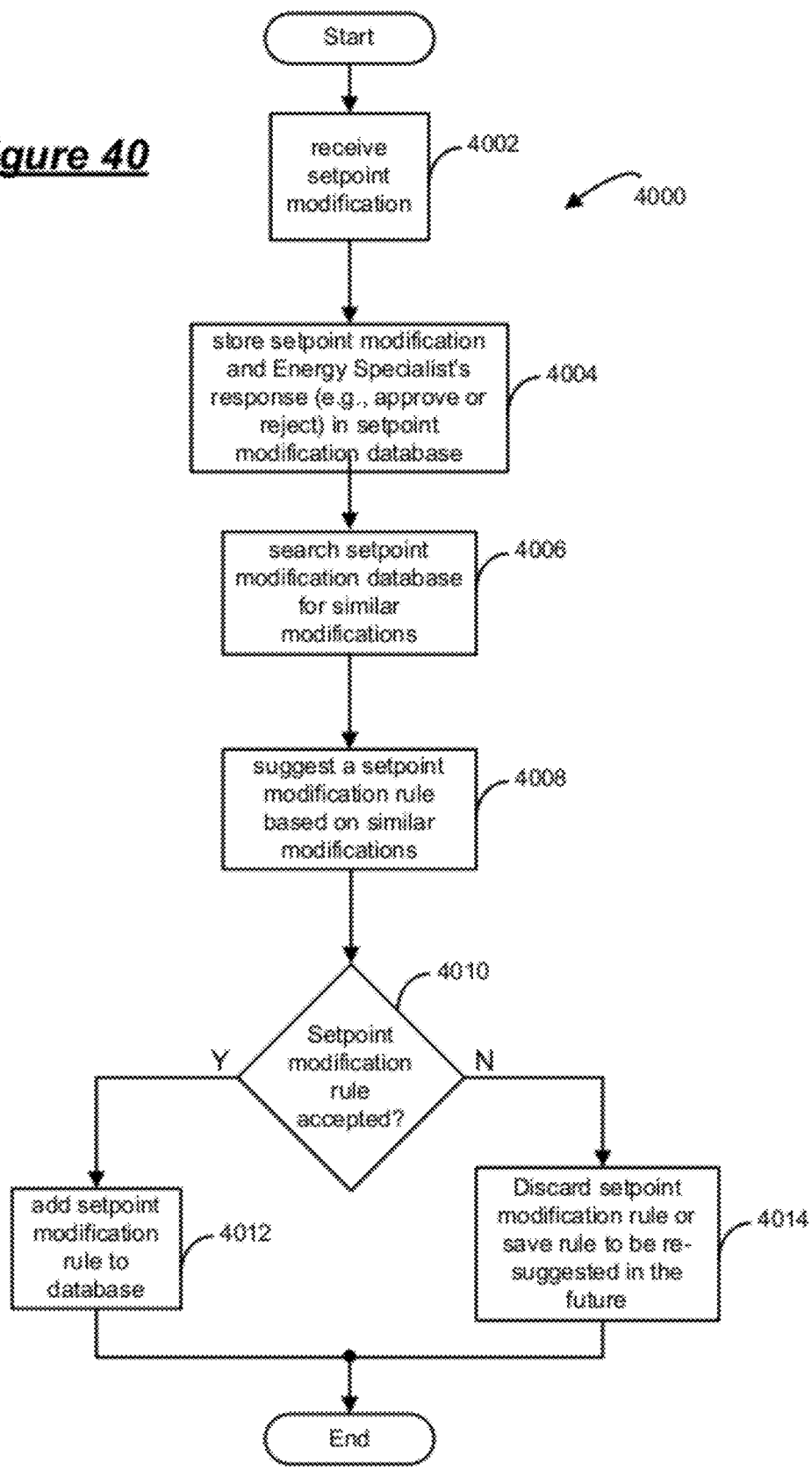
FIG. 40 is a flowchart of an algorithm for a setpoint modification monitoring system.

With reference to FIG. 40, a flow chart 4000 for a setpoint monitor and server 102 to develop setpoint modification rules is shown. In block 4002, setpoint monitor and server 102 may receive setpoint modifications. In block 4004, setpoint monitor and server 102 may store setpoint modifications, along with the Energy Specialist's response (e.g., approve or reject) in database 106. In block 4006, setpoint monitor and server 102 may search setpoint modification database 106 for similar setpoint modifications and may review the Energy Specialist's previous response. In block 4008, setpoint monitor and server 102 may suggest a setpoint modification rule based on similar modifications or trends in setpoint modifications and the Energy Specialist's response.

In block 4010, setpoint monitor and server 102 may receive the Energy Specialist's response to the suggested rule. In block 4012, when the suggested rule is accepted, setpoint monitor and server 102 may add the new setpoint modification rule to database 106. In block 4014, when the suggested rule is accepted, setpoint monitor and server 102 may discard the setpoint modification rule or save the rule to be re-suggested in the future.

In this way, setpoint monitor and server 102 may determine and suggest new setpoint modification rules to be applied to future setpoint modifications made by Contractors.

With reference to FIG. 41, a screenshot of a rule suggestion window is shown. For example, in FIG. 41 setpoint monitor and server 102 has observed that: "It seems that for 'ComTrol XML' controllers whenever the 'SUCT PRESS SETPT' is lowered by more than 1.7 psi you reject the setpoint change."

As such, setpoint monitor and server 102 has suggested four options. An Energy Specialist may select one of the suggested options.

For the first option 4100, setpoint monitor and server 102 suggests to automatically apply a rule to "Site 1" and reject all changes where the "SUCT PRESS SETPT" has been lowered by more than 1.7 psi for ComTrol Xml Controllers. The user may modify the suggested rule to apply to additional or different sites. Further, the user may modify the suggested rule to apply for psi modifications different than the suggested 1.7 psi. Further, the user may modify the suggested rule to apply to additional or different controllers than the suggested "ComTrol Xml" controller.

For the second option 4102, setpoint monitor and server 102 suggests to automatically apply the same rule as in the first option except that the applicable setpoint modifications will be marked for rejection, but the Energy Specialist will ultimately use the approve/reject page to accept or reject all setpoint modifications, including the setpoint modifications marked by the rule.

For the third option 4104, the user can indicate that the suggested rule is a reasonable rule, but withhold final judgment as to whether to accept the rule for a later time. Further, the user can request that no additional rules be suggested for the day. In this way, the user may delay making a final decision with respect to the suggested rule.

For the fourth option 4106, the user can reject the rule outright.

Figure 42:
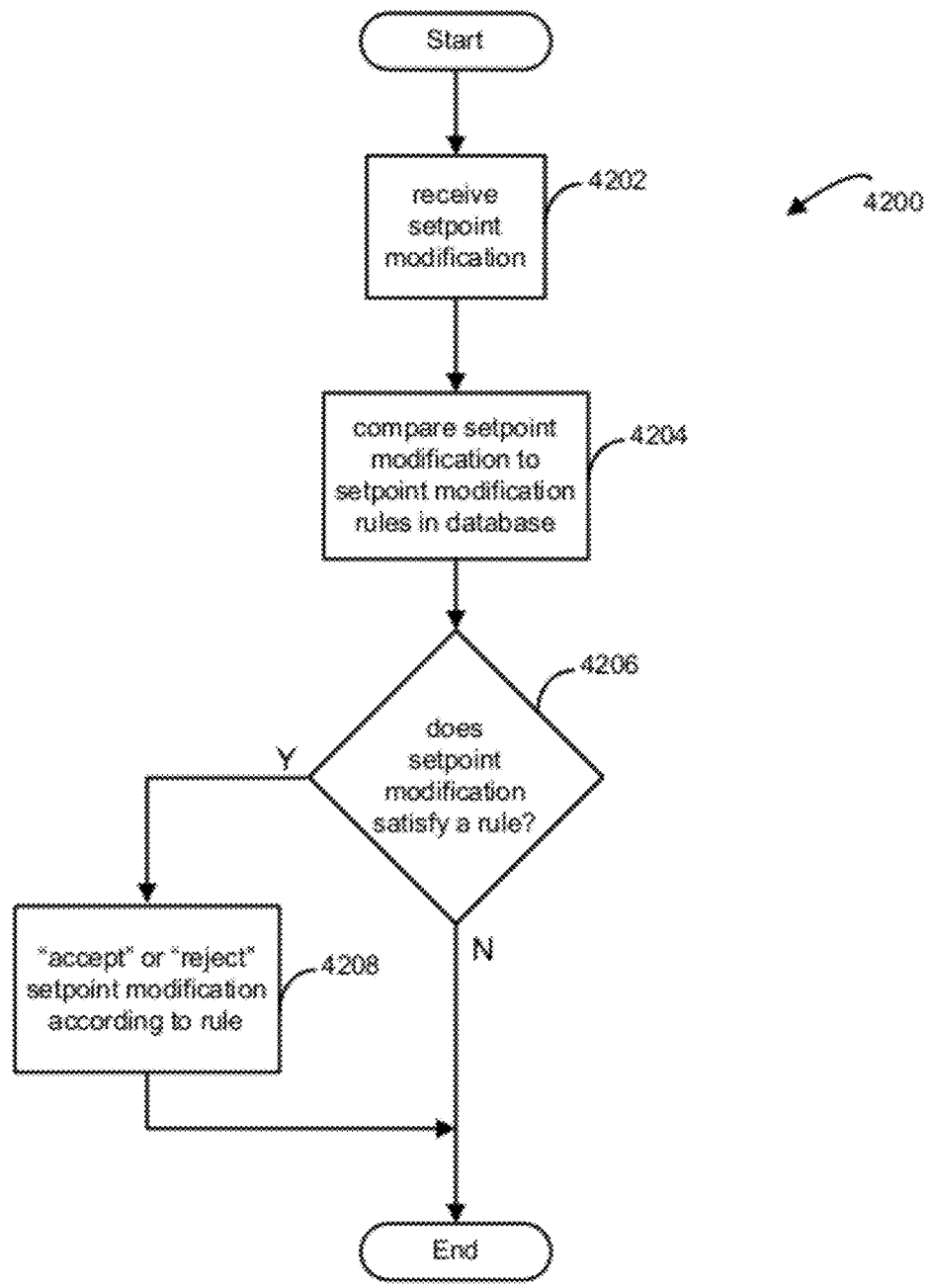
FIG. 42 is a flowchart of an algorithm for a setpoint modification monitoring system.

With reference to FIG. 42, a flow chart 4200 for a setpoint monitor and server 102 to apply setpoint modification rules is shown. In block 4202, setpoint monitor and server 102 receives a setpoint modification. In block 4204, setpoint monitor and server 102 compares the setpoint modification to the setpoint modification rules in the database. In block 4206, setpoint monitor and server 102 determines whether the current setpoint modification satisfies any rule in the database.

In block 4208, when the current setpoint modification satisfies a rule in the database, setpoint monitor and server accepts or rejects the current setpoint modification according to the rule.

Figure 47:
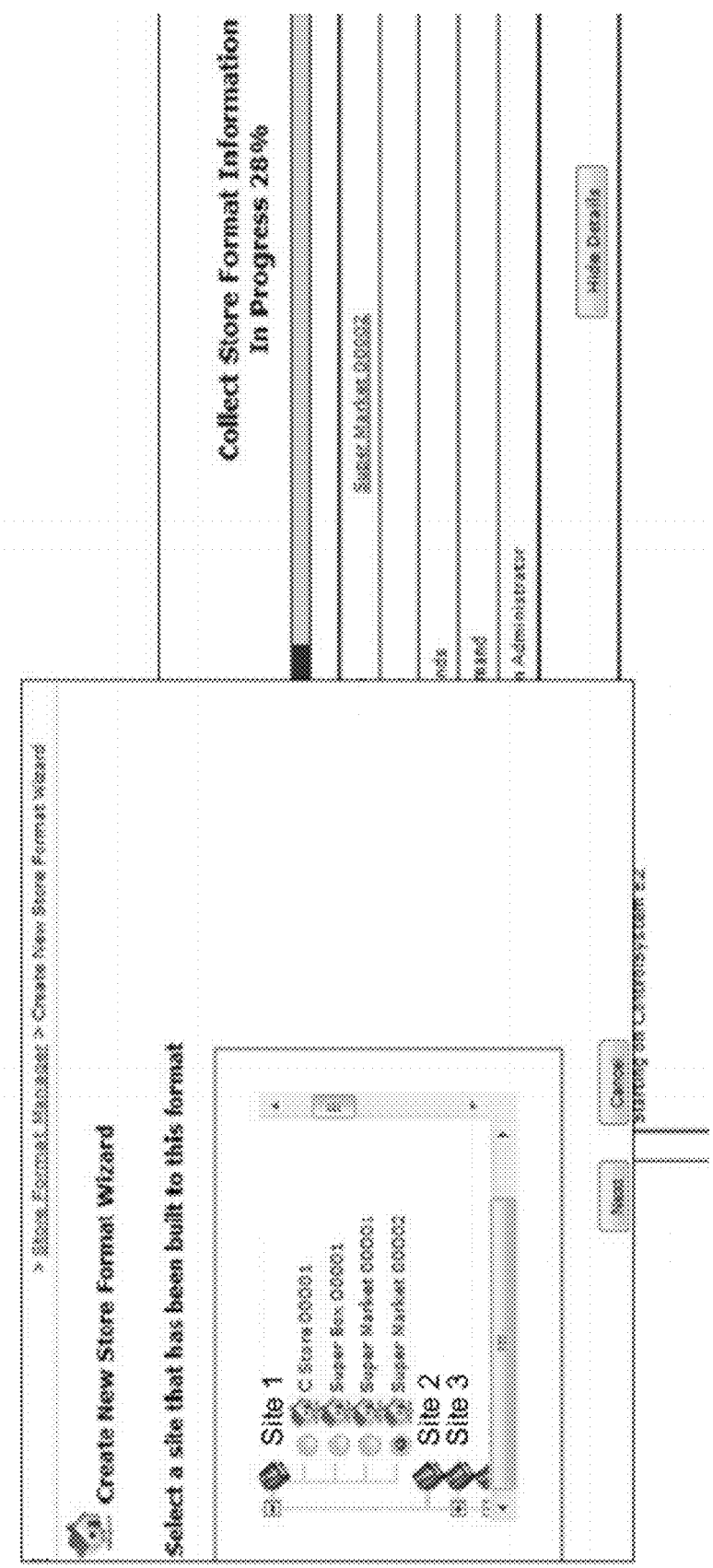
FIG. 47 is a screenshot of a user interface for a store format wizard.
Figure 48:
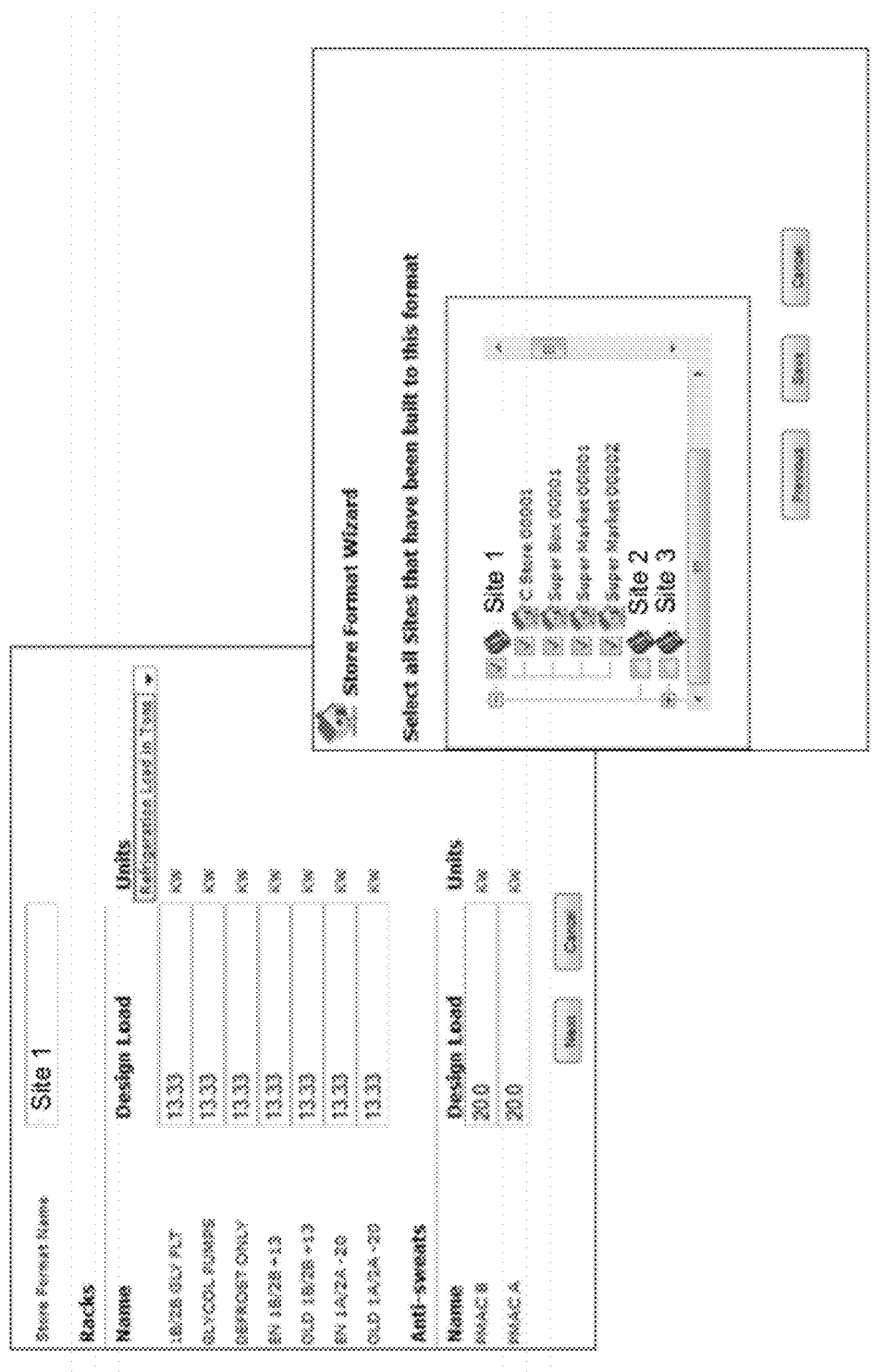
FIG. 48 is a screenshot of a user interface for a setpoint modification monitoring system.

With reference to FIGS. 47 and 48, screen shots for a store format wizard are shown. A particular retailer may have multiple stores at multiple sites. Further, a particular retailer may use a similar format, including similar naming conventions, for the implementation of various building systems and various pieces of equipment at each of the stores. For example, certain controllers for certain building systems for certain functions or areas of the stores may be similarly named throughout the particular retailer's multiple stores. A store format wizard may be used to reduce data entry and provide a template for the naming and arrangement of particular pieces of equipment and controllers. In this way, a particular retailer may establish a single template and then repeat the use of the template across all of the retailer's multiple stores to insure consistent naming and arrangement. As shown in FIG. 47, a particular site may be selected as the template site. As shown in FIG. 48, multiple sites may be selected for building the template site. The store format wizard may then build a template for naming and arrangement of controllers and equipment according to the selected site or sites. The template can be used for future naming and arrangement of equipment.

The foregoing description of the embodiments has been provided for purposes of illustration and description. It is not intended to be exhaustive. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure and all such modifications are intended to be included within the scope of the disclosure.

What is claimed is:

1. A system comprising:
a controller that operates at least one piece of equipment according to a current setpoint value;
a setpoint monitor in communication with said controller that monitors said current setpoint value and compares said current setpoint value with a benchmark setpoint value;
a first terminal in communication with said setpoint monitor, said first terminal outputting said current setpoint value and said benchmark setpoint value and receiving input indicating one of approval of said current setpoint value or rejection of said current setpoint value;
a second terminal in communication with said setpoint monitor, said second terminal outputting an indicator indicating that said current setpoint value has been rejected when said input to said first terminal indicates rejection of said current setpoint value, and said second terminal receiving input indicating one of agreement or disagreement with said rejection of said current setpoint value.

2. The system of claim 1 wherein, when said input to said first terminal indicates rejection of said current setpoint value, said first terminal receives data related to an explanation for said rejection.

3. The system of claim 1 wherein said second terminal receives data related to an explanation for said disagreement with said rejection of said current setpoint value.

4. The system of claim 1 wherein said setpoint monitor sends a notification indicating rejection of said current setpoint value.

5. The system of claim 4 wherein said notification includes an email notification.

6. The system of claim 1 wherein said setpoint monitor monitors a plurality of current setpoint values and compares each current setpoint value of said plurality with a corresponding benchmark setpoint value, and said first terminal receives input indicating one of approval of each said current setpoint value or rejection of each said current setpoint value.

7. The system of claim 6 wherein, when a plurality of said current setpoint values have been rejected, said setpoint monitor groups said plurality of said current setpoint values that have been rejected according to at least one of a corresponding system or a corresponding contractor associated with each said current setpoint value that has been rejected.

8. The system of claim 7 wherein said setpoint monitor sends a notification corresponding to each grouping of said plurality of said current setpoint values that have been rejected.

9. The system of claim 8 wherein said notification includes an email notification.

10. The system of claim 1 wherein said controller operates said at least one piece of equipment according to said benchmark setpoint value when said indicator indicates that said current setpoint value has been rejected.

11. A method comprising:
receiving a current setpoint value from a controller that operates at least one piece of equipment according to said current setpoint value, said current setpoint value being set by a first user;
comparing said current setpoint value with a benchmark setpoint value;

outputting said current setpoint value and said benchmark setpoint value on a terminal when said current setpoint value is different than said benchmark setpoint value;

receiving, with said terminal, input from a second user indicating one of approval of said current setpoint value or rejection of said current setpoint value;

notifying said first user that said current setpoint value has been rejected when said input from said second user indicates rejection of said current setpoint value;

communicating, to said terminal, input from said first user indicating one of agreement or disagreement with said rejection of said current setpoint value.

12. The method of claim 11 wherein, when said notification indicates that said current setpoint value has been rejected, said notification directs said first user to change said current setpoint value for said controller to said benchmark setpoint value.

13. The method of claim 11, wherein, when said input from said second user indicates rejection of said current setpoint value, said input from said second user includes data related to an explanation for rejection of said current setpoint value.

14. The method of claim 11 wherein, when said input from said first user to said terminal indicates disagreement with said rejection of said current setpoint value, said method further comprises communicating input from said first user to said terminal related to an explanation for said disagreement with said rejection of said current setpoint value.

15. The method of claim 11, wherein said notifying said first user includes sending an email notification to said first user.

16. The method of claim 11 further comprising determining an energy consumption loss associated with a difference between said current setpoint value and said benchmark setpoint value.

17. The method of claim 11 further comprising monitoring a plurality of current setpoint values, each current setpoint value being set by a corresponding first user, comparing each current setpoint value of said plurality with a corresponding benchmark setpoint value, and receiving input from a second user indicating one of approval of each said current setpoint value or rejection of each said current setpoint value.

18. The method of claim 17 further comprising determining a plurality of energy consumption loss values associated with a difference between each said current setpoint value of said plurality of current setpoint values and said corresponding benchmark setpoint value.

19. The method of claim 18, wherein said plurality of current setpoint values are set by a plurality of first users, said method further comprising ranking said plurality of first users based on said plurality of energy consumption loss values.

* * * * *

UNITED STATES PATENT AND TRADEMARK OFFICE
CERTIFICATE OF CORRECTION

PATENT NO. : 8,473,106 B2  
APPLICATION NO. : 12/789562  
DATED : June 25, 2013  
INVENTOR(S) : E. Todd Clark et al.

It is certified that error appears in the above-identified patent and that said Letters Patent is hereby corrected as shown below:

Title Page 5, Column 1,  
Other Publications, Line 4      Delete "P," and insert --P.,--.

In the Drawings  
Sheet 27 of 52, Fig. 26, Line 8      Delete "past" and insert --paste--.  
Sheet 41 of 52,  
Reference Numeral 3880, Fig. 38c      After "KW", insert --change--.

In the Specification  
Column 6, Line 47      Delete "124" and insert --120--.  
Column 8, Line 19      Delete "4502" and insert --4504--.  
Column 9, Line 9      After "shot", insert --)--.  
Column 9, Line 39      Delete "suction" and insert --Suction--.  
Column 9, Line 55      Delete "emails" and insert --email--.  
Column 10, Line 3      Delete "modification" and insert --modifications--.  
Column 10, Line 34      Delete "FIG. 29" and insert --FIG. 28--.  
Column 10, Line 42      Delete "FIG. 29" and insert --FIG. 28--.  
Column 14, Line 67      Delete "ran" and insert --run--.  
Column 17, Line 40      After "anti-sweat", insert --heater--.  
Column 20, Line 46      Before "106", delete "setpoint modification".  
Column 20, Line 57      Before "accepted", insert --not--.

Signed and Sealed this  
Seventeenth Day of September, 2013

Teresa Stanek Rea  
*Deputy Director of the United States Patent and Trademark Office*